US012626124B2

(12) United States Patent
Koh et al.

(10) Patent No.: US 12,626,124 B2
(45) Date of Patent: May 12, 2026

(54) DYNAMIC USER INTERFACE AND MACHINE LEARNING TOOLS FOR GENERATING DIGITAL CONTENT AND MULTIVARIATE TESTING RECOMMENDATIONS

(71) Applicant: Adobe Inc., San Jose, CA (US)

(72) Inventors: Eunyee Koh, San Jose, CA (US); Tak Yeon Lee, DaeJeon (KR); Andrew Thomson, Moraga, CA (US); Vasanthi Holtcamp, Fremont, CA (US); Ryan Rossi, Santa Clara, CA (US); Fan Du, Milpitas, CA (US); Caroline Kim, San Francisco, CA (US); Tong Yu, San Jose, CA (US); Shunan Guo, San Jose, CA (US); Nedim Lipka, Santa Clara, CA (US); Shriram Venkatesh Shet Revankar, San Jose, CA (US); Nikhil Belsare, Foster City, CA (US)

(73) Assignee: Adobe Inc., San Jose, CA (US)

( * ) Notice: Subject to any disclaimer, the term of this patent is extended or adjusted under 35 U.S.C. 154(b) by 1267 days.

(21) Appl. No.: 17/383,114

(22) Filed: Jul. 22, 2021

(65) Prior Publication Data

US 2023/0030341 A1 Feb. 2, 2023

(51) Int. Cl.
*G06Q 30/02* (2023.01)
*G06F 40/186* (2020.01)
(Continued)

(52) U.S. Cl.
CPC ............ *G06N 3/08* (2013.01); *G06F 40/186* (2020.01); *G06N 3/044* (2023.01); *H04L 43/50* (2013.01)

(58) Field of Classification Search
CPC ........... G06Q 30/0204; G06Q 30/0201; G06Q 30/0202; G06Q 30/0251; G06N 20/00
See application file for complete search history.

(56) References Cited

U.S. PATENT DOCUMENTS 9,087,035 B1 * 7/2015 Bandaru ............... G06F 40/186
2012/0290399 A1 * 11/2012 England ................. G06Q 50/01
705/14.66
(Continued)

OTHER PUBLICATIONS

"Web Optimization by A/B testing tool, Adobe Target" (Habib, Shuvo; published on Oct. 18, 2018 at https://shuvohabib.medium.com/web-optimization-by-a-b-testing-tool-adobe-target-e15bde4c54c6) (Year: 2018).*

(Continued)

*Primary Examiner* — James M Detweiler
(74) *Attorney, Agent, or Firm* — Keller Preece PLLC

(57) ABSTRACT

The present disclosure relates to systems, non-transitory computer-readable media, and methods that utilize a dynamic user interface and machine learning tools to generate data-driven digital content and multivariate testing recommendations for distributing digital content across computer networks. In particular, in one or more embodiments, the disclosed systems utilize machine learning models to generate digital recommendations at multiple development stages of digital communications that are targeted on particular performance metrics. For example, the disclosed systems utilize historical information and recipient profile data to generate recommendations for digital communication templates, fragment variants of content fragments, and content variants of digital content items. Ultimately, the disclosed systems generate multivariate testing recommendations incorporating selected fragment variants to intelligently narrow multivariate testing candidates and generate more meaningful and statistically significant multivariate testing results.

20 Claims, 30 Drawing Sheets

(51) Int. Cl.

| | |
|---|---|
| *G06N 3/044* | (2023.01) |
| *G06N 3/08* | (2023.01) |
| *H04L 43/50* | (2022.01) |

(56) References Cited

U.S. PATENT DOCUMENTS

| | | | |
|---|---|---|---|
| 2019/0080347 A1* | 3/2019 | Smith ................ | G06Q 30/0269 |
| 2019/0095945 A1* | 3/2019 | Fabbri ................ | G06Q 30/0244 |
| 2020/0021873 A1* | 1/2020 | Swaminathan .......... | G06N 3/09 |
| 2020/0364769 A1 | 11/2020 | Yu et al. | |
| 2021/0157974 A1* | 5/2021 | Xie ......................... | H04L 51/52 |
| 2021/0365962 A1* | 11/2021 | Tolentino ............... | G06N 20/00 |
| 2022/0405808 A1* | 12/2022 | Khoury ................. | G06F 16/951 |

OTHER PUBLICATIONS

Tong Yu, Yilin Shen, Hongxia Jin; "A Visual Dialog Augmented Interactive Recommender System"; Published 2019; Computer Science; Proceedings of the 25th ACM SIGKDD International Conference on Knowledge Discovery & Data Mining; https://www.semanticscholar.org/paper/A-Visual-Dialog-Augmented-Interactive-Recommender-Yu-Shen/78b25ca3f02d1abe1fa5440d02dd5fa82c8dfa3c.

Aleksandr Chuklin, Ilya Markov, and Maarten de Rijke. Click models for web search. Synthesis Lectures on Information Concepts, Retrieval, and Services, 7(3):1-115, 2015.

H. Cai, V. Zheng and K. Chang, "A Comprehensive Survey of Graph Embedding: Problems, Techniques, and Applications" in IEEE Transactions on Knowledge & Data Engineering, vol. 30, No. 09, pp. 1616-1637, 2018. doi: 10.1109/TKDE.2018.2807452; https://doi.ieeecomputersociety.org/10.1109/TKDE.2018.2807452.

Khamisani, Vaqar and Rubinstein, James and Costantino, Mark and Corney, Steve, AI-Driven Search A/B Testing: The Next Evolutionary Leap (Jan. 29, 2020). Proceedings of the 3rd Annual RELX Search Summit, Available at SSRN: https://ssrn.com/abstract=3527356.

Miikkulainen, R., Iscoe, N., Shagrin, A., Rapp, R., Nazari, S., McGrath, P., Schoolland, C., Achkar, E., Brundage, M., Miller, J., Epstein, J., & Lamba, G. (2018). Sentient Ascend: AI-Based Massively Multivariate Conversion Rate Optimization. Proceedings of the AAAI Conference on Artificial Intelligence, 32(1). Retrieved from https://ojs.aaai.org/index.php/AAAI/article/view/11387.

Michael Brenner; "Why AI is better than A/B Testing"; Nov. 1, 2018; https://www.concured.com/blog/why-ai-is-better-than-a/b-testing.

Paras Chopra; "Key Differences Between Multivariate Testing (MVT) & A/B Testing"; Apr. 6, 2021; https://vwo.com/blog/difference-ab-testing-multivariate-testing/.

Hill, D et al.; "An Efficient Bandit Algorithm for Realtime Multivariate Optimization"; KDD '17: Proceedings of the 23rd ACM SIGKDD International Conference on Knowledge Discovery and Data Mining; Aug. 2017; pp. 1813-1821; https://doi.org/10.1145/3097983.3098184.

Weicong, D. et al.; "Whole p. Optimization with Global Constraints"; KDD '19: Proceedings of the 25th ACM SIGKDD International Conference on Knowledge Discovery & Data Mining; Jul. 2019; pp. 3153-3161https://doi.org/10.1145/3292500.3330675.

Shuai, L. et al. "Offline Evaluation of Ranking Policies with Click Models"; KDD '18: Proceedings of the 24th ACM SIGKDD International Conference on Knowledge Discovery & Data Mining; Jul. 2018; pp. 1685-1694; https://doi.org/10.1145/3219819.3220028.

Lopez, R. et al.; "Learning from extreme Bandit Feedback"; 2020; arXiv:2009.12947v2.

* cited by examiner

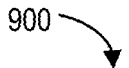

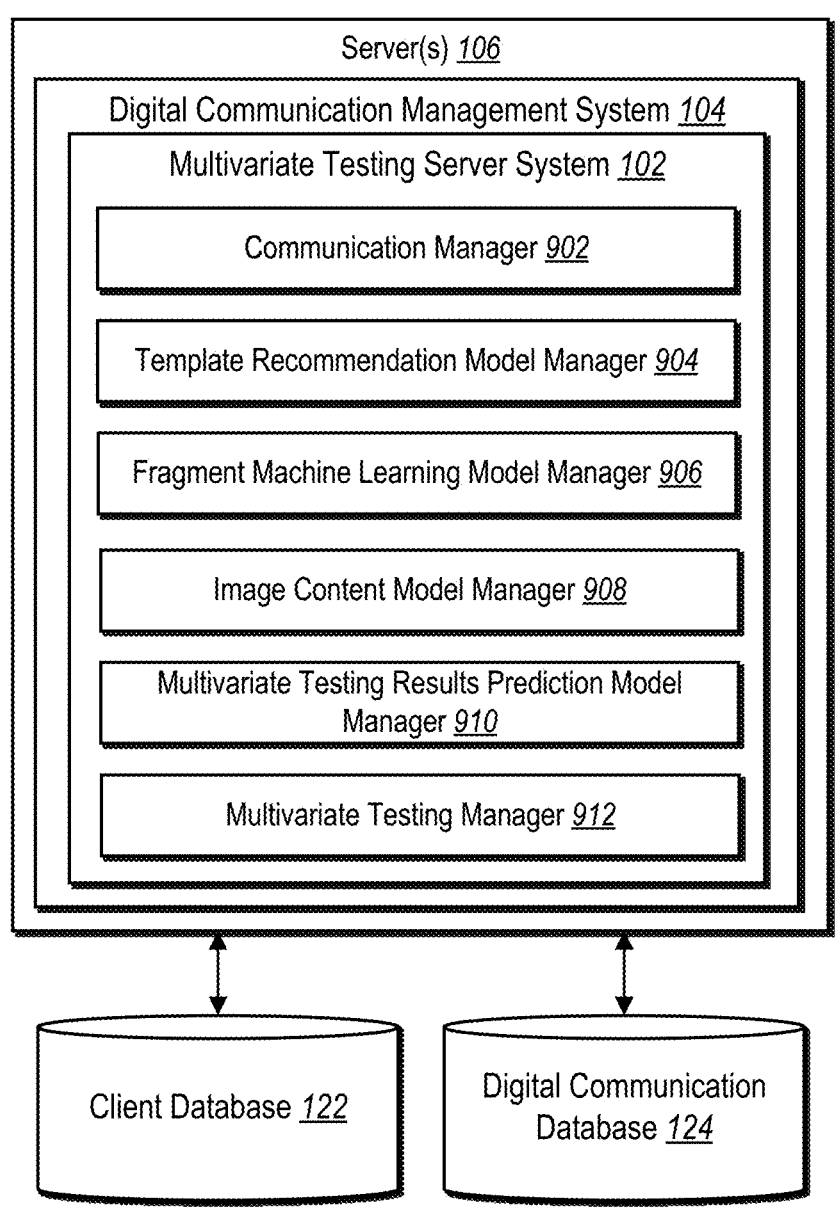

Server(s) *106*

Digital Communication Management System *104*

Multivariate Testing Server System *102*

Communication Manager *902*

Template Recommendation Model Manager *904*

Fragment Machine Learning Model Manager *906*

Image Content Model Manager *908*

Multivariate Testing Results Prediction Model Manager *910*

Multivariate Testing Manager *912*

Client Database *122*

Digital Communication Database *124*

*Fig. 9*

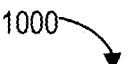

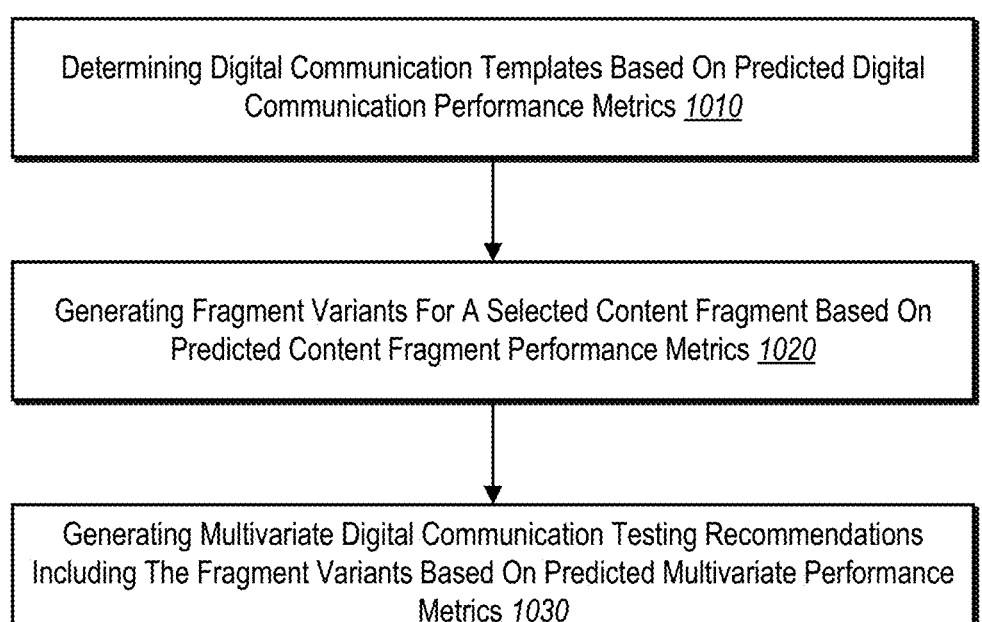

Determining Digital Communication Templates Based On Predicted Digital Communication Performance Metrics *1010*

Generating Fragment Variants For A Selected Content Fragment Based On Predicted Content Fragment Performance Metrics *1020*

Generating Multivariate Digital Communication Testing Recommendations Including The Fragment Variants Based On Predicted Multivariate Performance Metrics *1030*

*Fig. 10*

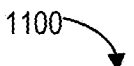

1100

Generating A Feature Vector Utilizing An LSTM Layer From A Historical Sequence Of Fragment Variants Of A Content Fragment *1110*

Generating A Predicted Content Fragment Performance Metric From The Feature Vector Utilizing An Examination Node, An Edge, And A Reward Node Of The Graphical Model *1120*

Determining A Fragment Variant Of The Content Fragment Corresponding To The Digital Communication Utilizing The Predicted Content Fragment Performance Metric *1130*

*Fig. 11*

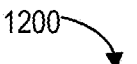

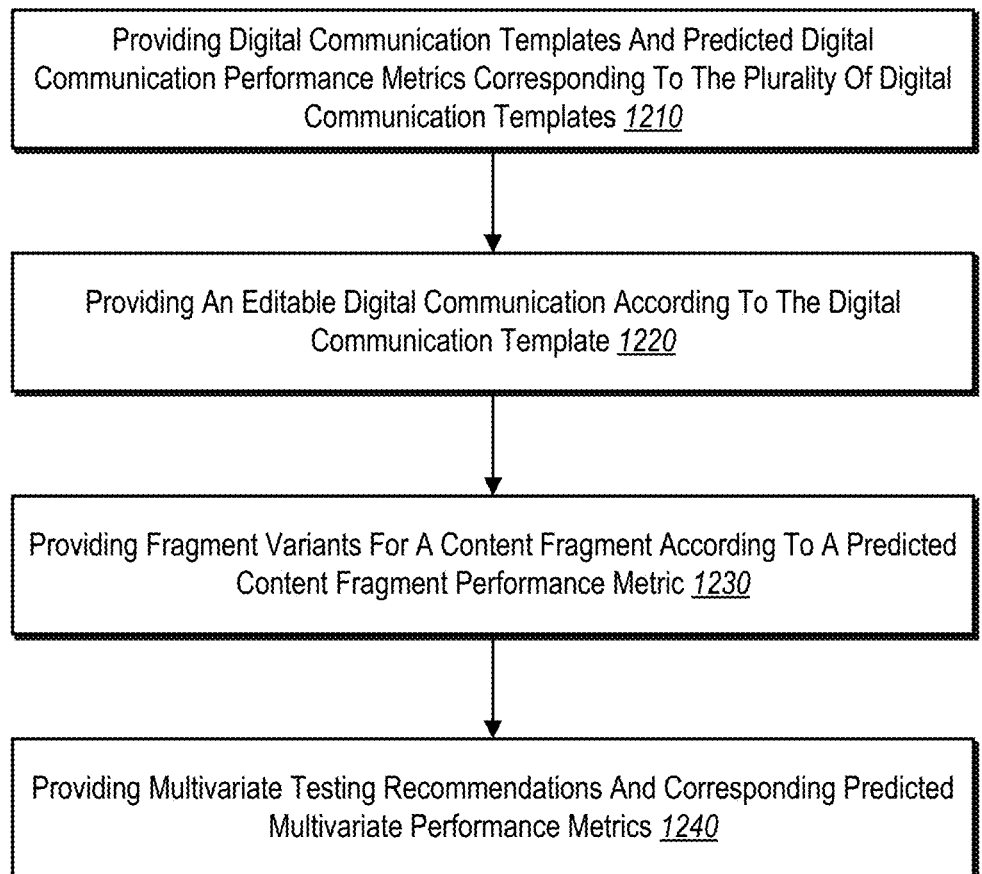

1200

Providing Digital Communication Templates And Predicted Digital Communication Performance Metrics Corresponding To The Plurality Of Digital Communication Templates *1210*

Providing An Editable Digital Communication According To The Digital Communication Template *1220*

Providing Fragment Variants For A Content Fragment According To A Predicted Content Fragment Performance Metric *1230*

Providing Multivariate Testing Recommendations And Corresponding Predicted Multivariate Performance Metrics *1240*

*Fig. 12*

DYNAMIC USER INTERFACE AND MACHINE LEARNING TOOLS FOR GENERATING DIGITAL CONTENT AND MULTIVARIATE TESTING RECOMMENDATIONS

BACKGROUND

Recent years have seen significant improvements in hardware and software platforms for generating and distributing targeted digital communications across computer networks. For example, conventional systems can provide a variety of digital content and formatting selections that allow distribution devices to configure digital communications for distribution to various target client devices. To illustrate, conventional systems often provide an overwhelming variety of digital images and other media, fonts, and formatting options that a distribution device can configure into a digital communication for distribution to client devices. Once digital communications are configured utilizing selections from the available digital content, conventional systems also provide methods for testing the effectiveness of those digital communications. For example, conventional systems can monitor interactions from client devices to determine performance data associated with digital communications and provide analytical insights regarding the effectiveness of the digital communications.

Although conventional systems can analyze the performance of versions digital communications, such systems have a number of problems in relation to accuracy, efficiency, and flexibility of operation. For instance, conventional systems often generate inaccurate or incomplete testing in connection with distributed digital communications. Specifically, when a digital communication campaign includes many potential versions of a digital communication, conventional systems test the potential versions of the digital communication. For instance, conventional systems generally split a recipient audience across potential digital communication versions, and then attempt to collect meaningful analytical data for each digital communication version. This is problematic, however, when the recipient audience segments are small due to a high number of potential digital communication versions—such as when there are multiple variable changes among each of the potential digital communication version. The ensuing performance test results provided by conventional systems are often inaccurate because they are limited to the actions of insignificant audience segments associated with each of the high number of digital communication versions.

Conventional systems are also often rigid and inflexible. For example, some conventional systems utilize a bandit algorithm to select a combination of elements for a digital communication over time. This approach, however, generally focuses on a rigid reward associated with a particular content item. By focusing primarily on this reward, conventional systems fail to consider a variety of additional features or factors, such as spatial and temporal indicators, that significantly impact performance of distributed digital content.

Additionally, conventional systems are inefficient. For example, as just discussed, conventional systems conduct digital performance analyses regarding a wide array of potential digital communication versions. This approach results in a significant expenditure of computing resources. For instance, some conventional systems require a significant number of user interface interactions to train models and/or select digital content. Moreover, conventional systems tems further waste vast amounts of computing resources (e.g., display resources, memory resources, processing resources, network resources) performing performance testing of high numbers of digital communication versions.

These along with additional problems and issues exist with regard to conventional systems.

BRIEF SUMMARY

One or more embodiments described herein provide benefits and/or solve one or more of the foregoing or other problems in the art with systems, methods, and non-transitory computer-readable media that utilize a dynamic user interface and machine learning tools to generate data-driven digital content and multivariate testing recommendations for distributing digital content across computer networks. For example, the disclosed systems intelligently analyze the performance of historical digital communications utilizing a variety of machine learning models to generate recommendations at multiple stages of digital communication development and multivariate testing.

To illustrate, the disclosed systems generate data-driven performance metrics in connection with digital communication templates to recommend specific templates for selection of digital content. The disclosed systems further utilize an HTML content machine learning model to generate internal design fragment content and recommendations based on a combination of historical digital communication performance data and design relevance. This fragment machine learning model can utilize a unique architecture that includes an LSTM model and graphical model to flexibly consider spatial and temporal dependencies and further improve accuracy in selecting digital content for distribution and/or testing.

The disclosed systems can further utilize an image content machine learning model to generate external content item recommendations (e.g., external digital images) for multivariate testing based on a combination of historical digital communication performance data and content relevance. Moreover, in one or more embodiments the disclosed systems utilize a multivariate prediction machine learning model to intelligently generate a limited number of recommendations for multivariate testing—thus reducing computer resources while improving accuracy and significance of testing results. The disclosed systems can also flexibly consider feedback through live experiments across multiple iterations to identify improved digital content for distribution to client devices.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 9 illustrates a schematic diagram of a multivariate testing system in accordance with one or more embodiments.

FIG. 10 illustrates a flowchart of a series of acts for identifying a set of digital communication variants for multivariate texting across a plurality of computing devices in accordance with one or more embodiments.

FIG. 11 illustrates a flowchart of a series of acts for identifying a set of digital communication variants for multivariate testing across a plurality of computing devices in connection with determining a fragment variant for a content fragment of a digital communication template in accordance with one or more embodiments.

FIG. 12 illustrates a flowchart of a series of acts for providing multivariate testing recommendations for display in accordance with one or more embodiments.

DETAILED DESCRIPTION

Figure 1:
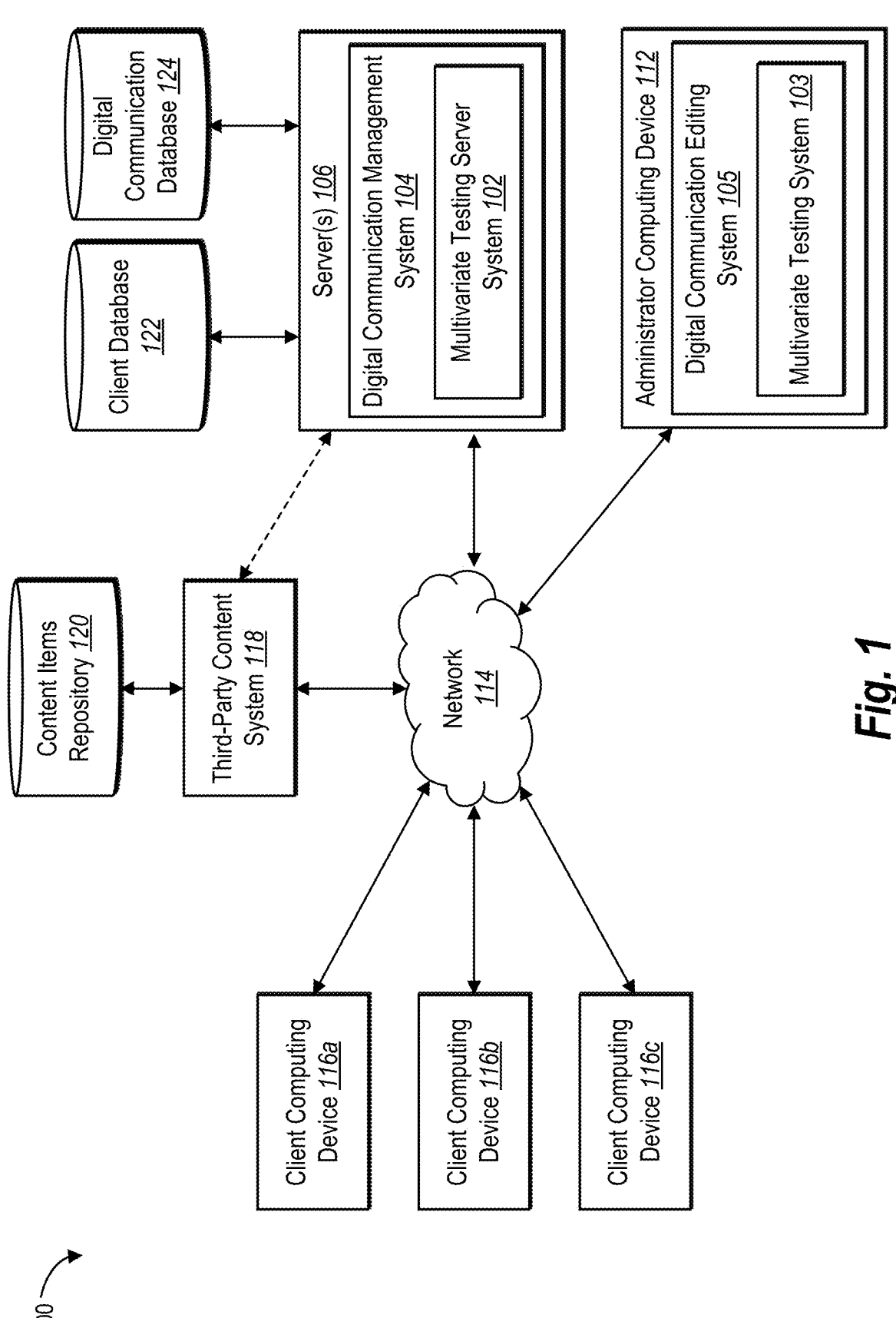
FIG. 1 illustrates a diagram of an environment in which a multivariate testing system can operate in accordance with one or more embodiments.

This disclosure describes one or more embodiments of a multivariate testing system that utilizes a dynamic user interface and machine learning tools for generating data-drive digital content and performing multivariate testing across an audience of computing devices. More specifically, the multivariate testing system generates data-driven recommendations at multiple points during digital communication development to enable efficient and accurate multivariate testing of a limited number of digital communication variants. For example, the multivariate testing system generates recommendations during digital communication development that are informed by predicted performance metrics generated by various machine learning models trained from historical performance data associated with previous related digital communications. The multivariate testing system further generates multivariate testing recommendations that are targeted to digital communications most likely to perform more efficiently and accurately relative to one or more performance metrics. Accordingly, the multivariate testing system avoids the pitfalls of conventional systems by generating focused multivariate digital communication test recommendations that improve efficiency by reducing wasted user interface interactions and distribution/testing resources, that improve flexibility by utilizing machine learning models that consider a variety of different factors (including temporal and spatial dependencies), and that improve the accuracy of selected digital content for distribution to client devices.

In more detail, the multivariate testing system generates recommendations at multiple stages across the development of a digital communication in order to perform focused and targeted multivariate testing in connection with the digital communication. For example, the multivariate testing system generates digital communication template recommendations that correspond to desired performance metrics across specific groups of recipient devices. In one or more embodiments, the multivariate testing system receives user-selected parameters including digital communication type or category, desired performance metrics (e.g., click-through rate, conversion rate), and/or target profile parameters (e.g., age, gender). In at least one embodiment, the multivariate testing system utilizes a template recommendation model to generate digital communication templates from the user-selected parameters in connection with historical performance data associated with previous digital communications.

For instance, the multivariate testing system utilizes the template recommendation model to generate predicted digital communication performance metrics for categories of digital communication templates from the historical performance data. In one or more embodiments, the multivariate testing system provides digital communication templates for display along with performance metric indicators that illustrate the predicted digital communication performance metrics for each digital communication template. Thus, the multivariate testing system guides selection of a digital communication template with favorable predicted digital communication performance metrics.

The multivariate testing system further generates additional data-driven recommendations during development of a digital communication. For example, following a detected selection of a recommended digital communication template, the multivariate testing system generates fragment variants for a content fragment within the digital communication template. To illustrate, in at least one embodiment, the digital communication template is an HTML document with multiple partitions or content fragments, where each content fragment includes one or more content items such as text, media items, and formatting (e.g., HTML tags that structure the contents of the content fragment). To further increase efficiency and accuracy, the multivariate testing system utilizes a fragment machine learning model to generate fragment variants for the particular content fragment.

For instance, the multivariate testing system utilizes the fragment machine learning model to generate fragment variants for the content fragment that include combinations of content items based on one or more predicted content item interaction performance metrics. In one or more embodiments, the multivariate testing system trains the fragment machine learning model on historical performance data associated with previous digital communications to predict how well specific fragment variants will perform in connection with other content fragments in the currently active digital communication template. Thus, the multivariate testing system provides, for display in connection with the digital communication template, a subset of fragment variants along with performance metric indicators illustrating how well those fragment variants are expected to perform upon distribution to client devices.

The multivariate testing system also generates recommendations relative to specific digital content items. For example, as mentioned above, the multivariate testing system utilizes an image content machine learning model to generate recommended digital images for a fragment. To illustrate, the multivariate testing system determines one or more descriptors for the digital content item and then utilizes the image content machine learning model to determine similar digital images that correspond to the one or more descriptors. The multivariate testing system further narrows the set of digital content variants by determining one or more predicted digital content performance metrics associated with the digital content variants.

In one or more embodiments, the multivariate testing system additionally generates multivariate testing recommendations. For example, the multivariate testing system utilizes a multivariate testing results prediction model to generate predicted multivariate performance metrics for candidate digital communications (including one or more selected fragment variants within an associate digital communication template). The multivariate testing system then provides for display the multivariate testing recommendations corresponding to the variations of the digital communication template based on the selected fragment variants. For example, the multivariate testing system provides the multivariate testing recommendation in a display that also includes performance metric indicators illustrating the predicted multivariate performance metrics associated with each multivariate digital communication test recommendation.

In response to detected selections of some or all of the multivariate testing recommendations, the multivariate testing system conducts or performs a multivariate test of digital communications corresponding to the selected multivariate testing recommendations. In one or more embodiments, the multivariate testing system collects results of the multivariate test to further inform the ultimate selection of a final digital communication to send to a targeted group of client devices. Additionally, the multivariate testing system utilizes the results of the multivariate test to train one or more models within the overall digital communication development architecture to further increase the accuracy of future digital communication recommendations.

As mentioned above, conventional systems suffer from a number of disadvantages with regard to accuracy, flexibility, and efficiency of implementing computer systems. The multivariate testing system can improve these various technical deficiencies. For example, the multivariate testing system can increase the accuracy of multivariate testing associated with variants of a digital communication by intelligently providing data-driven recommendations at multiple stages along the development pipeline associated with the digital communication. For example, as discussed above, the multivariate testing system generates recommendations for digital communication templates, fragment variants, digital content variants, and candidate digital communications for multivariate testing. In one or more embodiments, the multivariate testing system generates these recommendations by analyzing historical performance utilizing various machine learning models relative to one or more performance metrics to predict templates, fragment variants, digital content variants, and candidate digital communications. Thus, rather than testing all or a large number of possible instantiations of a digital communication in a multivariate test, the multivariate testing system can generate multivariate testing recommendations that are targeted to highest performing templates and content. This, in turn, leads to more accurate and statistically significant multivariate testing results.

The multivariate testing system can also improve flexibility relative to conventional systems. For example, in one or more embodiments, the multivariate testing system considers a variety of additional features and inter-dependencies in selecting digital content and performing multivariate testing. To illustrate, the multivariate testing system utilizes a fragment machine learning model that includes an LSTM model and graphical model with nodes modeling items selected and items viewed at individual client devices. Thus, the multivariate testing system can model spatial dependencies between elements and what portions of a digital content item are actually viewed/displayed on a client device. Moreover, the multivariate testing system can model temporal dependencies between two consecutive sessions by a client device or user.

The multivariate testing system can also improve computational efficiency. For example, by focusing on particular templates, variants, and multivariate testing recommendations based on performance metrics, the multivariate testing system can significantly reduce user interactions in selecting digital content and identifying pertinent digital content variants to pursue. In addition, by focusing on particular multivariate testing recommendations, the multivariate testing system can significantly reduce digital content variants and the computing resources needed to conduct multivariate testing.

As illustrated by the foregoing discussion, the present disclosure utilizes a variety of terms to describe features and advantages of the multivariate testing system. Additional detail is now provided regarding the meaning of such terms. As used herein, the term "multivariate testing" refers to computer-implemented testing of the performance of multiple (e.g., three or more) variations of an object (e.g., a digital communication). In one or more embodiments, multivariate testing seeks to improve performance by selecting a combination of variables corresponding to a digital communication. For example, if an object includes a first element (with a first set of variations) and a second element (with a second set of variations), the multivariate test of the object conventionally includes a total number of testing variations equal to a number of variations of the first element multiplied by a number of variations of the second element. As used herein, "multivariate test performance metrics" refers to actual or predicted performance results of a multivariate test.

As used herein, the term "digital communication" refers to a file, electronic file, or digital data packet. For example, in one or more embodiments, a digital communication includes an electronic mail (e.g., an email). The term digital communication can also include an SMS text message or a communication platform digital message (e.g., a chat thread message). In at least one embodiment, a digital communication includes a framework that dictates the placement of content within the digital communication.

For example, a digital communication is often generated from a digital communication template. In one or more embodiments, a digital communication template is a model or framework (e.g., HTML framework) that indicates or proposed the placement and appearance (e.g., size, color) of digital communication contents within a digital communication. For example, a digital communication template can comprise a set fields, fragments, or elements that can be edited or modified (e.g., to generate a digital communication for transmission to client devices). A digital communication template may include the contents and formatting of a previously sent digital communication, but in a format that enables editing. In at least one embodiment, "digital communication contents" refer to content held within the framework of a digital communication. For instance, digital communication contents include one or more of digital text, digital images, digital media, fonts, and other digital display objects.

As used herein, the term "content fragment" refers to a design segment or element within a digital communication and/or digital communication template. For example, in one or more embodiments, a content fragment includes HTML elements or tags within a digital communication. To illustrate, a content fragment can include HTML elements or tags with defined formatting and/or style choices within a larger digital communication. Thus, in one or more embodiments, a digital communication template includes multiple content fragments, each with individual formatting and layouts.

As used herein, the term "digital content item" refers to a digital object (e.g., digital media or text) included within a digital communication or digital communication template. For instance, a digital content item can include a digital media item or digital text within a content fragment of a digital communication template. In one or more embodiments, a digital content item includes a block of text, a digital image, a digital video, or a hyperlink (or hyperlinked text, image, or video) within a content fragment of a digital communication.

As used herein, the term "fragment variant" refers to a generated variation of a content fragment. For example, in one or more embodiments, a fragment variant includes the same digital content items as the content fragment but in a different layout. In some implementations, a fragment variant includes a content fragment with a different digital content item. For example, a fragment variant can include one or more digital content items from a different content fragment (e.g., a from a previously sent communication). In yet further embodiments, a fragment variant includes some of the same digital content items from the content fragment in combination with different digital content items in the same or in a different layout. In yet further embodiments, a fragment variant includes one or more new digital content items and/or content fragments (e.g., not included in a previously sent communication). Additionally or alternatively, a fragment variant includes the same or different digital content items in a content fragment in different sizes, fonts, colors, etc. in the same or in a different layout.

As used herein, the term "digital content variant" refers to an identified variation of a digital content item. For example, in one or more embodiments, a digital content variant of a digital image includes a related digital image. For instance, a digital content variant can be related to a digital content item based on similar descriptors (e.g., descriptive keywords), metadata, and/or visual analysis.

As used herein, the term "digital communication variant" (sometimes "candidate digital communication") refers to a variation of a digital communication generated based on one or more selected fragment variants. For example, in one or more embodiments, a digital communication variant of a digital communication includes one or more content fragments and one or more selected fragment variants. As discussed further below, the disclosed systems generate digital communication variants or candidate digital communications based on selected multivariate testing recommendations, and sends the digital communication variants or candidate digital communications to segments of recipient client device during a multivariate test.

As used herein, the term "predicted performance metric" refers to a forecasted measurement of performance. More specifically, a predicted performance metric refers to a likely measurement of performance relative to a digital communication, a digital communication template, a digital content item, and/or a multivariate testing recommendation. For example, a "predicted digital communication performance metric" refers to a predicted measurement of performance of a digital communication template.

In one or more embodiments, predicted performance metrics refer to specific types of predicted performance. For example, in one or more embodiments, predicted performance metrics reflect click-throughs, page-lands, conversions, and/or content fatigue. Additionally, in one or more embodiments, some predicted performance metrics reflect how a digital communication recipient likely receives and consumes a digital communication.

As used herein, a "machine learning model" includes a model with one or more processes and/or parameters that can be tuned (e.g., trained) based on inputs to approximate unknown functions. In particular, the term machine learning model learns to approximate complex functions and generate outputs based on inputs provided to the model. The machine learning model includes, for example, linear regression, logistic regression, decision trees, naïve Bayes, k-nearest neighbor, neural networks, long-short term memory, random forests, gradient boosting models, deep learning architectures, classifiers, or a combination of the foregoing.

As just mentioned, a machine learning model can include deep learning architectures such as a neural network model. As used herein, the term "neural network" refers to a model of interconnected artificial neurons (or layers) that communicate and learn to approximate complex functions and generate outputs based on a plurality of inputs provided to the model. In particular, a neural network includes a computer-implemented algorithm that implements deep learning techniques to analyzes input to make predictions and that improves in accuracy by comparing generated predictions against ground truth data and modifying internal parameters for subsequent predictions. In some embodiments, a neural network can employ supervised learning, while in other embodiments a neural network can employ unsupervised learning or reinforced learning. Examples of neural networks include deep convolutional neural networks, generative adversarial neural networks, and recurrent neural networks.

A recurrent neural network refers to a type of neural network that performs analytical tasks on sequential elements and analyzes individual elements based on computations (e.g., latent feature vectors) from other elements. For example, a recurrent neural network includes an artificial neural network that uses sequential information associated with digital communication, and in which an output of a layer analyzing a digital communication is dependent on computations (e.g., latent feature vectors) for previous digital communications.

Furthermore, as used herein, a long short-term memory neural network or LSTM neural network (e.g., an "LSTM layer") refers to a type of recurrent neural network capable of learning long-term dependencies in sequential information. Specifically, an LSTM neural network can include a plurality of layers that interact with each other to retain additional information between LSTM units (e.g., long short-term memory units that are layers of the neural network for analyzing each sequential input, such as each word)

of the network in connection with a state for each LSTM unit. An LSTM state refers to a component of each LSTM unit that includes long-term information from previous LSTM units of the LSTM neural network. The LSTM neural network can update the LSTM state for each LSTM unit (e.g., during an update stage) by using the plurality of layers to determine which information to retain and which information to forget from previous LSTM units. The LSTM state of each LSTM unit thus influences the information that is retained from one LSTM unit to the next to form long-term dependencies across a plurality of LSTM units.

Additional detail regarding the multivariate testing system will now be provided with reference to the figures. For example, FIG. 1 illustrates a schematic diagram of an example system environment 100 (e.g., the "environment" 100) for implementing a multivariate testing system 103 in accordance with one or more embodiments. Thereafter, a more detailed description of the components and processes of the multivariate testing system 103 is provided in relation to the subsequent figures.

As shown in FIG. 1, the environment 100 includes server(s) 106, a third-party content system 118, an administrator computing device 112, client computing devices 116a-116c, and a network 114. Each of the components of the environment 100 communicate via the network 114, and the network 114 may be any suitable network over which computing devices communicate. Example networks are discussed in more detail below in relation to FIG. 13.

As mentioned, the environment 100 includes the client computing devices 116a, 116b, and 116c, and the administrator computing device 112. The client computing devices 116a-116c, and the administrator computing device 112 include one of a variety of computing devices, including a smartphone, tablet, smart television, desktop computer, laptop computer, virtual reality device, augmented reality device, or other computing device as described in relation to FIG. 13. In one or more embodiments, the client computing devices 116a-116c are associated with recipients of digital communications, while the administrator computing device 112 is associated with an administrative-level user who interacts with the multivariate testing system 103 to configure digital communications. Although FIG. 1 illustrates a number of client computing devices 116a-116c, and the administrator computing device 112, in some embodiments, the environment 100 includes multiple different computing devices, each associated with the same or other components of the environment 100.

As illustrated in FIG. 1, the environment 100 includes the third-party content system 118. In one or more embodiments, the third-party content system 118 receives requests for content items, queries a content items repository 120 for the requested content items, and provides query results. For example, the third-party content system 118 receives requests for, and provides, content items including digital images, digital videos, and other digital design items.

As illustrated in FIG. 1, the environment 100 includes the server(s) 106. The server(s) 106 may include one or more individual servers that may generate, store, receive, analyze, and transmit electronic data. For example, the server(s) 106 may include a digital communication management system 104, which in turn implements the multivariate testing server system 102. In one or more embodiments, the digital communication management system 104 provides interfaces and digital content for generating digital communications and digital communication campaigns. The digital communication management system 104 further manages distribution of digital communications and digital communication campaigns (e.g., to the client computing devices 116a-116c), and receives and analyzes performance data associated with distributed digital communications and digital communication campaigns (e.g., from or in association with the client computing device 116a-116c).

As further illustrated in FIG. 1, the digital communication management system 104 implements the multivariate testing server system 102. In one or more embodiments, the multivariate testing server system 102 generates data-driven recommendations at multiple stages in the development cycle of a digital communication to generate statistically significant and meaningful multivariate testing results associated with the digital communication. In one or more embodiments, the multivariate testing server system 102 utilizes data from a client database 122 and/or a digital communication database 124 in generating one or more recommendations in connection with a digital communication. As will be discussed in greater detail below, the multivariate testing server system 102 generates recommendations utilizing multiple computer models in response to detected interactions (e.g., detected on one or more displays of the administrator computing device 112) within one or more user interfaces provided by the digital communication management system 104.

As further shown in FIG. 1, the administrator computing device 112 implements a digital communication editing system 105. In one or more embodiments, the digital communication editing system 105 is associated with the digital communication management system 104 and provides user interfaces and other functionality for use in configuring digital communications. Additionally, the digital communication editing system 105 implements a multivariate testing system 103. For example, in one or more implementations, the multivariate testing system 103 represents and/or provides similar functionality as described herein in connection with the multivariate testing server system 102. In some implementations, the multivariate testing server system 102 supports the multivariate testing system 103 on the administrator computing device 112. Indeed, in one or more implementations, the server(s) 106 includes all, or a portion of, the multivariate testing system 103. Additionally or alternatively, in some implementations, the administrator computing device 112 includes all, or a portion of the multivariate testing server system 102. Thus, as discussed herein, the features and functionality of the multivariate testing system 103 apply in whole or in part to the multivariate testing server system 102. In some implementations, the multivariate testing server system 102 includes a web hosting application that allows the administrator computing device 112 to interact with content and services hosted on the server(s) 106. To illustrate, in one or more implementations, the administrator computing device 112 accesses a web page supported by the server(s) 106.

Although FIG. 1 illustrates the components of the environment 100 connected in a specific way, other embodiments are possible. For example, in one embodiment, the digital communication management system 104 receives digital content items directly from the third-party content system 118 (indicated by the dotted line). Additionally or alternatively, in one embodiment, the third-party content system 118 is implemented on the server(s) 106 along with the digital communication management system 104. Similarly, while FIG. 1 illustrates a given number of servers, systems, and client computing devices, in additional or alternative embodiments the functionality of the components of the environment 100 is implemented by any number of servers, systems, and client computing devices.

Figure 2:
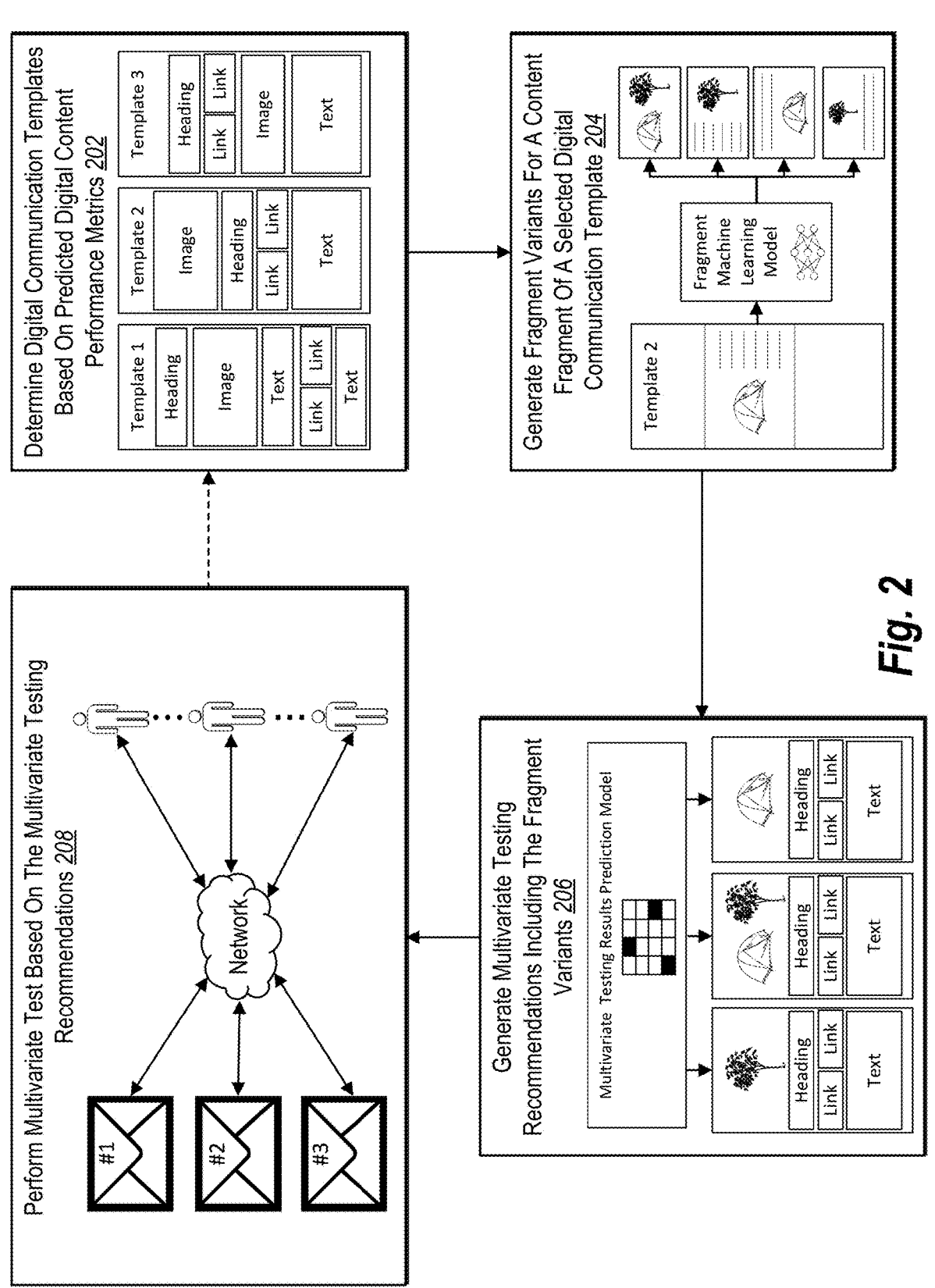
FIG. 2 illustrates an overview schematic of the multivariate testing system generating multivariate testing recommendations in accordance with one or more embodiments.

As mentioned above, the multivariate testing system 103 identifies a set of candidate digital communications or digital communication variants for multivariate testing across a plurality of computing devices (e.g., the client computing devices 116a-116c) by generating recommendations at various stages during development of the digital communication. FIG. 2 illustrates an overview of the multivariate testing system 103 generating recommendations and performing a multivariate test based on the recommendations. For example, in one or more embodiments, the multivariate testing system 103 generates performance-based recommendations for selecting a digital communication template, and for replacing one or more content fragments of the template with fragment variants. Moreover, the multivariate testing system 103 generates multivariate testing recommendations for the digital communication by incorporating selected fragment variants and performs a multivariate test based on selected multivariate testing recommendations. In at least one embodiment, the multivariate testing system 103 further collects multivariate testing results and uses these results in connection with the one or more computer models to further learn how client computing devices interact with and respond to digital communications.

In more detail, and as shown in FIG. 2, the multivariate testing system 103 performs an act 202 of determining digital communication templates based on predicted digital content performance metrics. For example, in one or more embodiment, the multivariate testing system 103 guides the selection of a digital communication template for a digital communication by generating predicted digital communication performance metrics for multiple digital communication templates. To illustrate, in response to detected selections of specific performance metrics (e.g., click-throughs, conversion), the multivariate testing system 103 generates predicted digital content performance metrics for digital communication templates stored in the digital communication databased 124 and relative to the selected performance metrics. The multivariate testing system 103 then provides one or more digital communication templates for selection that are associated with favorable predicted digital content performance metrics.

In one or more embodiments, the multivariate testing system 103 provides a selected digital communication template for further editing via one or more user interfaces of the digital communication management system 104. In response to various selections and interactions via tools and options, the digital communication management system 104 adds and modifies content within a digital communication incorporating the selected digital communication template.

In at least one embodiment, the multivariate testing system 103 performs an act 204 of generating fragment variants for a content fragment of a selected digital communication template. For example, in one or more embodiments and as mentioned above, the selected digital communication template includes HTML, tags formatting the digital communication into sections or content fragments. In response to a detected selection of a content fragment, the multivariate testing system 103 can utilize a fragment machine learning model to generate fragment variants for the content fragment and presents a subset of the fragment variants based on their predicted content fragment performance metrics. For instance, the multivariate testing system 103 generates and provides fragment variants associated with predicted content fragment performance metrics indicating that the fragment variants will lead to a high click-through rate, a high conversion rate, and/or a low fatigue rate.

The act 204 can also include generating recommended digital content items (e.g., digital images) for a content fragment. For example, the multivariate testing system 104 can identify an existing digital image in a content fragment and utilize an image content machine learning model to generate a recommended digital image with predicted performance metrics for the recommended digital image. In this manner, the multivariate testing system 104 can replace digital content items with alternate digital content to improve performance of the content fragment and digital communication.

The multivariate testing system 103 also performs an act 206 of generating multivariate testing recommendations including the fragment variants. For example, in one or more embodiments, the multivariate testing system 103 utilizes a multivariate testing results prediction model that incorporates historical performance information associated with previously sent digital communications to predict the performance of candidate digital communications (including the selected digital communication template in combination with one or more of the generated fragment variants). In at least one embodiment, the multivariate testing system 103 provides and ranks multivariate testing recommendations for the candidate digital communications based on predicted multivariate performance metrics.

The multivariate testing system 103 further performs an act 208 of performing a multivariate test based on the multivariate testing recommendations. For example, the multivariate testing system 103 performs the multivariate test by generating candidate digital communications that incorporate the multivariate testing recommendations, generating segments of client computing device recipients, and sending a candidate digital communication to each of the generated segments. To illustrate, in one embodiment, the multivariate testing system 103 generates candidate digital communications for each of three (or more) multivariate testing recommendations, where each candidate digital communication includes the digital communication template, content fragments, fragment variants, and content items from one of the multivariate testing recommendations. The multivariate testing system 103 then splits an audience of client devices into three (or more) segments (e.g., in a random split, or based on one or more client device characteristics), and sends the first candidate digital communication to the first segment of client devices, the second candidate digital communication to the second segment of client devices, and the third candidate digital communication to the third segment of client devices.

In at least one embodiment, the multivariate testing system 103 receives performance data resulting from sending the digital communications to the segments of client devices during the multivariate test. For example, the multivariate testing system 103 receives performance data including click-throughs, conversions, page lands, and so forth. From this performance data, the multivariate testing system 103 determines a top performing digital communication. In one or more embodiments, the multivariate testing system 103 selects the top performing digital communication to send via the digital communication management system 104 to a larger audience of client computing devices. Additionally, in one or more embodiments, the multivariate testing system 103 utilizes the multivariate test results to further train one or more computer models to be more accurate in generating additional recommendations and/or modifying the multivariate test.

Figure 3:
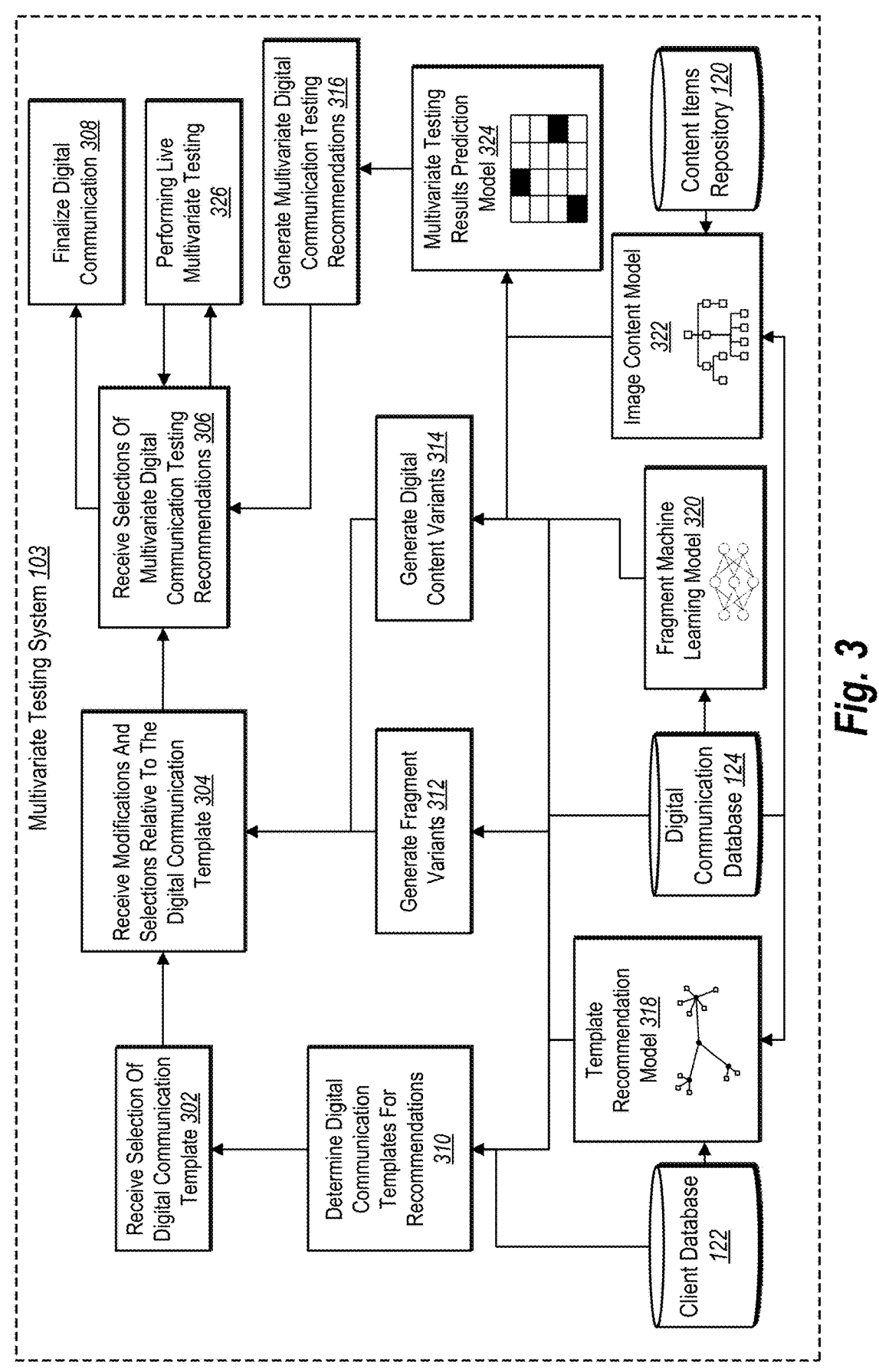
FIG. 3 illustrates a system diagram of the multivariate testing system utilizing one or more computer models to generate recommendations at various points during development of a digital communication in accordance with one or more embodiments.

As mentioned above, the multivariate testing system 103 utilizes one or more computer models in connection with repositories and databases of information to generate recommendations at various points during development of a digital communication and performing multivariate testing. FIG. 3 illustrates an architecture diagram of the multivariate testing system 103 illustrating interactions between various computer models, databases, and repositories to generate recommendations and perform multivariate testing in connection with a digital communication. For example, FIG. 3 illustrates how the multivariate testing system 103 generates recommendations and receives user selection during development of a digital communication. FIG. 3 further illustrates the multivariate testing system 103 performing targeted multivariate testing of variations of the digital communication to generate a finalized digital communication. As mentioned above, the features and functionality described herein with reference to the multivariate testing system 103 apply to the multivariate testing server system 102.

At a high level, as shown in FIG. 3, the multivariate testing system 103 performs an act 302 of receiving a selection of a digital communication template. The multivariate testing system 103 then performs an act 304 of receiving modifications and selections relative to the digital communication template as a user (e.g., the user of the administrator computing device 112) adds digital content items and text to the digital communication template. Next, the multivariate testing system 103 performs an act 306 of receiving selections of one or more multivariate testing recommendations that include the modified digital communication template and selected fragment variants. After performing live multivariate testing of the selected multivariate testing recommendations in an act 326, the multivariate testing system 103 performs an act 308 of finalizing the digital communication based on results of the multivariate test.

As mentioned above, the multivariate testing system 103 generates recommendations at each stage of digital communication development associated with the acts 302, 304, and 306. For example, the multivariate testing system 103 performs an act 310 of determining digital communication templates to recommend in guiding the user selection of a particular digital communication template. The multivariate testing system 103 then provides the determined digital communication templates within a recommendation display on the administrator computing device 112 for user selection. In response to one or more detected interactions via the recommendation display, the multivariate testing system 103 receives the selection of the digital communication template in the act 302.

In one or more embodiments, the multivariate testing system 103 determines the digital communication templates for recommendation in the act 310 utilizing a template recommendation model 318. In one or more embodiments, a "template recommendation model" refers to a model or algorithm that provides or identifies digital communication templates based on one or more criteria. A template recommendation model can include one or more heuristic models and/or one or more machine learning models (e.g., a neural network). For example, in at least one embodiment and as will be discussed in greater detail below with regard to FIG. 4, the template recommendation model 318 receives digital communication templates with historical performance information. The template recommendation model 318 then organizes the digital communication templates, and determines performance metric-driven scores for the organized digital communication templates.

In more detail, in one or more embodiments, the template recommendation model 318 groups digital communication templates from the digital communication database 124 into topic or category-based clusters, and then further organizes the clusters based on recipient client computing device information associated with the digital communication templates from the client database 122. The template recommendation model 318 then generates predicted digital communication performance metrics relative to one or more performance indicators (e.g., click-throughs, page-lands, conversions) for the digital communication templates within the organized clusters. In one or more embodiments, the multivariate testing system 103 provides the digital communication templates to the administrator computing device 112 by iteratively narrowing down to one or more digital communication templates within organized clusters based on user indications of a digital communication type, one or more performance metrics, and an audience definition.

Additionally, as shown in FIG. 3, the multivariate testing system 103 performs an act 312 of generating fragment variants of a content fragment of a selected digital communication template. For example, after providing a selected digital communication template via a display of the digital communication management system 104, the digital communication management system 104 provides tools and options for further customization of the selected digital communication template. To illustrate, the digital communication management system 104 provides tools and options that enable the administrator to add text, change images, alter formatting, and so forth. In one or more embodiments, in response to a selection of a content fragment (e.g., an HTML section) of the digital communication template, the multivariate testing system 103 generates fragment variants for the selected content fragment that are tailored to particular performance metrics.

In at least one embodiment, the multivariate testing system 103 generates the fragment variants in the act 312 utilizing a fragment machine learning model 320. As used herein, a "fragment machine learning model" refers to a machine learning model that identifies or generates content fragments based on one or more criteria. A fragment machine learning model can include a variety of machine learning models, such as a convolutional neural network, a recurrent neural network, and/or a graphical neural network. For example, in at least one embodiment and as will be discussed in greater detail below with regard to FIG. 5, the fragment machine learning model 320 generates predicted content fragment performance metrics reflecting predicted performance of fragment variants in combinations with other existing content fragments in the digital communication template. In one or more embodiments, the fragment machine learning model 320 determines the possible fragment variants based on content fragments from previously sent digital communications as stored in the digital communication database 124. Based on the generated predicted content fragment performance metrics, the multivariate testing system 103 provides one or more fragment variants for the selected content fragment along with performance metric indicators illustrating predicted content fragment performance metrics for the one or more fragment variants.

As further shown in FIG. 3, the multivariate testing system 103 performs an act 314 of generating digital content variants for one or more digital content items in the digital communication template. For example, as mentioned above, the digital communication management system 104 enables a user of the administrator computing device 112 to customize the digital communication template by adding digital content items to the digital communication template (e.g., within a content fragment or added fragment variant). In one or more embodiments, in response to a detected selection of a digital content item (e.g., a digital image), the multivariate testing system 103 generates digital content variants for the digital content item in the act 314 utilizing an image content model 322.

Figure 6:
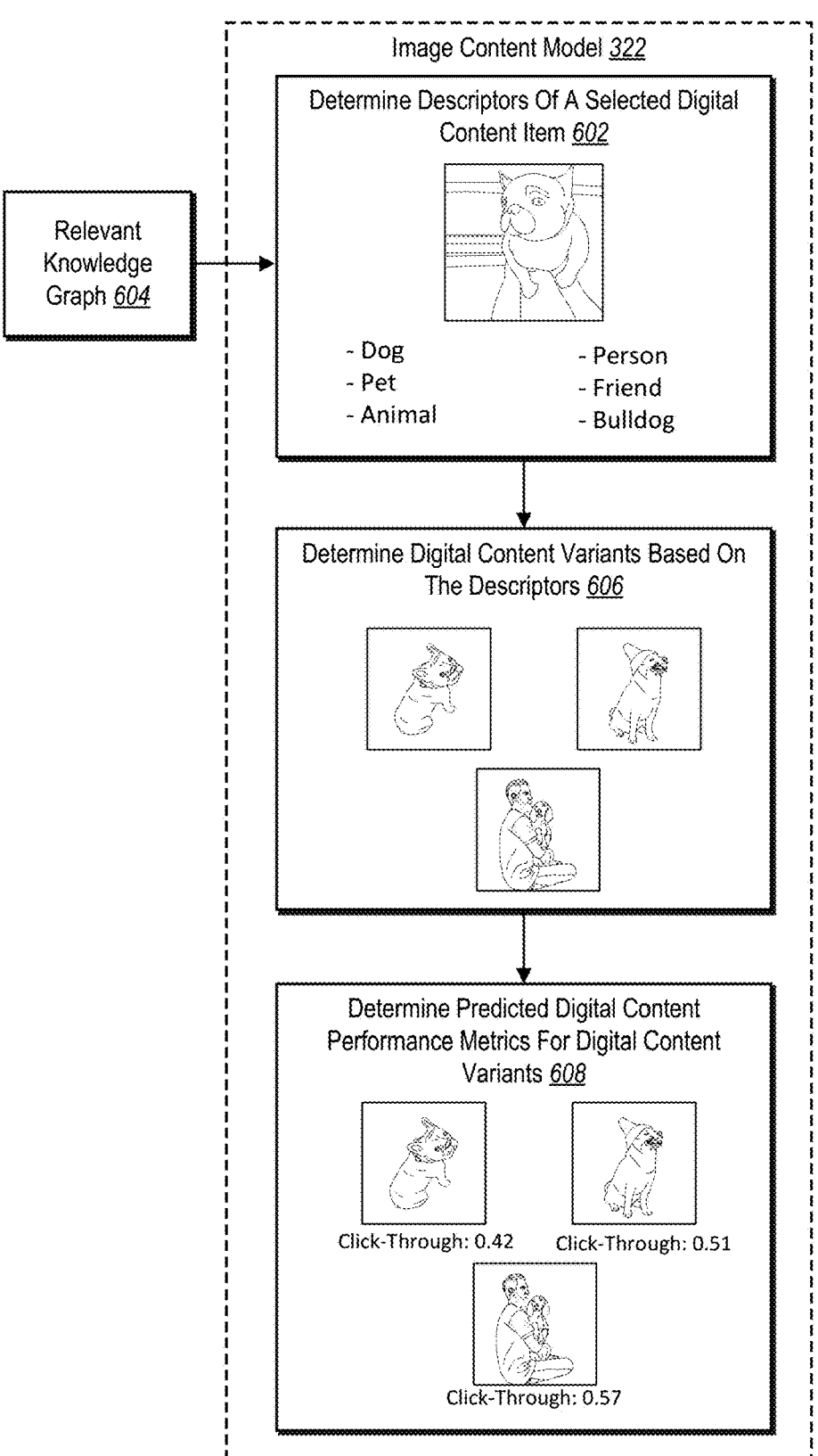
FIG. 6 illustrates a diagram of the multivariate testing system utilizing an image content model to generate digital content variants in accordance with one or more embodiments.

As used herein, an "image content model" refers to a computer-implemented algorithm that identifies one or more digital content variants for a digital content item based on one or more criteria. An image content model can be implemented as a heuristic model and/or a machine learning model (e.g., a convolutional neural network). For example, in one or more embodiments, and as will be discussed in greater detail below with regard to FIG. 6, the image content model 322 determines one or more descriptors for the selected digital content item. The image content model 322 then utilizes the determined descriptors to query related digital content variants from the content items repository 120 (e.g., via an API call to the third-party content system 118). The image content model 322 generates predicted digital content performance metrics for the returned digital content variants that predict how well each digital content variant will perform if inserted into the digital communication template. The multivariate testing system 103 then provides digital content variants and indications of their associated predicted digital content performance metrics in a display of the digital communication management system 104.

As further shown in FIG. 3, the multivariate testing system 103 performs an act 316 of generating multivariate testing recommendations associated with the digital communication template and one or more selected fragment variants. For example, in one or more embodiments, the multivariate testing system 103 generates multivariate digital communication test recommendations utilizing a multivariate testing results prediction model 324. As used herein, a "multivariate testing results prediction model" refers to a computer-implemented algorithm that determines multivariate digital communication test recommendations based on one or more criteria. A multivariate testing results prediction model can include one or more heuristic and/or machine learning models. For example, in at least one embodiment, and as will be discussed in greater detail below with regard to FIG. 7, the multivariate testing results prediction model 324 generates multivariate digital communication test recommendations including combinations of one or more fragment variants added to the digital communication template and based on one or more performance metrics.

The multivariate testing results prediction model 324 then utilizes historical information from the digital communication database 124 to generate a predicted multivariate performance metrics for the multivariate digital communication test recommendations. In one or more embodiments, each predicted multivariate performance metric reflects how well a candidate digital communication embodying a corresponding multivariate digital communication test recommendation will likely perform if sent to a particular audience of recipient client computing devices. In at least one embodiment, the multivariate testing system 103 provides the multivariate digital communication test recommendations in ranked order within a display of the digital communication management system 104 based on associated predicted multivariate performance metrics.

In one or more embodiments, the multivariate testing system 103 provides the predicted multivariate performance metrics in the display of the digital communication management system 104 along with the associated multivariate digital communication test recommendations. Thus, the multivariate testing system 103 guides a user selection of a subset of the multivariate digital communication test recommendations for live multivariate testing. Accordingly, in response to receiving a selection a subset of (e.g., three or more) multivariate testing recommendations in the act 306, the multivariate testing system 103 performs an act 326 of performing live multivariate testing based on the selected recommendations.

For example, in one or more embodiments, the multivariate testing system 103 performs live multivariate testing in the act 326 by segmenting the audience of recipient client computing devices based on the number of selected multivariate digital communication testing recommendations. In additional or alternative embodiments, the multivariate testing system 103 does not perform the act 326, but rather automatically generates and sends digital communications based on the digital communication recommendations determined in the act 316, or selected in the act 306.

The multivariate testing system 103 then generates digital communications corresponding to the selected multivariate digital communication testing recommendations, and sends the generated digital communications to the corresponding segments of recipient client computing devices. In at least one embodiment, the multivariate testing system 103 also collects performance information associated with each of the generated digital communications. For example, the multivariate testing system 103 utilizes the collected performance information to inform a user selection or configuration of a finalized digital communication in the act 308.

As discussed above, the multivariate testing system 103 utilizes computer models at multiple points over the development of a digital communication to generate data-driven recommendations. FIGS. 4, 5, 6, and 7 illustrate additional features and functionalities of the template recommendation model 318, the fragment machine learning model 320, the image content model 322, and the multivariate testing results prediction model 324, respectively.

Figure 4:
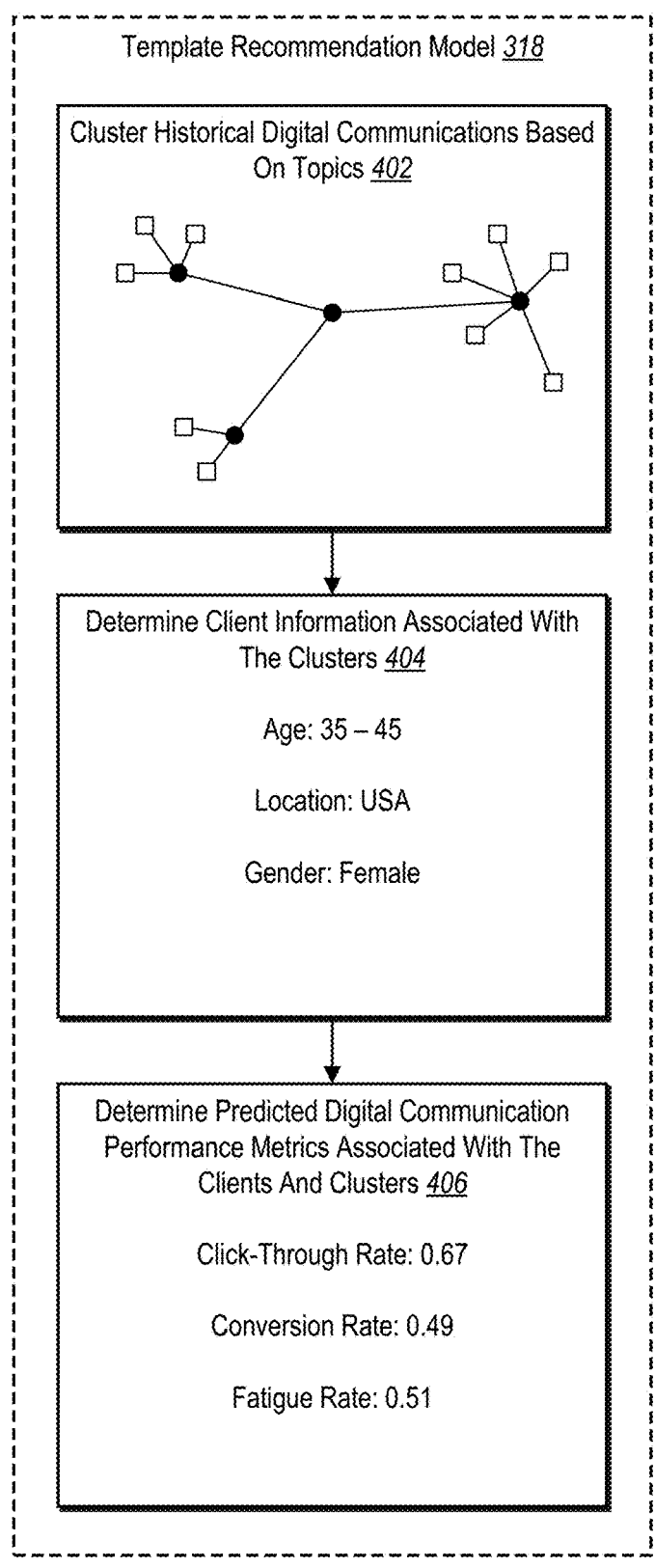
FIG. 4 illustrates a diagram of the multivariate testing system utilizing a template recommendation model to generate digital communication template recommendations in accordance with one or more embodiments.

In more detail, FIG. 4 illustrates a schematic diagram of the template recommendation model 318 generating predicted digital communication performance metrics for digital communication templates. In one or more embodiments, the multivariate testing system 103 provides, for selection via one or more user interfaces, digital communication templates that are likely to perform at a various levels relative to specific performance metrics. In order to determine and provide digital communication templates that are targeted to specific performance metrics, as well as to other characteristics, the template recommendation model 318 identifies, organizes, and analyzes related historical (e.g., previously sent) digital communications in multiple ways.

For example, as shown in FIG. 4, the template recommendation model 318 performs an act 402 of clustering historical digital communications based on topic. To illustrate, in one or more embodiments, the template recommendation model 318 first identifies historical digital communications from the digital communication database 124 by identifying digital communications previously sent to one or more recipients. In at least one embodiment, the template recommendation model 318 identifies previous digital communications sent within a specific time period (e.g., previous three months), previous digital communications sent within specific communication campaigns, and/or previous digital communications sent to specific audiences of recipient client computing devices.

As used herein, the term "historical digital communication" refers to a digital communication that was previously sent to one or more client devices/recipients. For example, a digital communication campaign (e.g., a series of emails) may include a series of digital communications sent over a period of time. As such, one or more systems described herein collects "historical communication information" and "historical performance data" associated with the historical digital communications. For example, in one or more embodiments, historical communication information includes the digital communication templates and digital communication contents associated with each historical digital communication. Additionally, in one or more embodiments, historical performance data includes analytical data associated with one or more performance outcomes associated with historical digital communications. For example, historical performance data includes one or more of a number of click-throughs associated with a historical digital communication, a conversion rate resulting from a historical digital communication, a fatigue rate associated with a historical digital communication, and so forth.

After identifying historical digital communications from the digital communication database 124, the template recommendation model 318 determines topics associated with each digital communication. For example, in one embodiment, the template recommendation model 318 determines the topic of a digital communication based on metadata associated with the digital communication. More specifically, the template recommendation model 318 determines the topic of the digital communication by identifying a tag or description associated with the digital communication that indicates the topic of the digital communication.

In additional embodiments, the template recommendation model 318 determines the topic of a digital communication based on a semantic analysis of the contents of the digital communication. To illustrate, in one or more embodiments, the template recommendation model 318 utilizes the text (in some cases without stop words) and image features of digital communications in connection with a topic model to generate clusters of the digital communications, where each cluster includes digital communications directed to the same topic or similar topics. For example, the template recommendation model 318 can utilize natural language processing to identify main topics or keywords associated with the digital communications. The template recommendation model 318 can further enhance this topic determination by utilizing image analysis to extract image features from digital images and other media in the digital communications. The template recommendation model 318 can utilize the extracted features to support or enhance the determined topics associated with the digital communications.

Once the template recommendation model 318 determines at least one topic associated with each digital communication, the template recommendation model 318 further groups the digital communications into cluster based on the determined topics. In one or more embodiments, the template recommendation model 318 organizes digital communications into the same cluster when the digital communications are associated with a matching topic. Additionally or alternatively, the template recommendation model 318 organizes digital communications into the same cluster when the digital communication are associated with topics that are within a threshold level of similarity. In at least one embodiment, when a digital communication is associated with more than one topic, the template recommendation model 318 represents the digital communication in separate clusters associated with each of the topics determined in connection with that digital communication.

Additionally or alternatively, the template recommendation model 318 utilizes a non-linear dimensionality reduction technique such as t-distributed stochastic neighbor embeddings to generate topic-based clusters of digital communications from the contents of those digital communication templates. In at least one embodiment, the template recommendation model 318 utilizes most popular terms represented in each cluster of digital communications to represent that cluster.

The template recommendation model 318 further performs an act 404 of determining client information associated with the clusters of digital communications. For example, in one or more embodiments, the template recommendation model 318 accesses client information (e.g., profile information) associated with client devices/recipients of the historical digital communications from the client database 122. To illustrate, the template recommendation model 318 accesses profile information including demographic information associated with recipients of the historical digital communications (e.g., age information, gender information), location information associated with recipients of the historical digital communications (e.g., country information, geographic region information, city information), and other types of profile information (e.g., email platform information, computing device information).

In at least one embodiment, the template recommendation model 318 utilizes this extracted client information associated with the historical digital communications to further organize the generated clusters of historical digital communications. For example, in one or more embodiments, the template recommendation model 318 generates dimensions or sub-clusters in each generated cluster of digital communications based on recipient age groups, recipient residences (e.g., city, state, country), recipient email platforms, and so forth. The template recommendation model 318 generates the sub-clusters based on individual profile characteristics (e.g., digital communications in a cluster are only grouped by age), or on multiple profile characteristics (e.g., digital communications in a cluster are grouped by age, city, and gender).

The template recommendation model 318 further performs an act 406 of determining predicted digital communication performance metrics associated with the clients and the digital communications within the clusters. For example, in one or more embodiments, the template recommendation model 318 determines one or more predicted digital communication performance metrics for a digital communication by first identifying all performance information associated with that digital communication.

To illustrate, the template recommendation model 318 identifies viewing information, interaction information, click through information, conversion information, fatigue information, and other types of performance information associated with the digital communication. For instance, the template recommendation model 318 determines a number of recipients of the digital communication who opened the digital communication, a number of page lands that resulted from recipients clicking a link within the digital communication, and a conversion rate that resulted from recipients interacting in some way (e.g., viewing and/or clicking on) the digital communication.

From this identified information, the template recommendation model 318 generates predicted digital communication performance metrics associated with digital communications relative to the recipients who received the digital communications (e.g., according to the generated clusters and sub-clusters). For example, in one embodiment, the template recommendation model 318 generates a predicted digital communication performance metric reflecting a predicted conversion rate for the digital communication relative to a profile of recipients. In another embodiment, the template recommendation model 318 generates a predicted digital communication performance metric reflecting a predicted click-through rate for the digital communication relative to the profile of recipients, and so forth.

In one or more embodiments, the template recommendation model 318 generates the predicted digital communication performance metrics for the digital communications utilizing a historical analysis of the information from the digital communication database 124 and the client database 122. For instance, the template recommendation model 318 can generate the predicted digital communication performance metric for the digital communication by determining a conversion rate for the digital communication from the historical information for the digital communication, and utilizing the conversion rate as the predicted digital communication performance metric. Additionally or alternatively, the template recommendation model 318 generates the predicted digital communication performance metrics for the digital communications utilizing a trained deep learning neural network (or other machine learning model) that utilizes information from the digital communication database 124 and the client database 122 as inputs.

In at least one embodiment, the template recommendation model 318 performs an additional act of extracting digital communication templates from the digital communications. For example, the multivariate testing system 103 receives selections of digital communication type or topic, performance metrics, and recipient profiles via one or more user interfaces to ultimately provide ranked historical digital communications for use in generating a new digital communication. In response to a detected selection of one of the ranked historical digital communications, the template recommendation model 318 extracts a digital communication template including the selected historical digital communication in an editable format. For example, the template recommendation model 318 extract a digital communication template from a digital communication by identifying HTML, tags in the digital communication, and constructing the digital communication template from the HTML tags. In this way, the template recommendation model 318 extracts a template that includes the structure and formatting of a digital communication, such that the contents within the digital communication can be edited in generating a new digital communication.

As mentioned above, FIG. 5 illustrates a schematic diagram of the fragment machine learning model 320 generating predicted content fragment performance metrics for possible fragment variants in combinations with other existing content fragments in the digital communication template. In one or more embodiments, the multivariate testing system 103 utilizes the fragment machine learning model 320 to generate performance metrics for fragment variants that account for both: temporal dependencies reflecting historical user behaviors relative to content fragments of the particular digital communication template across consecutive historical sessions, and spatial dependencies predicting likely user viewing behaviors relative to the particular arrangement of fragments within the digital communication template.

In one or more embodiments, the fragment machine learning model 320 models temporal dependencies between user behaviors across consecutive historical session utilizing LSTM layers trained to generate feature vectors predicting whether particular instantiations of content fragments of a digital communication template will be liked by recipients.

In other words, whether the particular instantiations will be viewed and interacted with via one or more recipient client computing devices.

As used herein, a "feature vector" refers to vector representation generated by a machine learning model. For example, in one or more embodiments, an LSTM layer as described herein generates a feature vector reflecting features of a digital communication or content fragment. As used herein, "features" refer to characteristics of a data item. For example, in one embodiment, a digital content item is associated with image features including characteristic representations of a digital image in the digital content item. Additionally or alternatively, a digital content item is associated with textual features including characteristic representations of text in the digital content item. In one or more embodiments, features of digital content items, fragment variants, and so forth are combined to form an "encoding."

To further illustrate, over the course of multiple digital communication campaigns, the multivariate testing system 103 may generate and send multiple digital communications built on one or more digital communication templates, where each digital communication includes different variations to one or more content fragments. For example, in a first digital communication sent at a first time, a first content fragment may include an image and text. In a second digital communication sent at a second time, the first content fragment may include the image only. Then, in a third digital communication sent at a third time, the first content fragment may include the text only. In at least one embodiment, the multivariate testing system 103 collects data in response to sending digital communications reflecting this historical sequence of fragment variants (e.g., instantiations) of the first content fragment, where the collected data reflects how recipients viewed and interacted with each of the fragment variants of the first content fragment.

Figure 5:
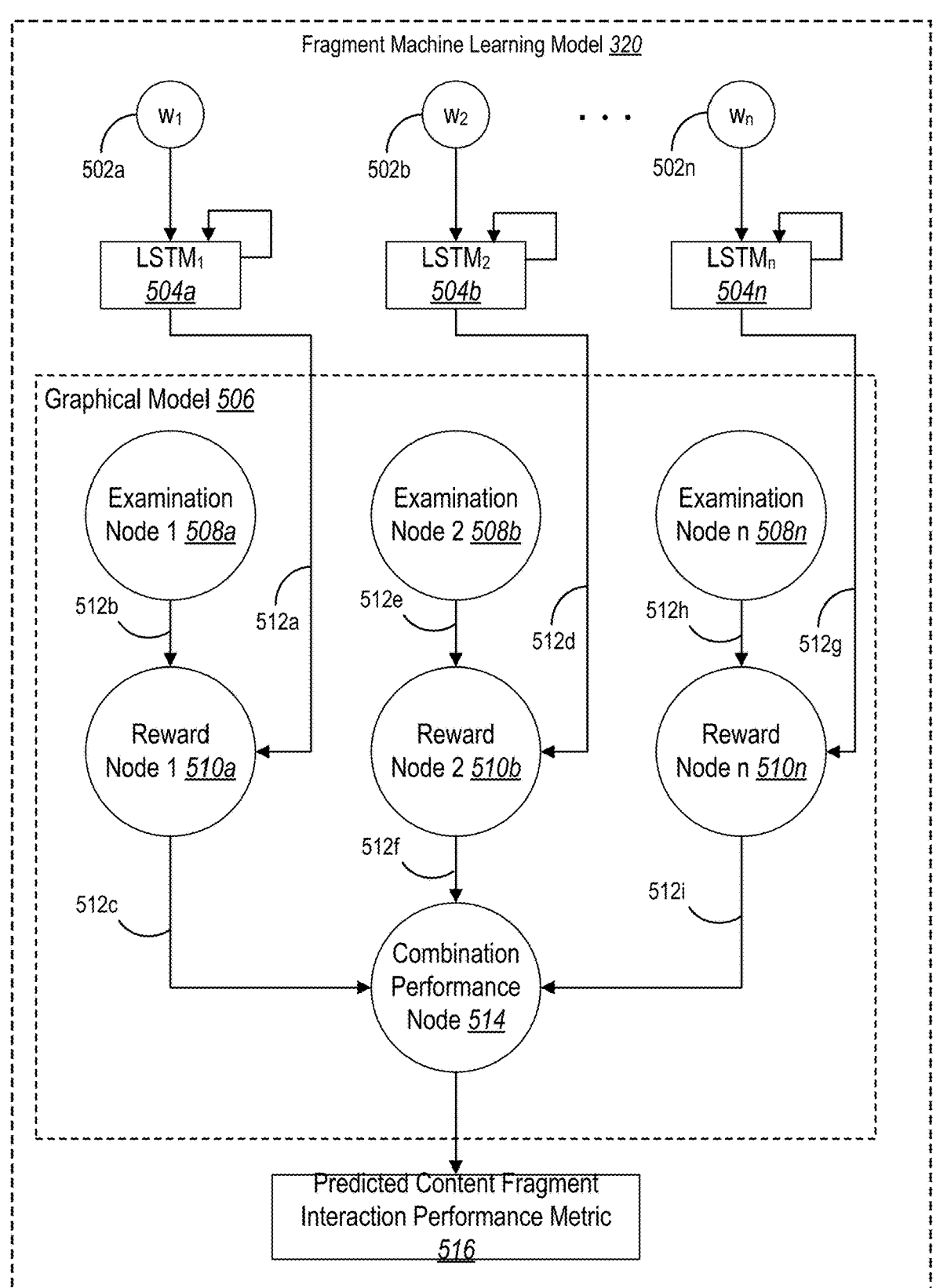
FIG. 5 illustrates a diagram of the multivariate testing system utilizing a fragment machine learning model to generate fragment variant recommendations in accordance with one or more embodiments.

In one or more embodiments, the multivariate testing system 103 provides this information associated with the historical sequence of fragment variants to the fragment machine learning model 320. For example, as shown in FIG. 5, the fragment machine learning model 320 generates historical sequences 502a, 502b, 502n of fragment variants associated with each content fragment represented in a particular digital communication template. For instance, if a particular digital communication template includes five content fragments (e.g., sections of content), the fragment machine learning model 320 generates five corresponding encodings of the sequences and five LSTM layers.

The fragment machine learning model 320 then utilizes corresponding LSTM layers 504a, 504b, 504n in connection with the historical sequences 502a, 502b, 502n to generate feature vectors modeling the historical performance of the last fragment variants represented in the historical sequences 502a-502n. In one or more embodiments, the LSTM layers 504a-504n are individual networks (e.g., neural networks) that are separate from each other.

In more detail, the fragment machine learning model 320 generates an encoding of each of the historical sequences 502a-502n (e.g., as an initial step performed by the corresponding LSTM layers 504a-504n). For example, the fragment machine learning model 320 initially encodes the historical sequences 502a-502n by statistical features. To illustrate, the fragment machine learning model 320 represents the historical sequence 502a of fragment variants of a first content fragment as a statistical encoding of the viewing and interaction data associated with each of the fragment variants in the historical sequence.

In one or more embodiment, the fragment machine learning model 320 adds additionally extracted features from the historical sequences 502a-502n to the generated encodings. For example, in one embodiment, the fragment machine learning model 320 extracts image features from the fragment variants represented in the historical sequences 502a-502n. To illustrate, the fragment machine learning model 320 extracts image features from the fragment variants in the historical sequence 502a and combines the extracted features to the generated statistical encoding. In at least one embodiment, the fragment machine learning model 320 extracts the image features utilizing an image encoder, such as ResNet.

In one or more embodiments, the fragment machine learning model 320 further extracts text features from the fragment variants represented in the historical sequences 502a-502n. For example, the fragment machine learning model 320 extracts text features from the fragment variants in the historical sequence 502a utilizing a natural language encoder, such as a bidirectional encoder representations from transformers model (BERT). The fragment machine learning model 320 combines any extracted textual features to the encoding of the historical sequence 502a.

In at least one embodiment, as mentioned above, the fragment machine learning model 320 trains the LSTM layers 504a-504n to generate feature vectors (represented by the edges 512a, 512d, and 512g) from the encodings of the historical sequences 502a-502n. For example, the LSTM layers 502a-504n model how recipients of the various instantiations view and interact with the instantiations over time to determine the feature vectors representing the probability or likelihood of last fragment variants in the historical sequences will be liked (e.g., viewed and otherwise interacted with) by the recipients.

In more detail, each of the LSTM layers 504a-504n are recurrent neural networks that leverage the sequential nature of the encodings to determine how changes to the represented fragment variants effect how and whether recipients view the fragment variants and interact with the fragment variants. As such, the LSTM layers 504a-504n generate feature vectors representing a predicted likelihood that the last fragment variants or instantiations in the historical sequences 502a-502n, respectively, will achieve a particular result/performance with the recipients. In at least one embodiment, the fragment machine learning model 320 applies a sigmoid function to the generated feature vectors to generate scores representing the probability reflected by the generated feature vectors.

In one or more embodiments, the fragment machine learning model 320 modifies the generated feature vectors/scores utilizing a graphical model 506. As used herein, a "graphical model" refers to a computer model or machine learning network including collection of nodes and edges. In particular, a graphical model can include a graphical neural network that analyzes embeddings of nodes connected by edges utilizing one or more layers to generate one or more predictions. For example a graphical model can include a machine learning network that includes a collection of nodes and edges that modify the output of one or more LSTM layers so as to add, encode, or represent additional information within the modified outputs. As used herein, a node includes modeled data (e.g., historical data) reflecting one or more characteristics of that data. In one or more embodiments, an "edge" connects two nodes and includes a weight (e.g., a conditional probability) between the two nodes.

For instance, the graphical model 506 includes nodes and edges that modify the outputs of the LSTM layers 504a-

504n to add information to the outputs of the LSTM layers 504a-504n, where the added information represents viewing and interacting behaviors relative to the content fragments represented by the LSTM layers 504a-504n. Thus, by modifying the generated scores utilizing the graphical model 506, the fragment machine learning model 320 effectively models the spatial dependencies between the represented content fragments. Ultimately, the graphical model 506 generates a predicted likelihood 516 that recipients will respond (e.g., will like) a combination of particular fragment variants for the content fragments of the digital communication template. In at least one embodiment, the graphical model 506 includes one or more examination nodes (e.g., viewing nodes) that model viewing behaviors relative to content fragments from historical communication information associated with a particular digital communication. In one or more embodiments, the examination nodes are unobservable. Additionally, in at least one embodiment, the graphical model 506 further includes one or more reward nodes (e.g., click nodes) that model interaction behaviors relative to the content fragments from historical communication information associated with the particular digital communication. In one or more embodiments, a reward node is observable when recipient click feedback is available relative to the corresponding content fragment. When recipient click feedback is not available relative to the content fragment, the corresponding reward node is unobservable. In one or more embodiments, the graphical model 506 ($\theta$) and instantiations of the M content fragments $w=(w_1, w_2, \ldots, w_n)$, the reward node $r(w, \theta)$ is whether the corresponding digital communication is responded to by a recipient (e.g., clicked on), or a number of content fragments of the digital communication that are responded to (e.g., click on) by a recipient.

In more detail, and as just mentioned, the graphical model 506 includes examination nodes 508a, 508b, and 508n, and reward nodes 510a, 510b, and 510n. The examination nodes 508a-508n and reward nodes 510a-510n are connected with edges 512b, 512e, and 512h. The examination nodes 508a-508n are further connected to the LSTM layers 504a-504n via the edges 512a, 512d, and 512g, while the reward nodes 510a-510n are connected to a combination performance node 514 by edges 512c, 512f, and 512i.

In one or more embodiments, the examination nodes 508a-508n reflect recipient examination of content fragments of digital communications incorporating the current digital communication template. For example, the examination node 508a models viewing behaviors relative to the first content fragment of the current digital communication template from historical communication information showing how and whether recipients/client devices viewed/displayed the first content fragment in the digital communications that incorporated the current digital communication template. The examination node 508b models viewing behaviors relative to the second content fragment of the current digital communication template, and so forth.

For example, the historical communication information can indicate whether recipients scrolled to a display position of the first content fragment, whether recipients read textual contents of the first content fragment (e.g., based on a scroll-stop time), whether recipients looked at image contents of the first content fragment (e.g., based on eye movement tracking), and so forth. Thus, the examination node 508a generates an output that represents viewing/display likelihoods associated with the content fragment in combination with dependencies between that content fragment and the other content fragments of the current digital communication template.

In one or more embodiments, the reward nodes 510a-510n reflect recipient responses to the content fragments of digital communications incorporating the current digital communication template. For example, the reward node 510a models interaction behaviors relative to the first content fragment of the current digital communication template from historical communication information showing how and whether recipients interacted with the first content fragment. Similarly, the reward node 510b models interaction behaviors relative to the second content fragment of the current digital communication template, and so forth. For example, the historical communication information relative to the reward nodes 510a-510n can indicate whether recipients clicked on a link in the content fragment, whether recipients watched a digital video presented within the content fragment, whether recipients copied content out of the content fragment, and so forth.

As shown in FIG. 5, the examination nodes 508a-508n are connected to the reward nodes 510a-510n by the edges 512b, 512e, and 512h, respectively. In one or more embodiments, the edges 512b, 512e, 512h, 512a, 512d, and 512g define dependencies between the examination nodes 508a-508n, the outputs of LSTM layers 504a-504n, and the reward nodes 510a-510n, respectively, by conditional probabilities. Thus, the reward nodes 510a-510n generates outputs along the edges 512c, 512f, and 512i that represent predicted interaction performance metrics representing predicted likelihoods that recipients view and otherwise interact with the associated content fragments configured according to the last fragment variants in the historical sequences 502a-502n, respectively.

As used herein, a "predicted interaction performance metric vector" refers to an output of an LSTM layer that has been modified by one or more nodes and edges within a machine learning model. For example, in at least one embodiment, a predicted interaction performance metric vector reflects how likely a particular fragment variant within a digital communication template is to be viewed and interacted with by a recipient client computing device.

As further shown in FIG. 5, the graphical model 506 includes the combination performance node 514. In one or more embodiments, the combination performance node 514 utilizes the modified feature vectors along the edges 512c, 512f, and 512i to generate a final metric reflecting predicted recipient responses to a combination of fragment variants of the content fragments of the current digital communication template. More specifically, the combination performance node 514 generates the predicted content fragment interaction metric 516 reflecting a predicted likelihood of actions/performance (e.g., if a recipient will view and interact with) a digital communication including the last fragment variants in each of the historical sequences 502a-502n.

In one or more embodiments, the multivariate testing system 103 leverages the fragment machine learning model 320 to generate predicted content fragment performance metrics for instantiations or variations of only one of the content fragments of a currently active digital communication template. For example, the multivariate testing system 103 iteratively utilizes the fragment machine learning model 320 in connection with varied sequences 502a, while leaving the historical sequences 502b and 502c unchanged. In this way, the multivariate testing system 103 can generate fragment variants of one content fragment at a time in connection with development of a digital communication.

As mentioned above, FIG. 6 illustrates a schematic diagram of the image content model 322 generating predicted digital content performance metrics for digital content variations relative to digital content items within a currently active digital communication template. For example, as will be illustrated below with regard to FIGS. 8A-8S, the multivariate testing system 103 enables the selection and modification of individual content items (e.g., digital images) within content fragments of a currently active digital communication template as an administrator is configuring a digital communication for sending to one or more recipients.

In at least one embodiment, in response to a detected selection of a particular digital content item, the image content model 322 performs an act 602 of determining descriptors of the selected digital content item. For example, in at least one embodiment, the image content model 322 utilizes one or more neural networks to generate descriptors for the selected digital content item. For instance, the image content model 322 utilizes an encoding model, or a similar neural network, to auto-generate descriptors for the selected digital content item. The image content model 322 generates descriptors including topic tags, object tags, facial expression tags, scene tags, and so forth. Additionally or alternatively, the image content model 322 generates descriptors for the selected digital content item by analyzing meta-data associated with the selected digital content item.

In one or more embodiments, the image content model 322 utilizes one or more relevant knowledge graphs 604 to augment or supplement the determined descriptors for the selected digital content item. For example, in at least one embodiment, the image content model 322 leverages a relevant knowledge graph 604 by linking the determined descriptors to one or more entities within the knowledge graph 604, retrieving concepts from the linked entities, and ranking the concepts.

In more detail, the image content model 322 links the determined descriptors to one or more entities within the knowledge graph 604 by employing an entity linking model that identifies entity mentions that occur in the determined descriptors. More specifically, in at least one embodiment, the knowledge graph 604 contains nodes that represent entities, where entities that occur in text, images, etc. are referred to as mentions. For example, in one or more embodiments, the knowledge graph 604 is a storage structure representing a taxonomy of entities or concepts, where each entity is linked to other entities within the structure by a relationship (e.g., parent-child). In some embodiments, the knowledge graph 604 is a hierarchical organization of entities, while in other embodiments, the knowledge graph 604 represents another kind of relationship between entities. As such, the image content model 322 extracts a set of concepts from the knowledge graph 604 with parts of text that are potential mentions of the determined descriptors.

In at least one embodiment, the image content model 322 utilizes an entity linking model to link the determined descriptors to entities within the knowledge graph 604. For instance, in some embodiments, the image content model 322 utilizes an entity linking model that evaluates the context of the determined descriptors in order to link the determined descriptors to entities or concepts within the knowledge graph 604. Thus, the image content model 322 leverages the knowledge graph 604 to explore the relationships between the entities or concepts linked to the determined descriptors and other related entities or concepts within the knowledge graph 604 and to determine whether each of the entities may be a relevant addition to one or more of the determined descriptors. In at least one embodiment, the image content model 322 provides the list of determined descriptors to the entity linking model relative to one or more relevant knowledge graphs, and receives an entity annotation set, which is a set of entities from the one or more relevant knowledge graphs and their mentions in the list of determined descriptors.

In more detail, after linking the determined descriptors to the set entities in the relevant knowledge graph 604, the image content model 322 leverages the set of entities to extract related entities or concepts. For example, some entities within the knowledge graph 604 semantically represent concepts which are abstract objects (e.g., "caring," "strong"), while other entities within the knowledge graph 604 are real-world objects (e.g., "dog," "building"). In one or more embodiments, the relationships represented within the knowledge graph 604 capture relationships between abstract objects (e.g., "pain" is "difficult"), relationships between real-world objects (e.g., a "dishwasher" is an "appliance"), and relationships between real-world objects and abstract objects (e.g., a "building" is "sturdy"). Accordingly, the image content model 322 further leverages the knowledge graph 604 by analyzing neighbors of linked entities within the knowledge graph 604 to further augment the determined descriptors.

For instance, the image content model 322 identifies nearest neighbors of the linked entities within an entity embedding space or with semantic queries. To illustrate, the image content model 322 generates an embedding of a linked entity based on language information and/or structural information of the knowledge graph 604. The image content model 322 utilizes this structural entity embedding to look up related entities in the neighborhood of the linked entity. Additionally or alternatively, the image content model 322 utilizes semantic queries in connection with the knowledge graph 604 that specify one or more multiple paths including the linked entity.

After identifying the linked entities and related concepts within the knowledge graph 604, the image content model 322 ranks the determined related concepts. For example, image content model 322 filters out concepts that are too generic or irrelevant by assessing the usefulness of the identified concepts. In at least one embodiment, the image content model 322 generates a ranking score for the concepts under heuristics that: reward frequency of determined descriptor mentions by the concept, reward number of related linked entities, and penalize a number of incoming connections within the knowledge graph 604 (e.g., indicating that the concept is too generic). In one or more embodiments, the image content model 322 generates a ranking score for a concept according to these heuristics by the following equation:

mf(e,t)=the frequency of mentions of the entity e in the determined descriptors t and their context, cf(c,$C_t$)=the frequency of the concept c in the set of determined concepts $C_t$, icf(c,G)=the inverse frequency of the concept c in the knowledge graph G:

$$\log \frac{|entites \in G|}{|incoming\ links\ of\ c|}, and$$

$$ranking\ score\ (c) = w_1 cf(c,\ C_t) \cdot icf(c,\ G) + w_2 \sum_{e\,with\,(c,e)\in C_t} mf(e,\ t)$$

In one or more embodiments, the image content model 322 ranks the identified concepts by their ranking scores, and provides or utilizes a top threshold number or percentage of the identified concepts. Additionally or alternatively, the image content model 322 utilizes concepts with ranking scores that satisfy a predetermined threshold score.

After determining descriptors of the selected digital content item and optionally augmenting the determined descriptors utilizing the relevant knowledge graph 604, the image content model 322 performs an act 606 of determining digital content variants based on the determined descriptors. For example, in one embodiment, the image content model 322 queries one or more external digital content repositories such as the content items repository 120. In that embodiment, the image content model 322 queries the content items repository 120 utilizing one or more API calls that reference the determined descriptors.

In response to receiving the digital content variants, the image content model 322 performs an additional act 608 of determining predicted digital content performance metrics for the digital content variants. In one or more embodiments, the image content model 322 maintains and updates a data structure (e.g., a hash table) that tracks performance metrics (e.g., click-throughs, conversions) relative to digital contents utilized in previous digital communications. Accordingly, in determining predicted digital content performance metrics for an identified digital content variant, the image content model 322 generates a hash value representing the digit content variants, then identifies a performance metric for a digital content item with a similar hash value within the hash table. Thus, the image content model 322 returns a set of relevant digital content variants for the selected digital content item, along with their predicted digital content performance metrics.

Figure 7:
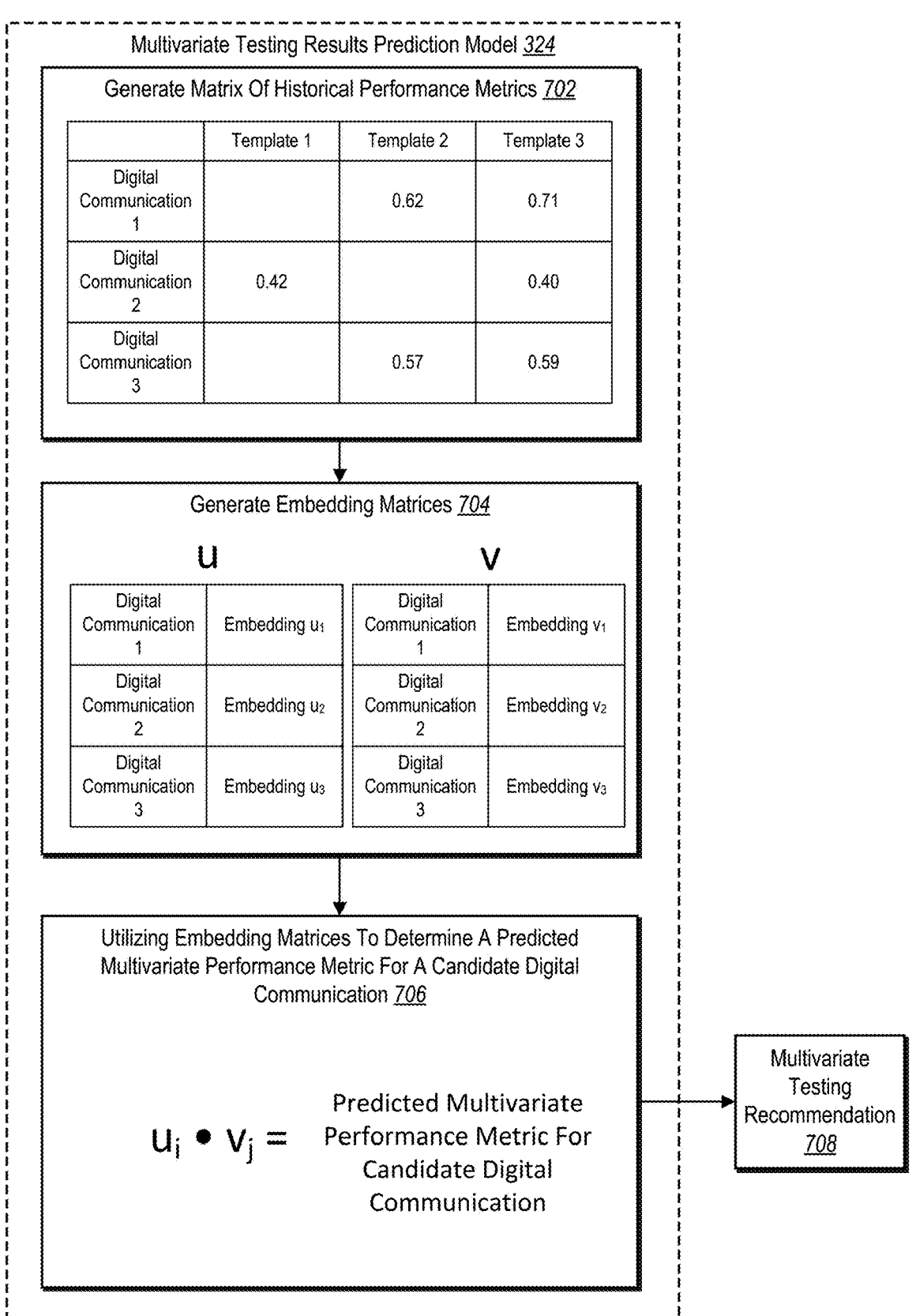
FIG. 7 illustrates a diagram of the multivariate testing system utilizing a multivariate testing results prediction model to generate multivariate testing recommendations in accordance with one or more embodiments.

As mentioned above, the multivariate testing results prediction model 324 generates predicted multivariate performance metrics for candidate digital communications that reflect the currently active digital communication template with one or more selected fragment variants. FIG. 7 illustrates the multivariate testing system 103 utilizing the multivariate testing results prediction model 324 to generate predicted multivariate performance metrics for candidate digital communications. For example, in response to a detected selection of two potential fragment variants for a single content fragment, the multivariate testing results prediction model 324 generates predicted multivariate performance metrics for two candidate digital communications—the first candidate digital communication including the first fragment variant for the content fragment, and the second digital communication including the second fragment variant for the content fragment.

In more detail, the multivariate testing results prediction model 324 generates predicted multivariate performance metrics based on estimates from observed performance metrics of historic digital communications. For example, the multivariate testing results prediction model 324 performs an act 702 of generating a matrix of historical performance metrics. To illustrate, the multivariate testing results prediction model 324 leverages the digital communication database 124 to generate a matrix A(i,j) of performance metrics (e.g., click-throughs, conversions), where the rows of matrix A include previous digital communications (e.g., by digital communication title), and the columns of matrix A include templates of the previous digital communications (e.g., by digital communication template title). At the intersections of A(i,j), the matrix A includes one or more performance metrics observed in response to sending the digital communication (i) including the digital communication template (j).

Next, the multivariate testing results prediction model 324 performs an act 704 of generating embedding matrices based on the matrix A. In one or more embodiments, the multivariate testing results prediction model 324 generates one or more embedding matrices utilizing matrix factorization such that the resulting embedding matrices are close approximations of the matrix A. To illustrate, in one or more embodiments, the multivariate testing results prediction model 324 utilizes techniques such as singular value decomposition or non-negative matrix factorization. For example, the multivariate testing results prediction model 324 generates the embedding matrices U and V, such that UV is the best rank-k approximation of A. To illustrate, the multivariate testing results prediction model 324 generates the matrix U by determining low-dimensional embeddings for each digital communications represented in A. Similarly, the multivariate testing results prediction model 324 generates the matrix V by determining low-dimensional embeddings for each digital communication template represented in A.

The multivariate testing results prediction model 324 then performs an act 706 of utilizing the embedding matrices to determine a predicted multivariate performance metric for a candidate digital communication. For example, the multivariate testing results prediction model 324 utilizes the embedding matrices to determine a predicted multivariate performance metric for a candidate digital communication that corresponds with a previously sent digital communication (e.g., a digital communication represented in A), but includes a previously unused digital communication template (e.g., a digital communication template not represented in A).

In one or more embodiments, the multivariate testing results prediction model 324 predicts a multivariate performance metric for the candidate digital communication including contents of a previous digital communication (i) within a previously unused digital communication template (j) (e.g., the digital communication template including a selected fragment variant). For example, the multivariate testing results prediction model 324 generates an embedding of the contents (i) of the candidate digital communication. The multivariate testing results prediction model 324 further generates an embedding of the digital communication template (j) of the candidate digital communication. To determine a predicted multivariate performance metric for the candidate digital communication, the multivariate testing results prediction model 324 computes a dot product of the embedding matrix $U_i$ and the embedding matrix $V_j$.

In additional or alternative embodiments, the rows and columns of the matrices A, U, and V include or are directed to other predicted elements or features. For example, in one embodiment, the multivariate testing results prediction model 324 generates the matrices A, U, and V with rows directed to digital communications, and columns directed to DOM elements of the digital communication templates. Moreover, in one or more embodiments, the rows and/or columns of the matrices A, U, and V directed to other content fragments or digital content items, such that the intersections of those rows and columns reflect predicted performance metrics for any desired combination of digital communication elements or features. Moreover, in at least one embodiment, the multivariate testing result prediction model 324 further augments the matrices A, U, and V with one or more meta-feature matrices that encode additional statistical features of digital communication across content fragments, digital content items, and so forth. This approach results in finer granularity among the generated embeddings.

In one or more embodiments, the multivariate testing results prediction model 324 repeats the act 706 to determine predicted multivariate performance metrics for additional candidate digital communications. After determining the predicted multivariate performance metrics, the multivariate testing results prediction model 324 generates one or more multivariate testing recommendations 708 based on the predicted multivariate performance metrics.

As used herein, the term "multivariate testing recommendation" refers to selectable options for multivariate testing. In one or more embodiments, a multivariate testing recommendation is for sending a particular candidate digital communication to one or more recipient client computing devices, where the particular candidate digital communication includes recommended digital content and/or fragment variants for use in a multivariate test as indicated by the corresponding multivariate testing recommendation.

For example, in one embodiment, the multivariate testing results prediction model 324 identifies candidate digital communications with predicted multivariate performance metrics that are in a top number or top percentage of predicted multivariate performance metrics. Additionally or alternatively, the multivariate testing results prediction model 324 identifies candidate digital communications with predicted multivariate performance metrics that are above a threshold metric or score. After identifying the candidate digital communications, the multivariate testing results prediction model 324 generates multivariate testing recommendations 708 directed to those candidate digital communications.

As mentioned above, the digital communication management system 104 provides various user interfaces that enable an administrator to configure a digital communication for sending to one or more recipients. In one or more embodiments, the multivariate testing system 103 generates and provides recommendations via one or more of the user interfaces. For example, FIGS. 8A-8R illustrate the multivariate testing system 103 generating and providing recommendations at various stages during creation of a digital communication prior to multivariate testing.

Figure 8A:
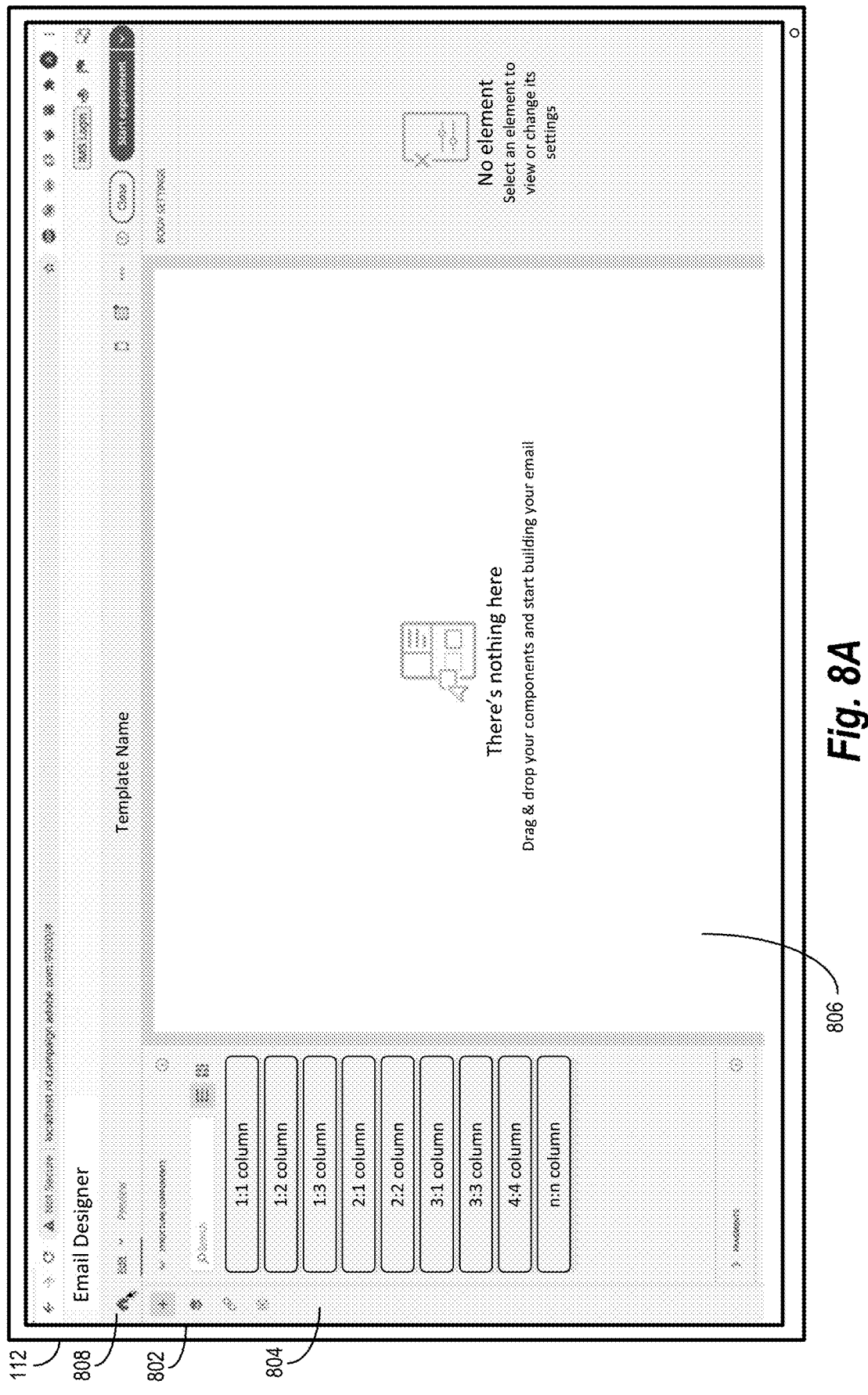
FIGS. 8A-8R illustrate a digital communication management system in connection with the multivariate testing system generating and providing user interfaces during development of a digital communication utilizing various generated recommendations in accordance with one or more embodiments.

To illustrate, as shown in FIG. 8A, the digital communication management system 104 provides a digital communication creation user interface 804 on a display 802 of the administrator computing device 112. As shown, the digital communication creation user interface 804 includes a canvas area 806 where the administrator can view and edit a digital communication template of a digital communication. In one or more embodiments, the digital communication management system 104 assists in the initial creation of a digital communication in response to a detected selection of the home button 808.

Figure 8B:
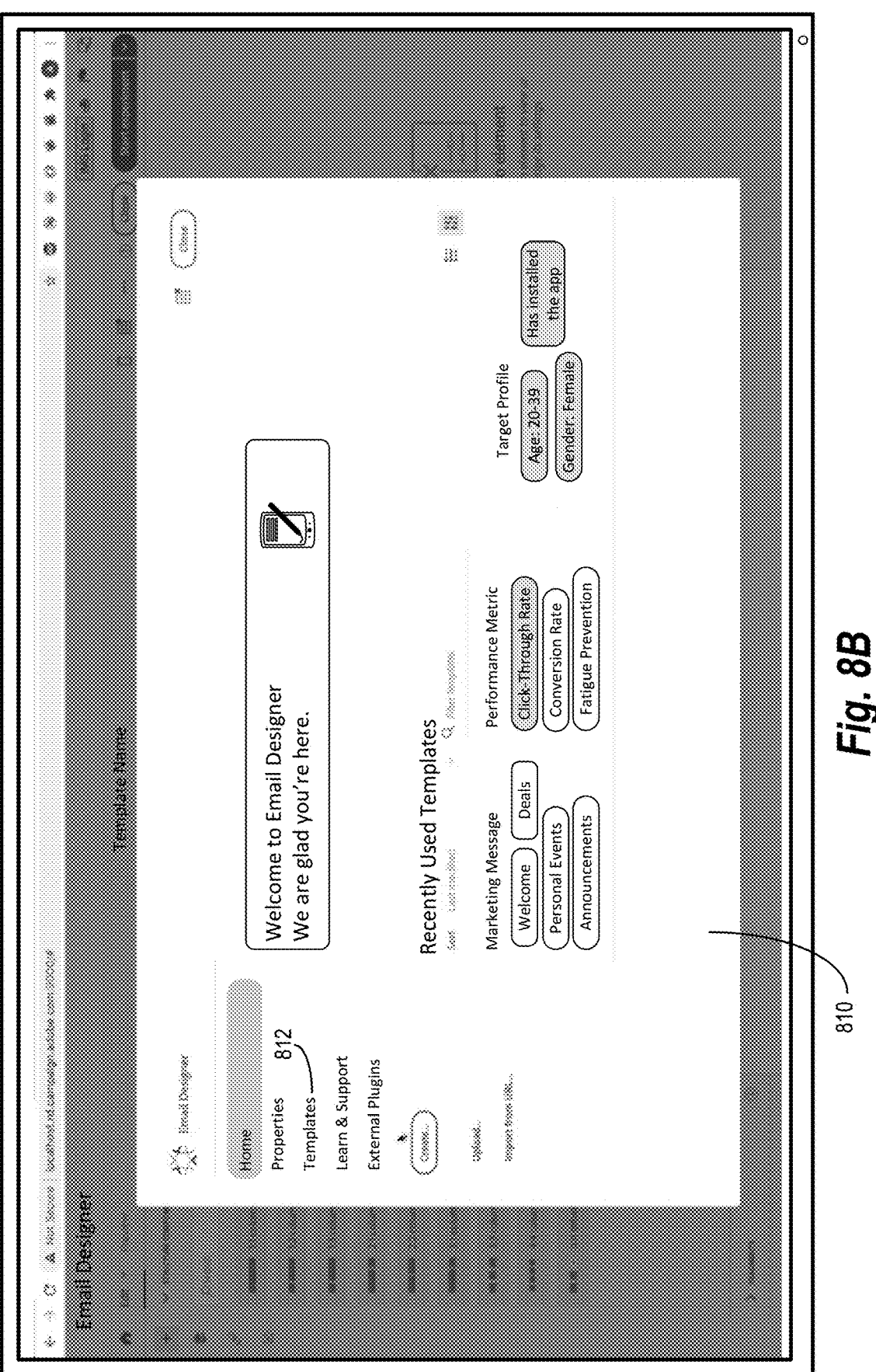
Figure 8C:
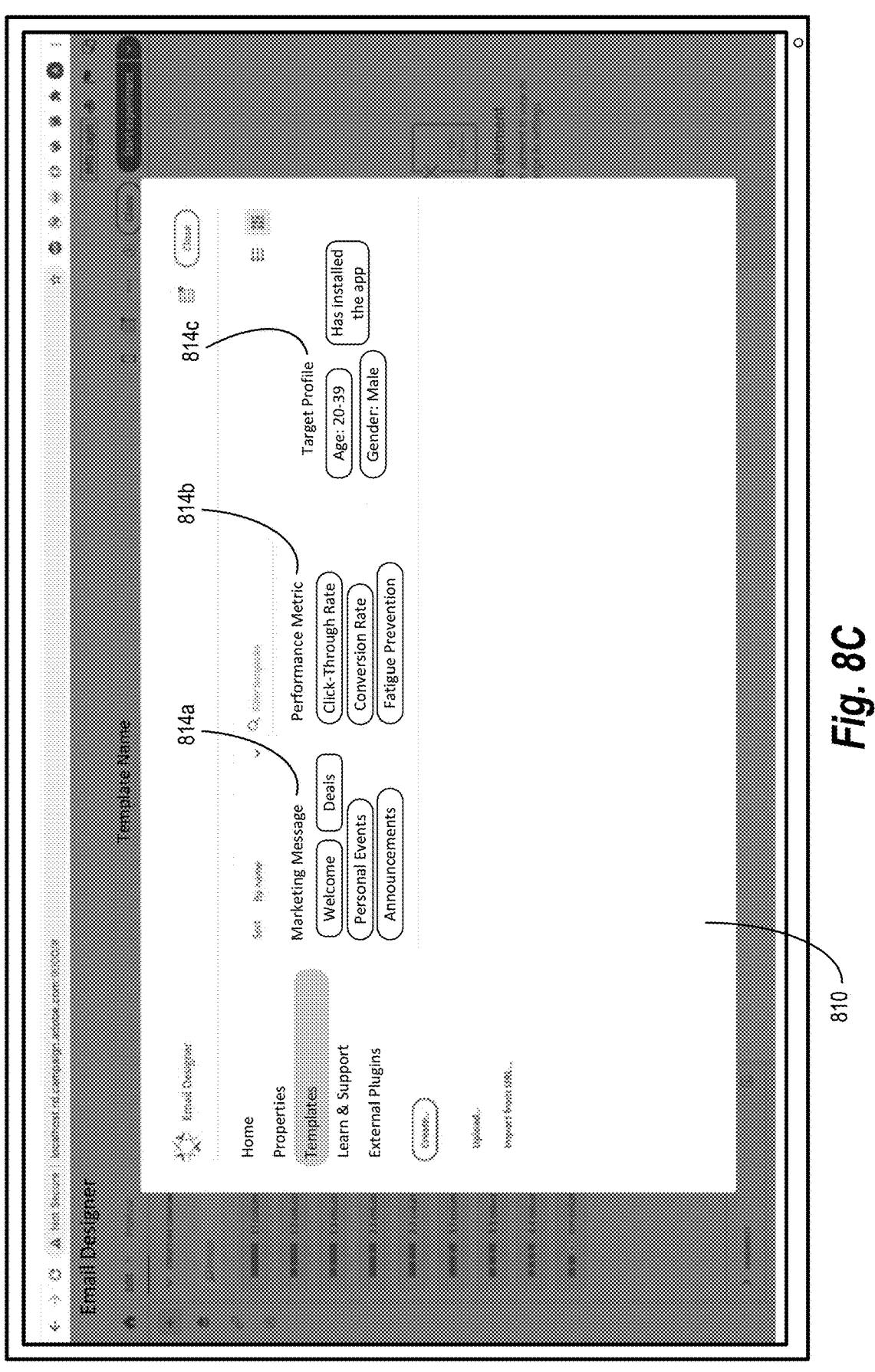

For example, in response to the detected selection of the home button 808, the digital communication management system 104 provides a digital communication design assistance interface 810 as shown in FIG. 8B. In one or more embodiments, the digital communication management system 104 and/or the multivariate testing system 103 generates and provides tools and recommendations for use in designing a digital communication. For instance, in response to a detected selection of the templates option 812, the multivariate testing system 103 updates the digital communication design assistance interface 810 with digital communication category 814a, a predicted digital communication performance metric category 814b, and an audience segment definition category 814c, as shown in FIG. 8C.

As used herein, the term "digital communication category" refers to a type of a digital communication. For example, in one or more embodiments, a digital communication is associated with a directive or over-arching purpose or topic such as "Announcements" or "New Customer Welcome." Accordingly, in at least one embodiment, digital communication templates are categorized or clustered based on these purposes or topics. In one or more embodiments, a digital communication category associated with a digital communication template is indicated in metadata associated with the digital communication template.

As used herein, the term "audience segment definition" refers to one or more descriptors or keywords that define a profile for a desired digital communication recipient. For example, an audience segment definition can include specific demographic indicators (e.g., age, gender), specific recipient actions (e.g., has installed a particular application on a mobile device, as made a previous purchase of a particular item), and/or other recipient descriptors (e.g., resides within a specified geographic area).

In one or more embodiments, as discussed above with regard to FIG. 4, the multivariate testing system 103 utilizes the template recommendation model 318 to organize historical digital communications and to determine predicted digital communication performance metrics for the organized historical digital communications. In at least one embodiment, the multivariate testing system 103 identifies and provides one or more digital communication templates from the organized historical digital communications in response to detected selections within the digital communication category 814a, the predicted digital communication performance metric category 814b, and the audience segment definition category-814c.

Figure 8D:
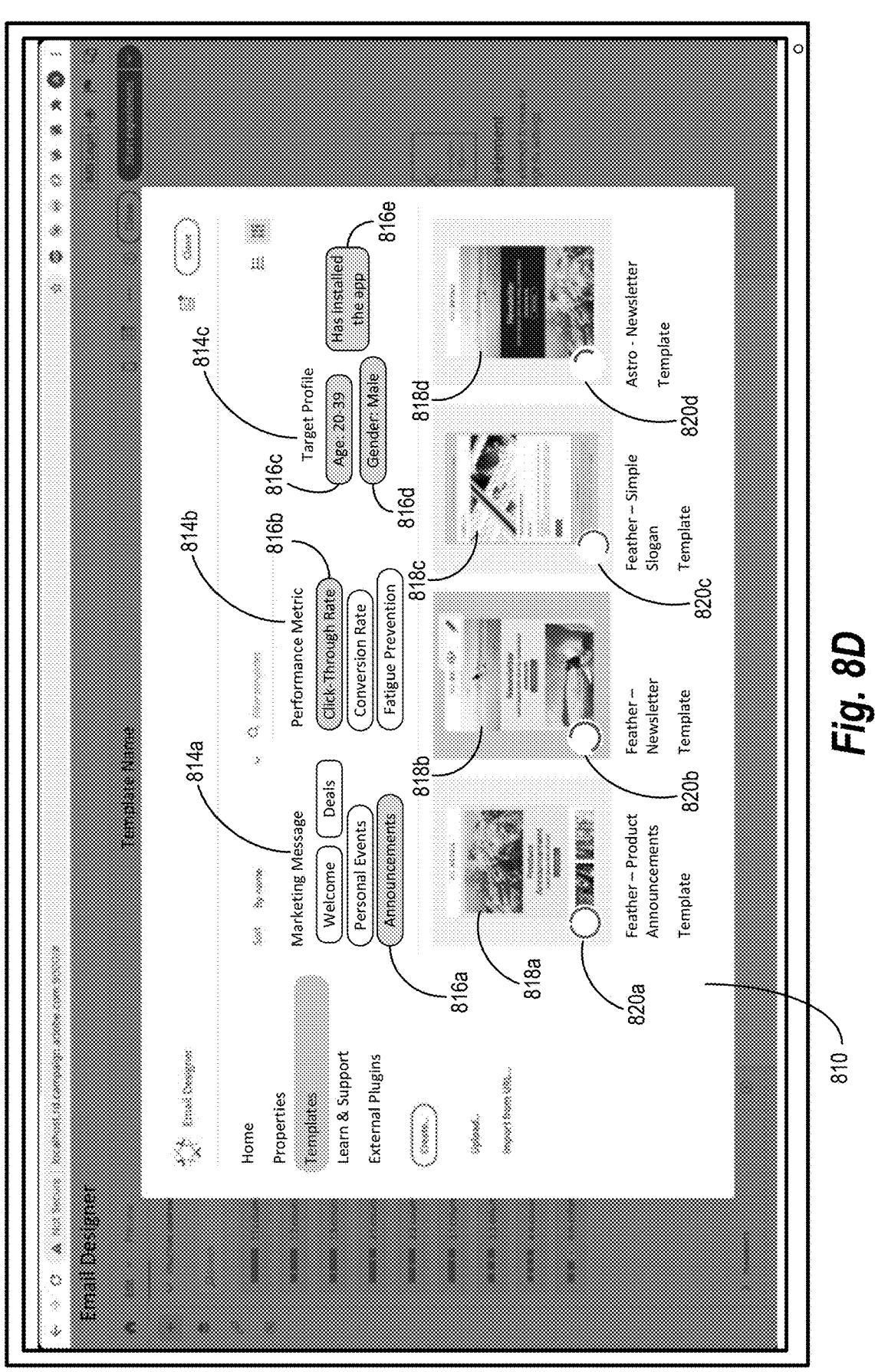

To illustrate, as shown in FIG. 8D, in response to detected selections of the digital communication template options 816a, 816b, 816c, 816d, and 816e within the digital communication categories 814a-814c, the multivariate testing system 103 identifies historical digital communications within the organizational clusters of historical digital communications, generates digital communication templates from the identified historical digital communications, and provides the digital communication template indicators 818a, 818b, 818c, and 818d associated with the generated digital communication templates. For example, in response to a detected selection of the digital communication template option 816a, the multivariate testing system 103 identifies a cluster of historical digital communications associated with the topic indicated by the digital communication template option 816a (e.g., "Announcements"). Then in response to a detected selection of the digital communication template option 816b, the multivariate testing system 103 identifies historical digital communications within the cluster that are associated with the selected performance metric (e.g., historical digital communications that are associated with a click-through rate performance metrics that satisfy a predetermined threshold). Finally, in response to detected selections of the digital communication template options 816c-816e, the multivariate testing system 103 determines historical digital communications within the cluster that correspond with the selected performance metric and were previously sent to recipients matching a profile that includes "Age: 20-39," "Gender: Male," and "Has installed the app."

In response to identifying the historical digital communications that correspond with the user selections of the digital communication template options 816a-816e, the multivariate testing system 103 further generates digital communication templates corresponding to the historical digital communications. For example, in at least one embodiment, the multivariate testing system 103 generates a digital communication template for a historical digital communication that includes the digital content items, html tags, and formatting of the historical digital communication in an editable format. Accordingly, in generating a new digital communication, the multivariate testing system 103 enables some portions of the historical digital communication to be maintained and other portions of the historical digital communication to be changed.

Moreover, the multivariate testing system 103 generates and provides the digital communication template indicators 818a-818d in the digital communication design assistance interface 810. In one or more embodiments, in order to guide a selection of a best-performing digital communication template, the multivariate testing system 103 further provides performance metric indicators 820a, 820b, 820c, and 820d overlaid on corresponding digital communication template indicators 818a-818d. In at least one embodiment, the multivariate testing system 103 generates the performance metric indicators 820a-820d to reflect predicted digital communication performance metrics associated with each historical digital communication reflected by the corresponding digital communication templates.

As used herein, a "performance metric indicator" refers to a display element that illustrates one or more predicted performance metrics associated with a digital object. For example, in one embodiment, a performance metric indicator is a graphical element including concentric circles where each circle is filled-in to a level that reflects a particular predicted performance metric. Thus, in one or more embodiments, a single performance metric indicator illustrates one, two, three, or more predicted performance metrics associated with a digital object (e.g., a digital communication template, a fragment variant, a digital content item, a multivariate testing recommendation).

For example, as shown in FIG. 8D, the multivariate testing system 103 generates the performance metric indicators 820a-820d to reflect click-through rate predicted digital communication performance metrics historical digital communications from which the multivariate testing system 103 extracted the digital communication templates corresponding to the digital communication template indicators 818a-818d. For instance, the multivariate testing system 103 generates the performance metric indicator 820a with a mostly filled-in ring indicating that the click-through rate for the corresponding digital communication template is very high. Conversely, the multivariate testing system 103 generates the performance metric indicator 820d with a ring that is only one-third filled-in indicating a lower click-through rate. Thus, the performance metric indicators 820a-820d quickly and easily show which digital communication templates are expected to perform well relative to click-through rate.

In additional or alternative embodiments, the multivariate testing system 103 generates the performance metric indicators 820a-820d to illustrate more than one predicted digital communication performance metric. For example, in response to a detected selection of an additional performance metric (e.g., "conversion rate"), the multivariate testing system 103 updates the performance metric indicators 820a-820d to illustrate both click-through rate and conversion rate. For instance, in one or more embodiments, the multivariate testing system 103 generate the performance metric indicators 820a-820d to include a target or bulls-eye arrangement of concentric circles, wherein the level to which each circle is filled in reflects a predicted digital communication performance metric. As further shown in FIG. 8D, in one or more embodiments, the multivariate testing system 103 provides the digital communication template indicators 818a-818d in ranked order based on the corresponding predicted digital communication performance metrics.

Figure 8E:
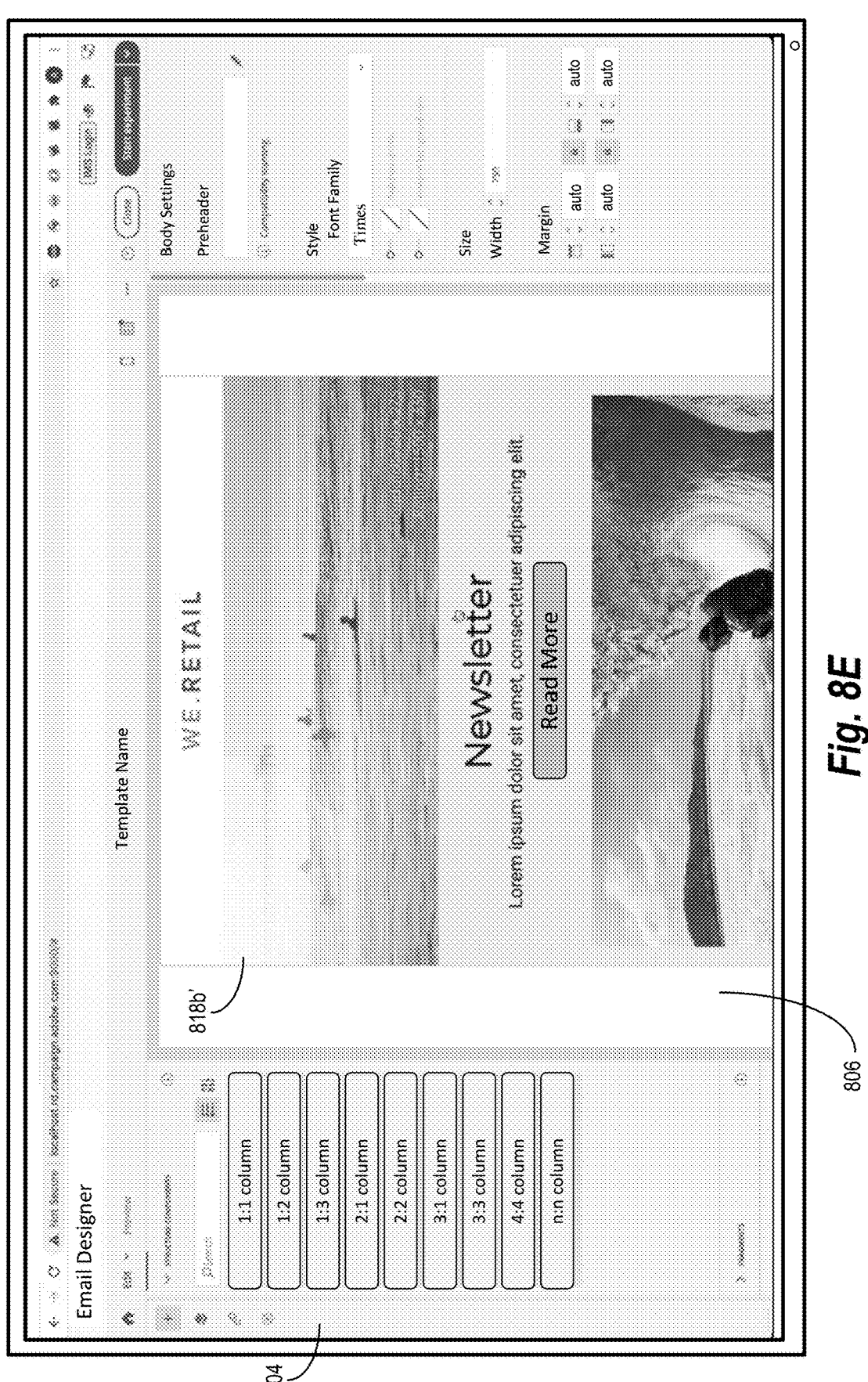

In response to a detected selection of a digital communication template indicator, the multivariate testing system 103 or digital communication management system 104 provides the corresponding digital communication template for further configuration and editing. For example, as shown in FIG. 8E, in response to a detected selection of the digital communication template indicator 818*b*, the multivariate testing system 103 provides the corresponding digital communication template 818*b'* for editing in the canvas area 806 of the digital communication creation user interface 804. Within this interface, the digital communication management system 104 and/or the multivariate testing system 103 can provide various tools and recommendations for use in connection with the digital communication template 818*b'*.

Figure 8F:

For example, as shown in FIG. 8F, in response to a detected selection of a content fragment 821*a* of the digital communication template 818*b'*, the digital communication management system 104 and/or the multivariate testing system 103 provides the content fragment options overlay 823 including various editing tools for use in connection with the content fragment 821*a*. In response to a detected selection of the fragment variant tool 822, the multivariate testing system 103 generates and provides one or more fragment variant recommendations.

Figure 8G:
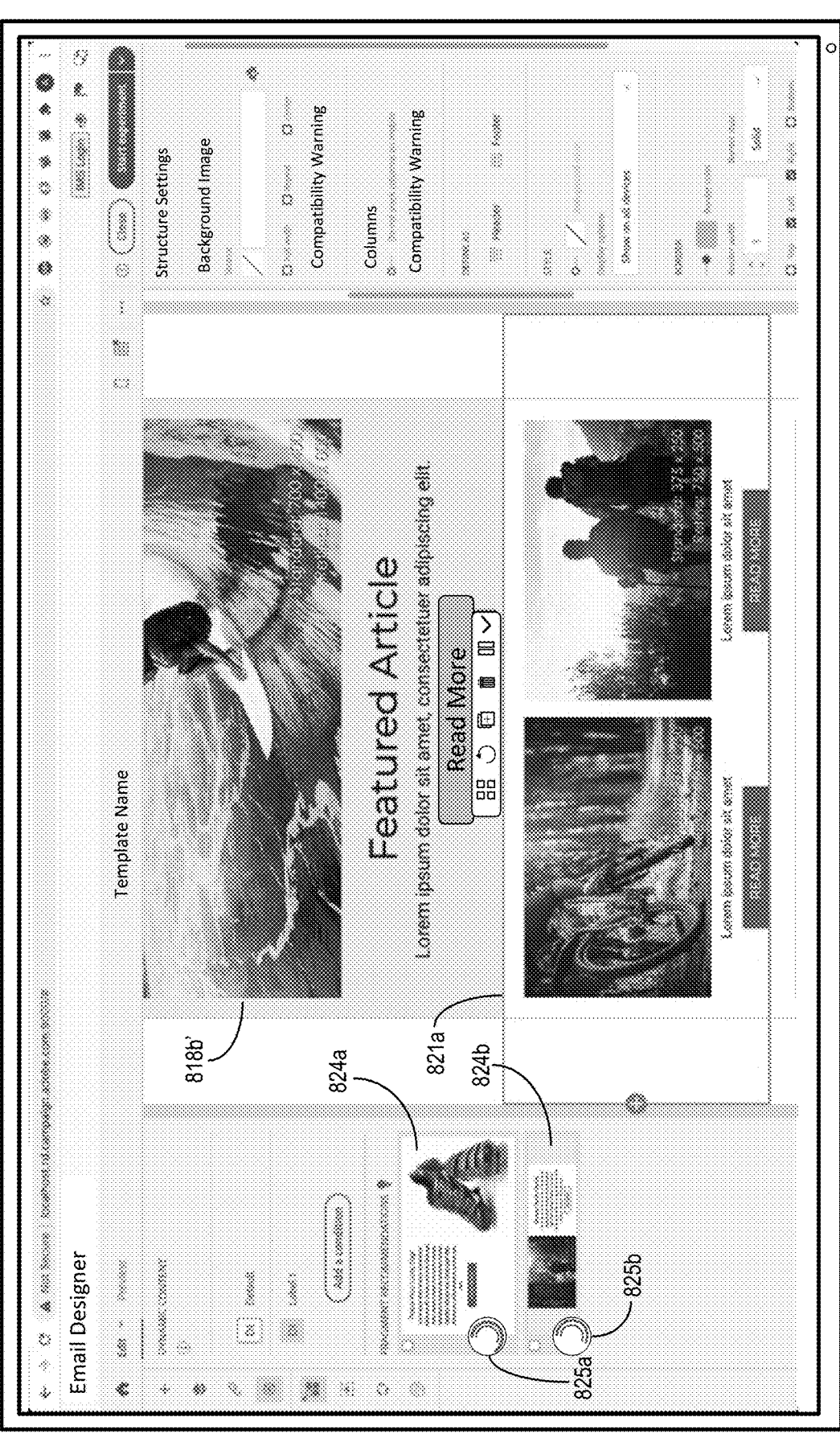

For example, as shown in FIG. 8G, in response to the detected selection of the fragment variant tool 822 in connection with the content fragment 821*a*, the multivariate testing system 103 generates and provides the fragment variant recommendations 824*a*, 824*b*. As discussed above with regard to FIG. 5, the multivariate testing system 103 utilizes the fragment machine learning model 320 to generate the fragment variant recommendations 824*a*, 824*b*. For instance, the multivariate testing system 103 provides the content fragments (including the content fragment 821*a*) to the fragment machine learning model 320 along with historical information for the historical digital communications associated with the digital communication template 818*b'*.

In one or more embodiments, the fragment machine learning model 320 generates the historical sequences of instantiations of the content fragments from the historical digital communications such that the historical sequences of instantiations for the other content fragments beyond the content fragment 821*a* end in the current instantiations of those content fragments shown in the digital communication template 818*b'*. Over multiple iterations, the fragment machine learning model 320 varies the historical sequence of instantiations of the content fragment 821*a* to generate predicted performance metric scores for the digital communication template with each of the possible instantiations of the content fragment 821*a*. In at least one embodiment, the multivariate testing system 103 generates the fragment variant recommendations 824*a*, 824*b* incorporating the instantiations of the content fragment that resulted in the predicted performance metric scores that satisfied a predetermined threshold.

In at least one embodiment, as shown in FIG. 8G, the multivariate testing system 103 provides the performance metric indicators 825*a*, 825*b* overlaid on the corresponding fragment variant recommendations 824*a*, 824*b* illustrating the predicted performance metric scores resulting from the instantiations therein. In one or more embodiments, the multivariate testing system 103 generates the fragment variant recommendation 824*a* including digital content items (e.g., a block of text, a hyperlink, and a digital image) with a particular size and in a particular layout. Additionally, the multivariate testing system 103 generates the fragment variant recommendation 824*b* including at least one of the same digital content items (e.g., the same block of text) and different digital content items (e.g., a different hyperlink and a different digital image) with a different size and layout than the fragment variant recommendation 824*a*. In one or more embodiments, as discussed above, one or more of the digital content items in the fragment variant recommendations 824*a*, 824*b* are from content fragments of previously sent digital communications. Additionally or alternatively, one or more of the digital content items in the fragment variant recommendations 824*a*, 824*b* have not been included in any previously send digital communication.

Figure 8H:
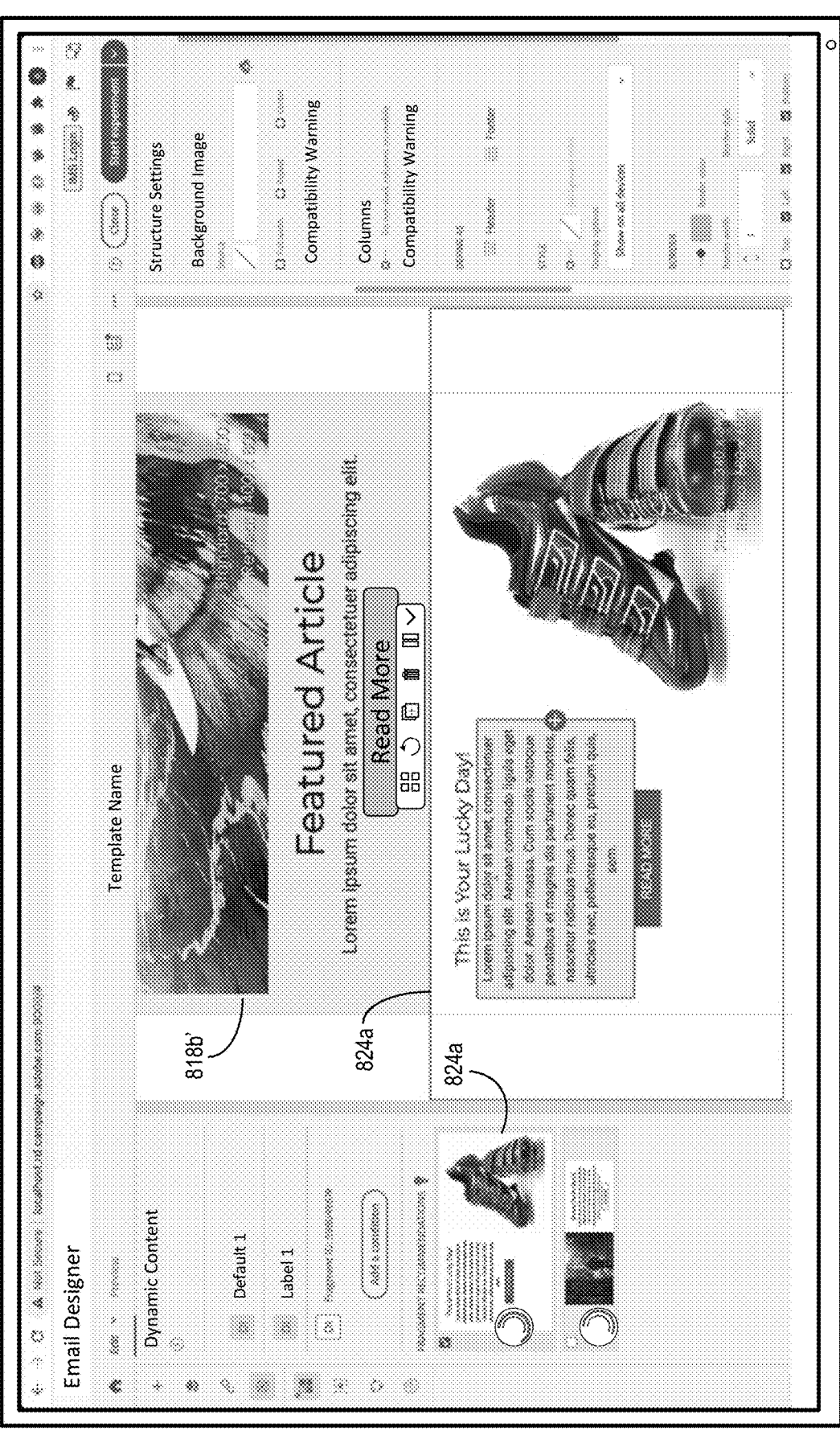

As further shown in FIG. 8H, in response to a detected selection of the fragment variant recommendation 824*a*, the multivariate testing system 103 replaces the content fragment 821*a* with the fragment variant 824*a'* corresponding to the selected fragment variant recommendation 824*a*. In one or more embodiments, the digital communication management system 104 enables further editing and configuration of the digital content items (e.g., textual content items, image content items) within the fragment variant 824*a'* within the digital communication template 818*b'*.

Figure 8I:
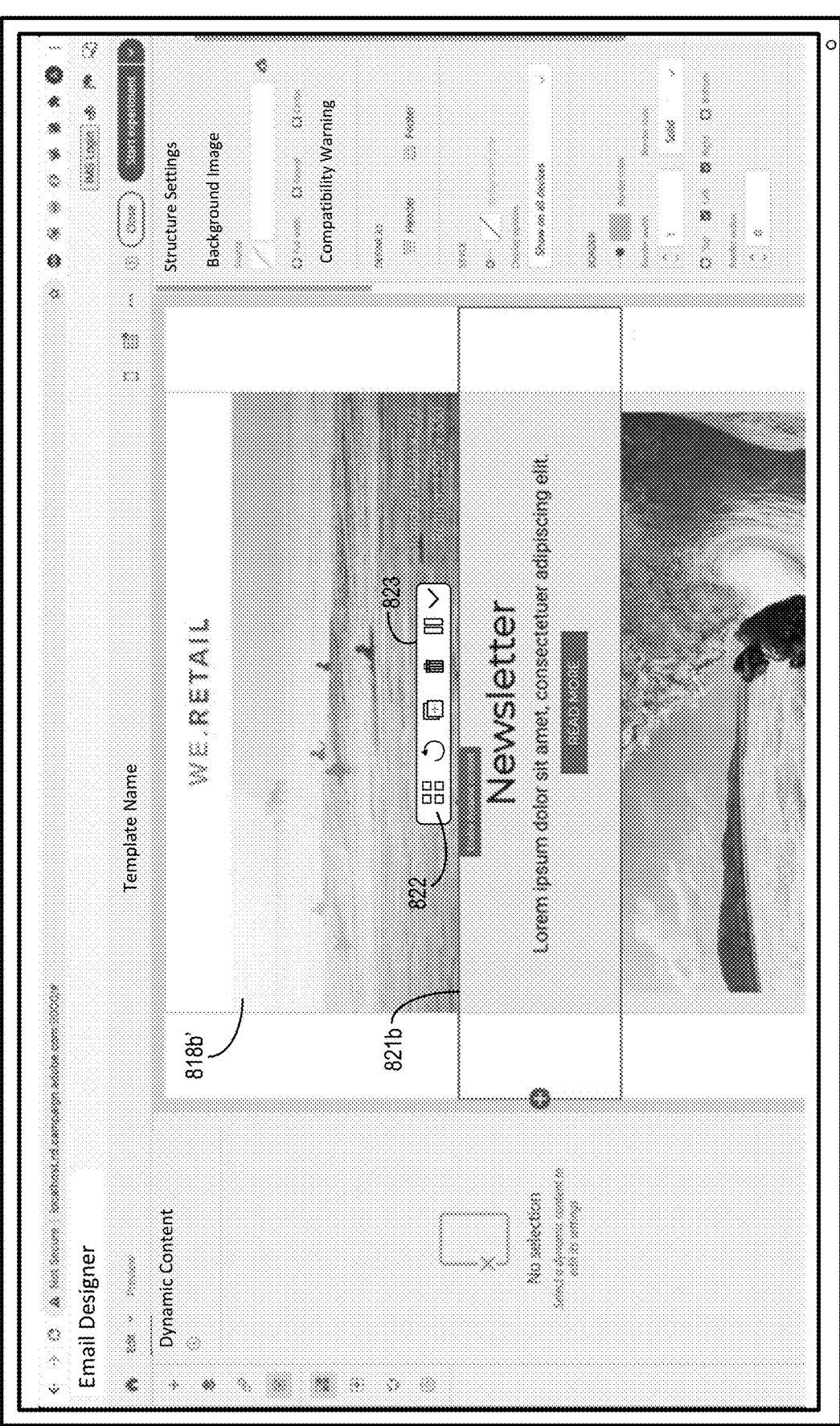

Additionally, as shown in FIG. 8I, the multivariate testing system 103 generates additional fragment variant recommendations associated with any or all of the remaining content fragments of the digital communication template 818*b'*. For example, in response to a detected selection of the content fragment 821*b* of the digital communication template 818*b'*, the digital communication management system 104 and/or the multivariate testing system 103 again provides the content fragment options overlay 823 in connection with the content fragment 821*b*. Accordingly, in response to a detected selection of the fragment variant tool 822 in connection with the content fragment 821*b*, the multivariate testing system 103 generates and provides one or more fragment variant recommendations for the content fragment 821*b*.

Figure 8J:
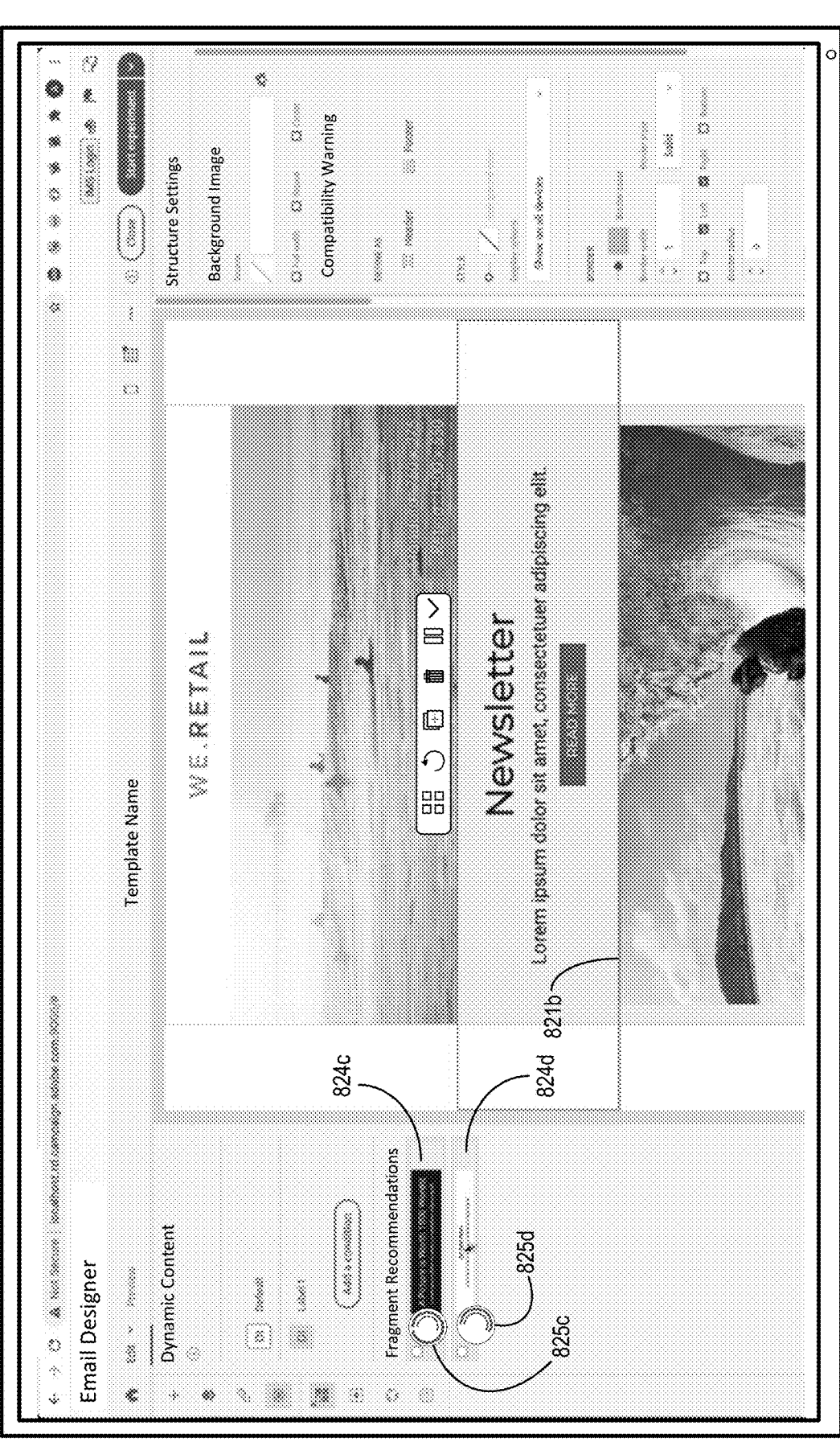
Figure 8K:
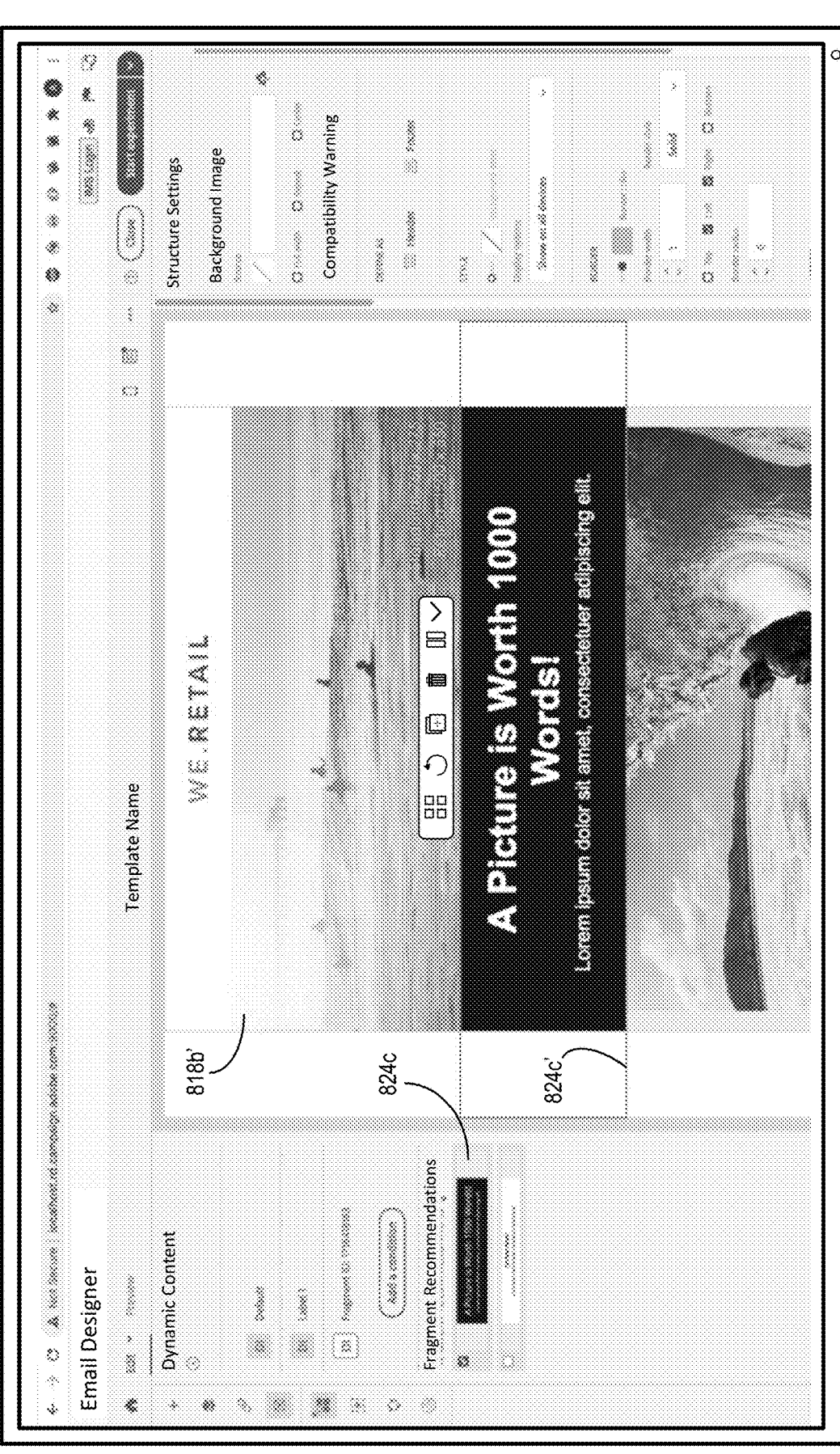

For example, utilizing the fragment machine learning model 320 in the process described above, the multivariate testing system 103 generates the fragment variant recommendations 824*c*, 824*d*, as shown in FIG. 8J. As with the fragment variant recommendations 824*a*, 824*b* above, the multivariate testing system 103 generates the fragment variant recommendation 824*c* including particular content items (e.g., blocks of text) with a background color, text color, font, size, and format. Additionally, the multivariate testing system 103 generates the fragment variant recommendation 824*d* including different content items (e.g., different blocks of text) with a different background color, text color, font, size, and format. To illustrate, the multivariate testing system 103 generates the fragment variant recommendations 824*c*, 824*d* for the content fragment 821*b* by providing historical sequences of instantiations of all of the content fragments in the digital communication template 818*b'*, where each sequence for the other content fragments besides the content fragment 821*b* ends with the instantiation currently included in the digital communication template 818*b'* (including the fragment variant 824*a'* discussed above). The fragment machine learning model 320 then varies the sequence associated with the content fragment 821*b* to determine fragment variant recommendations 824*c*, 824*d* that are associated with favorable predicted content item interaction performance metrics, indicated by the performance metric indicators 825*c*, 825*d*. As shown in FIG. 8K, and as discussed above with reference to FIG. 8H, the multivariate testing system 103 replaces the content fragment 821*b* with the fragment variant 824*c'* in response to a detected selection of the fragment variant recommendation 824*c*.

Figure 8L:
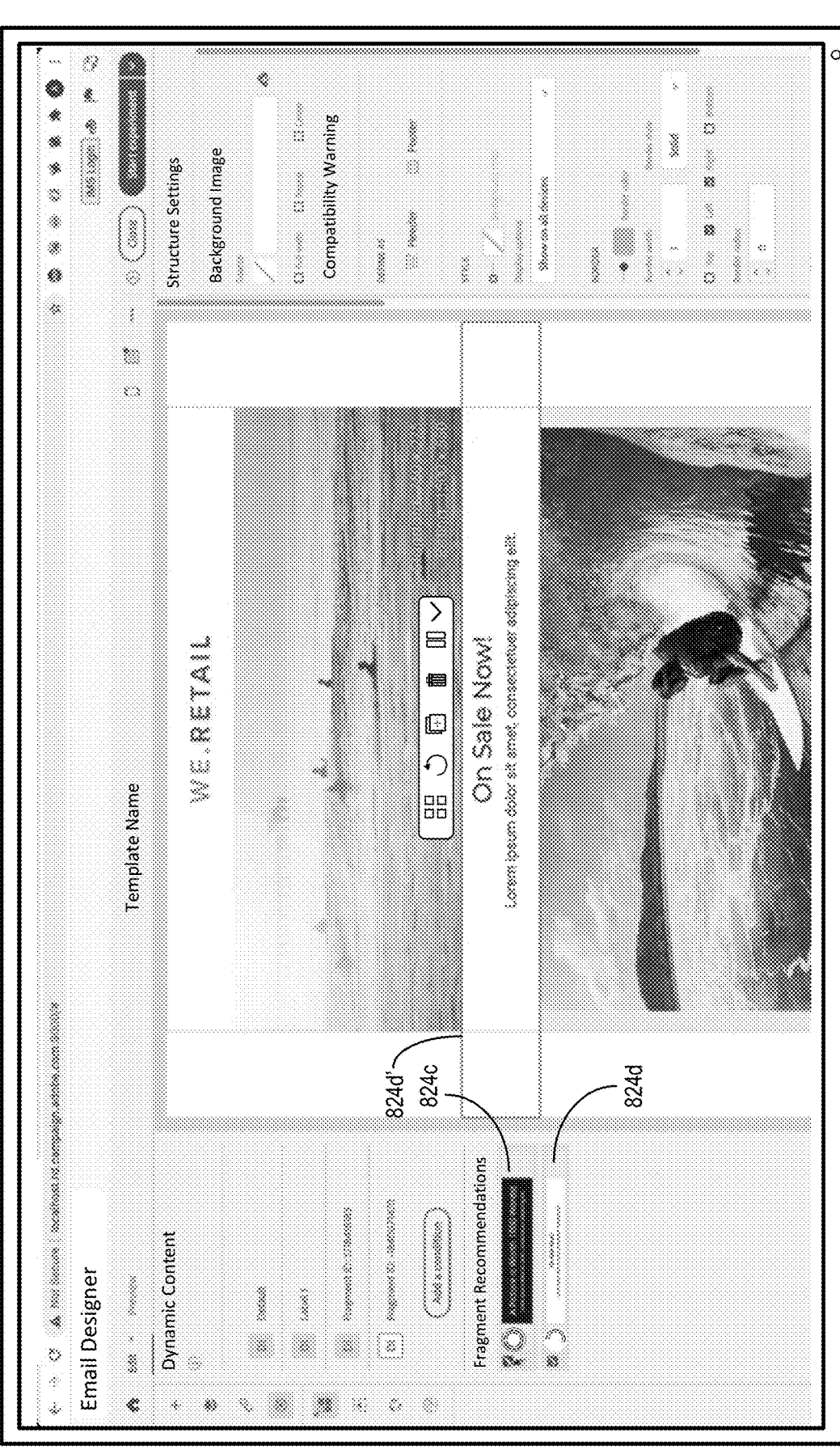

In at least one embodiment, the administrator may not know the best fragment variant recommendation to utilize in connection with a particular content fragment. Accordingly, in one or more embodiments, the multivariate testing system 103 allows for multiple selections of fragment variant recommendations to later inform multivariate testing recommendations. For example, as shown in FIG. 8L, the multivariate testing system 103 allows for selections of both the fragment variant recommendations 824*c*, 824*d* in connection with the content fragment 821*b*. As further shown in FIG. 8L, the multivariate testing system 103 replaces the fragment variant 824*c'* with the fragment variant 824*d'* in response to the latest detected selection of the fragment variant recommendation 824*c*.

Figure 8M:
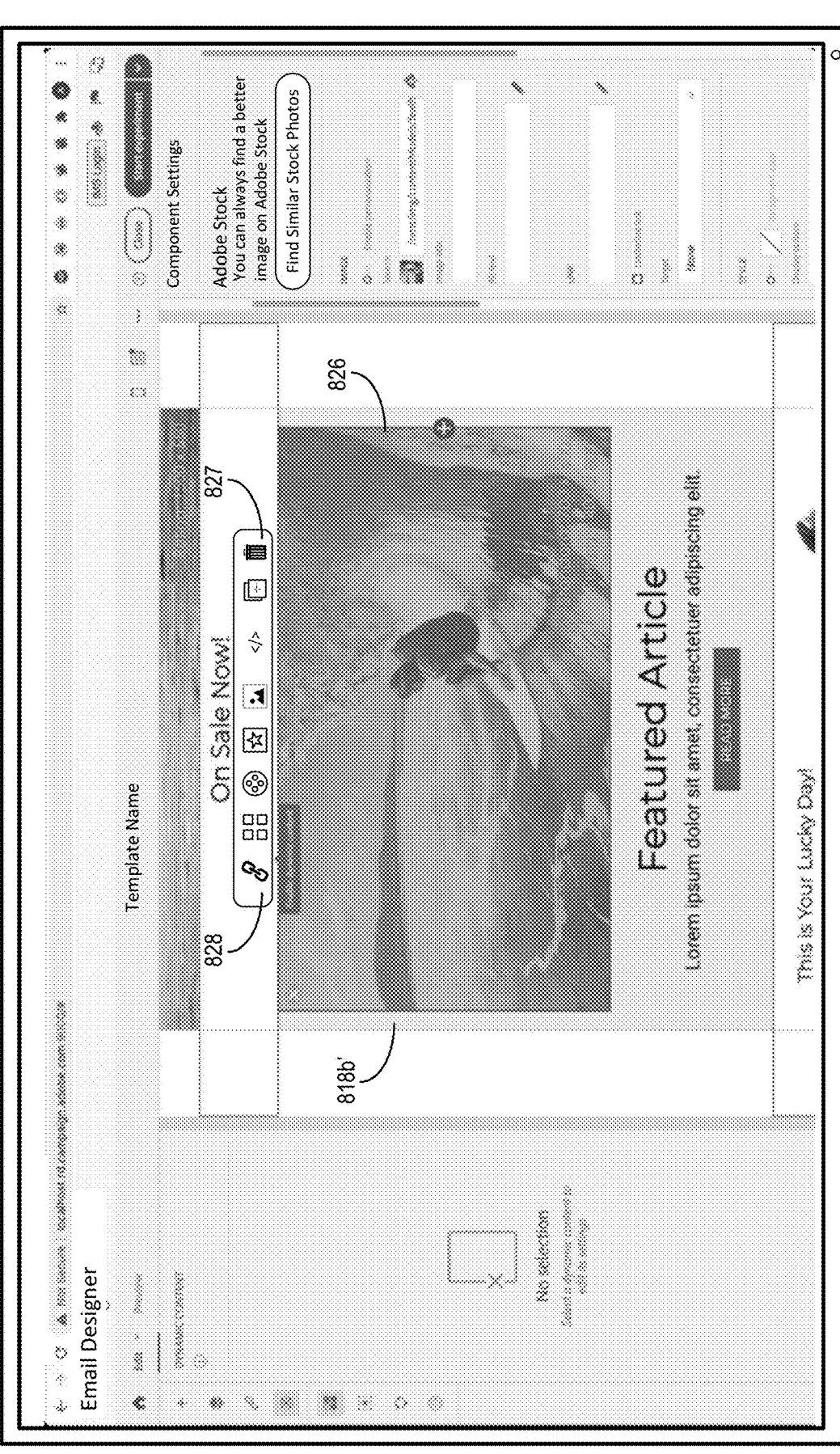

In one or more embodiments, the multivariate testing system 103 generates digital content variations for selected digital content items within a currently active digital communication template. For example, as shown in FIG. 8M, in response to a detected selection of the digital content item 826 (e.g., a digital image) within the digital communication template 818*b'* the digital communication management system 104 and/or the multivariate testing system 103 provides a digital content item options overlay 827 including various tools for use in connection with the digital content item 826. In response to a detected selection of the digital content variation tool 828, the multivariate testing system 103 determines and provides relevant digital content variations that are targeted to specified performance metrics.

For example, as discussed above, with reference to FIG. 6, the multivariate testing system 103 utilizes the image content model 322 to determine and augment descriptors associated with the digital content item 826. The image content model 322 then utilizes API calls to query one or more external content item repositories (e.g., the content item repository 120) to determine relevant digital content variations. The image content model 322 further determines predicted digital content performance metrics for the digital content variations, and provides a set of the digital content variations based on the predicted digital content performance metrics.

Figure 8N:
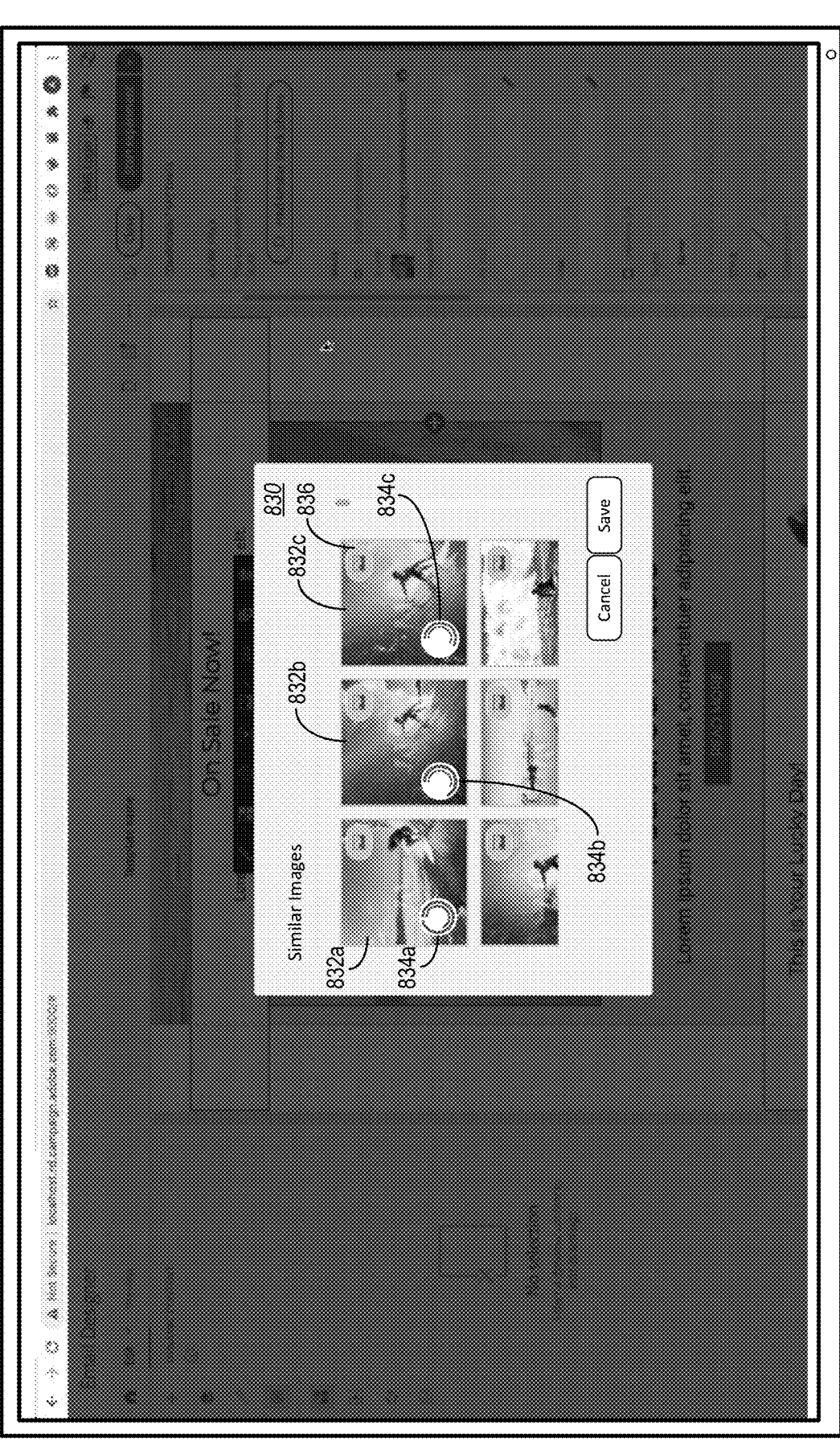
Figure 80:
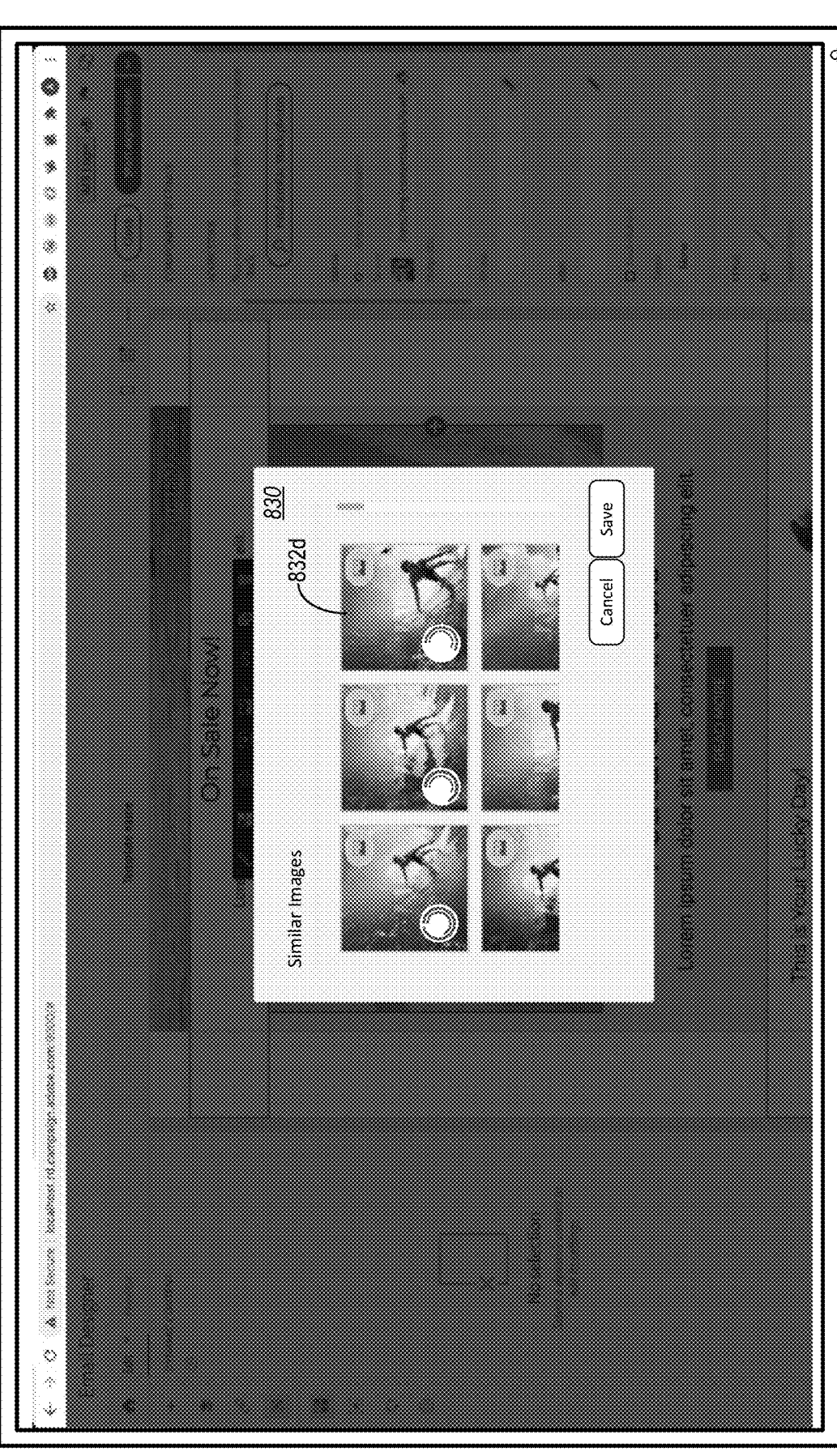

For instance, as shown in FIG. 8N, the multivariate testing system 103 generates and provides a content variation user interface 830 including the set of digital content variations 832*a*, 832*b*, 832*c*. In one or more embodiments, the multivariate testing system 103 provides the predicted digital content performance metric indicators 834*a*, 834*b*, 834*c* overlaid on each of the digital content variations 832*a*-832*c* indicating predicted performance of each digital content variations relative to a particular performance metric (e.g., click-throughs).

In at least one embodiment, the multivariate testing system 103 can generate and provide additional digital content variations relative to any of the digital content variations 832*a*-832*c*. For example, in response to a detected selection of a "more like this" button 836 overlaid on the digital content variation 832*c*, the multivariate testing system 103 can repeat the process described above utilizing the image content model 322 in connection with the digital content variation 832*c*. The multivariate testing system 103 then updates the content variation user interface 830 with the results of that additional analysis, as shown in FIG. 8O.

Figure 8P:
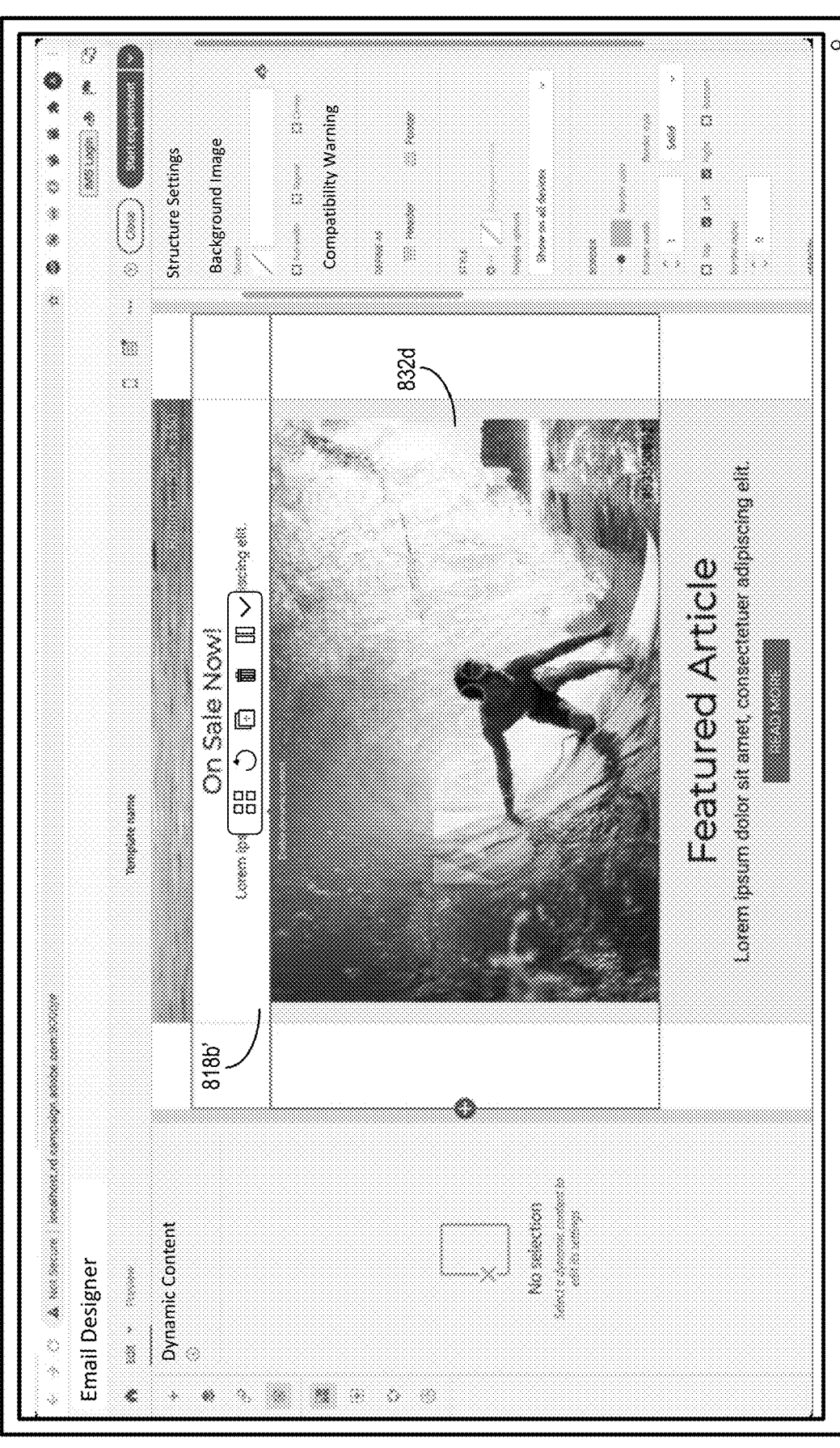

In response to a detected selection of a digital content variation 832*d*, the multivariate testing system 103 replaces the digital content item 826 in the digital communication template 818*b'* with the selected digital content variation 832*d*, as shown in FIG. 8P. In one or more embodiments, the multivariate testing system 103 replaces the digital content item 826 with the digital content variation 832*d* by modifying a size of the digital content variation 832*d* to match a size of the digital content item 826.

As discussed above, in one or more embodiments, the administrator may desire to determine which of multiple variations of the digital communication template performs best relative to one or more performance metrics. In order to guide the administrator in selecting the targeted performing variation of the digital communication template, the multivariate testing system 103 generates multivariate testing recommendations (e.g., that are fewer in number than every possible combination of content items, content fragments, and fragment variants associated with the digital communication template).

Figure 8Q:
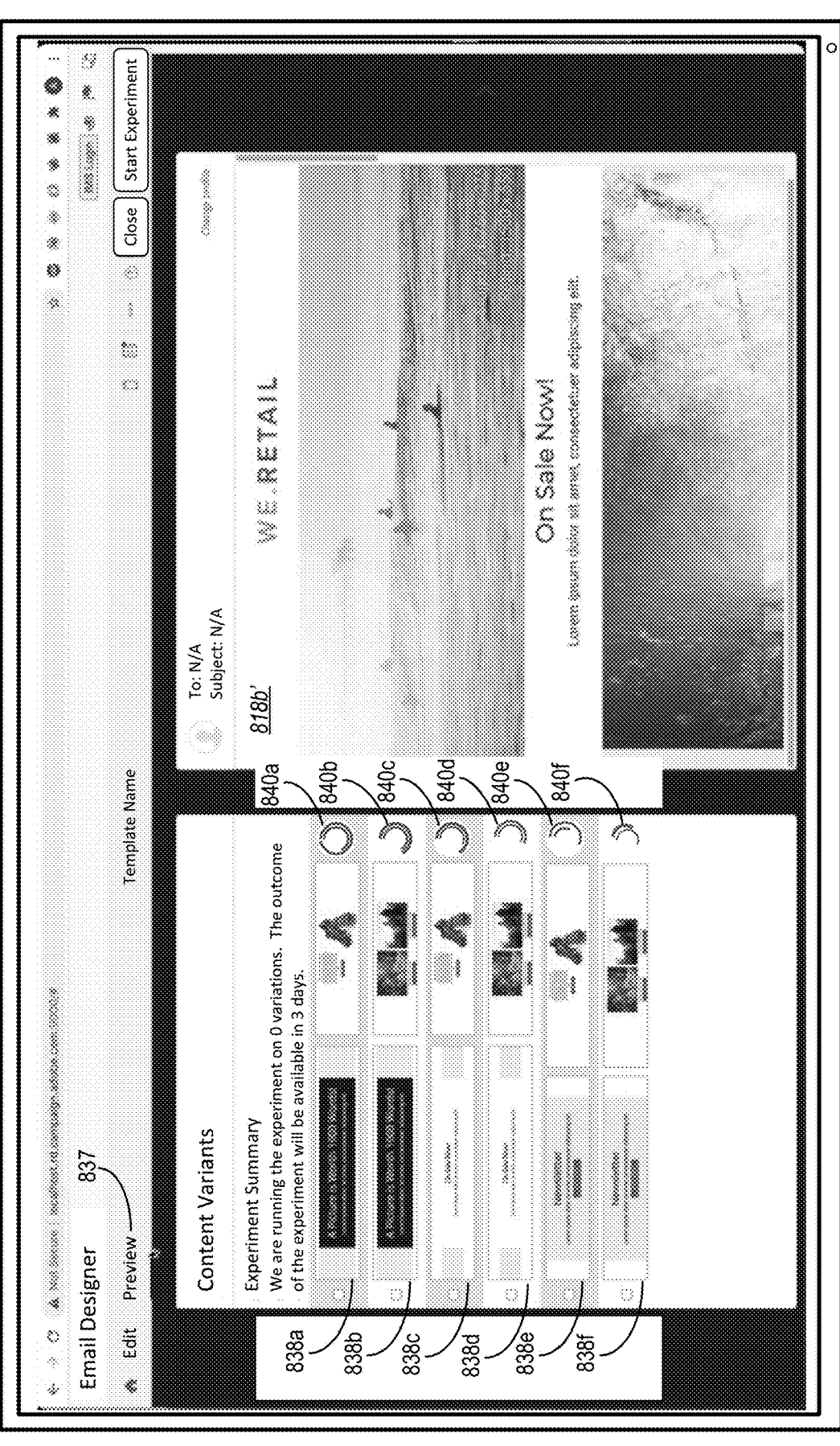
Figure 8R:
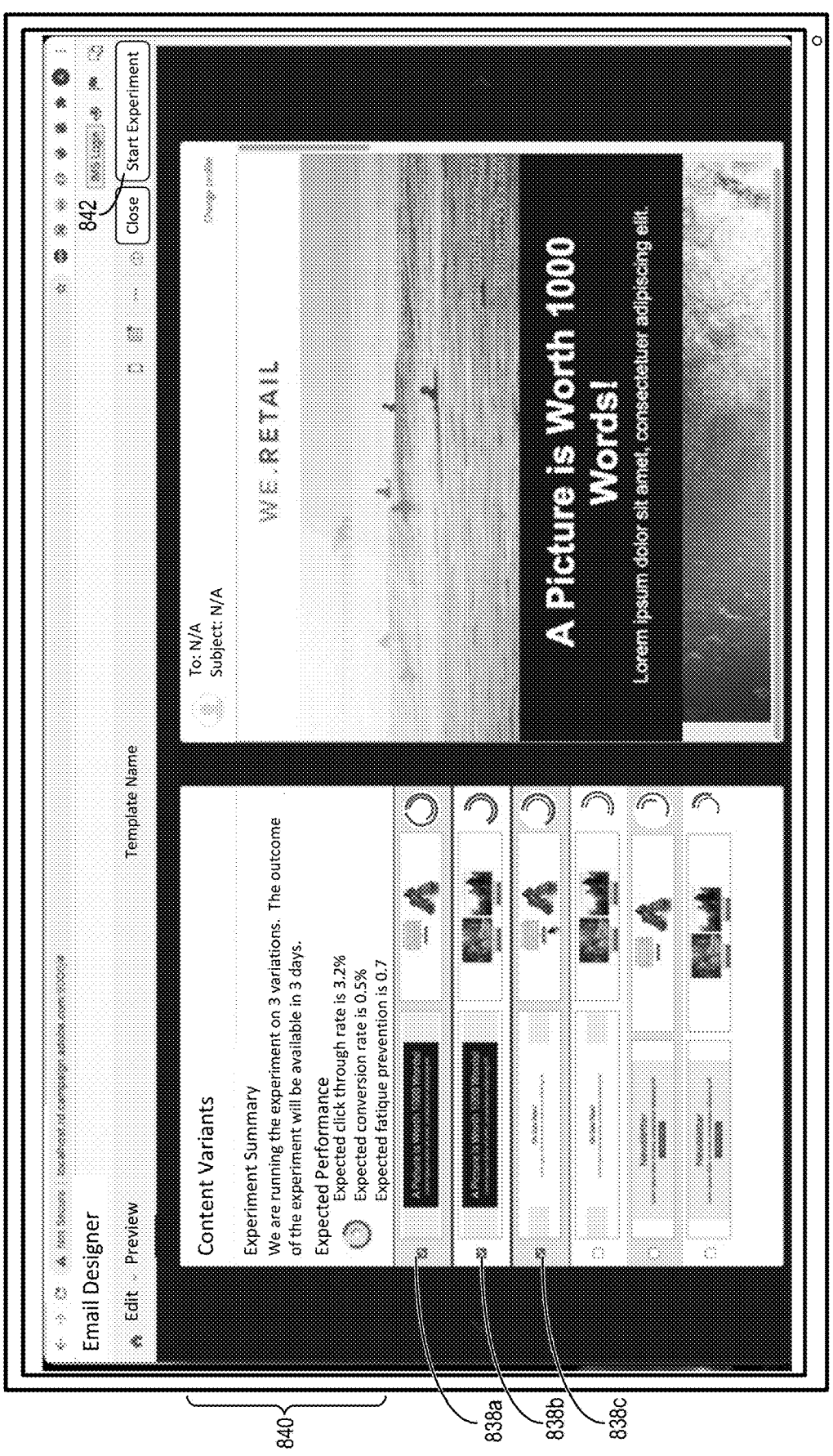

For example, as shown in FIG. 8Q, in response to a detected selection of the preview option 837, the multivariate testing system 103 generates and provides the multivariate testing recommendations 838*a*, 838*b*, 838*c*, 838*d*, 838*e*, and 838*f* in connection with the digital communication template 818*b'*. As discussed above, the multivariate testing system 103 generates the multivariate testing recommendations 828*a*-828*f* by utilizing the multivariate testing results prediction model 324 to generate and/or maintain a matrix of historical performance metrics relative to previously sent digital communications and previously used digital communication templates. The multivariate testing results prediction model 324 then generates embedding matrices (e.g., the embedding matrices U and V discussed above) that represent embeddings of the digital communications and digital communication templates, respectively. The multivariate testing results prediction model 324 further utilizes the embedding matrices to determine a predicted multivariate performance metric for a candidate digital communication.

In one or more embodiments, the multivariate testing system 103 determines one or more candidate digital communications relative to the digital communication template 818*b'* based on the selected fragment variants. For example, as shown in FIG. 8Q, in response to the user selecting to replace the content fragment 821*a* with the fragment variant 824*a'*, the multivariate testing system 103 generates multivariate testing recommendations 838*a*-838*f* drawn toward candidate digital communications including both the content fragment 821*a* (e.g., as with the multivariate testing recommendations 838*b*, 838*d*, and 838*f*) and the fragment variant 824*a'* (e.g., as with the multivariate testing recommendations 838*a*, 838*c*, and 838*e*). Moreover, in response to the detected selections of both of the fragment variant recommendations 824*c*, 824*d* relative to the content fragment 821*b*, the multivariate testing system 103 further generates multivariate testing recommendations drawn toward candidate digital communications including the fragment variant 824*c'* (e.g., as with the multivariate testing recommendations 838*a* and 838*b*), the fragment variant 824*d'* (e.g., as with the multivariate testing recommendations 838*c* and 838*d*, and the content fragment 821*b* (e.g., as with the multivariate testing recommendations 838*e* and 838*f*).

Accordingly, the multivariate testing system 103 generates and determines predicted multivariate performance metrics for candidate digital communications that include the possible combinations of fragment variants and their associated content fragments. As discussed above, the multivariate testing system 103 generates the predicted multivariate performance metrics for the candidate digital communications utilizing the embedding matrices described above. Thus, the multivariate testing system 103 predicts the performance metrics for the candidate digital communications based on observed performance metrics for similar historical digital communications.

As further shown in FIG. 8Q, the multivariate testing system 103 generates and provides predicted multivariate performance metric indicators 840a, 840b, 840c, 840d, 840e, and 840f associated with each of the multivariate testing recommendations 838a-838f. As with other performance metric indicators described herein, the predicted multivariate performance metric indicators 840a-840f illustrate the predicted multivariate performance metrics associated with each multivariate testing recommendation relative to one or more performance metrics (e.g., click-through rate, conversion rate). Accordingly, the multivariate testing system 103 utilizes the predicted multivariate performance metric indicators 840a-840f to guide the administrator in selecting multivariate testing recommendations that are likely to perform at certain levels.

In one or more embodiments, the multivariate testing system 103 also performs a multivariate test according to detected user selections of the multivariate testing recommendations. For example, as shown in FIG. 8R, in response to detected selections of the multivariate testing recommendations 838a-838c followed by a detected selection of the start experiment button 842, the multivariate testing system 103 performs a multivariate test of digital communications embodying the selected multivariate testing recommendations 838a-838c. For instance, the multivariate testing system 103 generates digital communications drawn to each of the selected multivariate testing recommendations 838a-838c, and sends the generated digital communications to one or more recipients. For example, the multivariate testing system 103 can equally divide a total audience of recipients based on the number of selected multivariate testing recommendations. Additionally or alternatively, the multivariate testing system 103 can send each of the generated digital communications to a specific audience or number of recipients.

In at least one embodiment, the multivariate testing system 103 provides updated information 840 in response to the detected selection of the start experiment button 842. For example, the multivariate testing system 103 provides the updated information 840 including the number of variants being tested, the duration of the multivariate test, and expected performance results. In one or more embodiments, the multivariate testing system 103 determines the expected performance results based on the predicted multivariate performance metrics associated with the selected multivariate testing recommendations 838a-838c.

During the duration of the multivariate test, the multivariate testing system 103 also collects performance data associated with the digital communications sent relative to the selected multivariate testing recommendations 838a-838c. For example, the multivariate testing system 103 collects performance data including whether the digital communications were opened, whether they were viewed (e.g., read) and otherwise interacted with, whether click-throughs resulted from the digital communications, and whether conversions resulted from the digital communications. Based on this collected performance data, and at the conclusion of the multivariate test, the multivariate testing system 103 determines a final digital communication to recommend for distribution to the larger or entire audience of recipients. Additionally, the multivariate testing system 103 utilizes the collected performance data to further train the multivariate testing results prediction model 324.

FIG. 9 illustrates a detailed schematic diagram of an embodiment 900 of the multivariate testing system 103 in accordance with one or more embodiments. As discussed above, the multivariate testing system 103 is operable on a variety of computing devices. Thus, for example, the multivariate testing server system 102 is operable on the server(s) 106 (as shown in FIG. 1). Additionally or alternatively, the mirrored multivariate testing system 103 is operable on the administrator computing device 112. In one or more embodiments, the multivariate testing server system 102 (or mirrored multivariate testing system 103) includes a communication manager 902, a template recommendation model manager 904, a fragment machine learning model manager 906, an image content model manager 908, a multivariate testing results prediction model manager 910, and a multivariate testing manager 912. As further shown in FIG. 9, the multivariate testing server system 102 operates in connection with the client database 122, and the digital communication database 124.

As mentioned above, and as shown in FIG. 9, the multivariate testing server system 102 includes the communication manager 902. In one or more embodiments, the communication manager 902 handles communication tasks between systems and devices while generating recommendations in connection with multivariate testing of digital communications. For example, the communication manager 902 generates and sends API calls to the third-party content system 118 to receive one or more digital content item variants (e.g., digital images) for use in configuring a digital communication. The communication manager receives indications of user interface selections from the administrator computing device 112, and provides generated recommendations to the administrator computing device 112.

As further shown in FIG. 9, the multivariate testing server system 102 includes the template recommendation model manager 904. In one or more embodiments, the template recommendation model manager 904 generates, maintains, trains, and utilizes the template recommendation model 318. For example, as discussed above with regard to FIG. 4, the template recommendation model manager 904 trains the template recommendation model 318 utilizing the client database 122 and the digital communication database 124. To illustrate, the template recommendation model manager 904 trains the template recommendation model 318 to extract topics from historical digital communications, and generate clusters of the historical digital communication based on the topics. For instance, the template recommendation model manager 904 trains the template recommendation model 318 to identify tags, descriptions, natural language, and metadata associated with a historical digital communication, and determine one or more topics for the historical digital communication based on the identified information.

The template recommendation model manager 904 further utilizes the template recommendation model 318 in response to detected selections via one or more user interfaces. For example, in response to a detected selections of one or more digital communication template options (e.g., as with the digital communication template options 816a-816e discussed above), the template recommendation model manager 904 identifies corresponding clusters, and sub-clusters of historical digital communications generated by the template recommendation model 318. The template recommendation model manager 904 further provides the identified historical digital communications for use as digital communication templates.

As further shown in FIG. 9, the multivariate testing server system 102 includes the fragment machine learning model manager 906. In one or more embodiments, the fragment machine learning model manager 906 generates, maintains, trains, and utilizes the fragment machine learning model 320. As discussed above with regard to FIG. 5, the fragment machine learning model 320 includes LSTM layers in connection with a graphical model. In at least one embodiment, the fragment machine learning model manager 906 trains these components of the fragment machine learning model 320 in different ways. For example, the fragment machine learning model manager 906 trains the LSTM layers and the graphical model in both online and an offline modes.

To illustrate, the fragment machine learning model manager 906 trains the LSTM layers and the graphical model of the fragment machine learning model 320 in an offline mode when historical data is available via the client database 122 and the digital communication database 124. For example, the fragment machine learning model manager 906 trains each of the LSTM layers by optimizing a cross entropy loss. Moreover, in at least one embodiment, the feature extractors of the LSTM layers (e.g., a BERT model to extract textual features, a ResNet model to extract image features) are pre-trained on large-scale external datasets.

Additionally, in the offline mode, the fragment machine learning model manager 906 trains the graphical model of the fragment machine learning model 320. For example, because the examination and reward nodes of the graphical model are unobservable, the fragment machine learning model manager 906 utilizes mean field approximation in variational inference. To illustrate, the fragment machine learning model manager 906 randomly sets values of the examination and reward nodes, as well as the conditional probabilities along the edges between the examination and reward nodes. The fragment machine learning model manager 906 then learns the correct values of these nodes and edges utilizing the historical data observations as ground truths. In one or more embodiments, the fragment machine learning model manager 906 alternates training of the LSTM layers and the graphical model in the offline mode.

The fragment machine learning model manager 906 further trains the LSTM layers and the graphical model in an online mode when data from live experiments is available. For example, the fragment machine learning model manager 906 utilizes user interaction information associated with fragment variant selections to further train the fragment machine learning model 320. In at least one embodiment, the fragment machine learning model manager 906 collects the user interaction information (e.g., information associated with selected fragment variants during digital communication configuration) and encodes this user preference information into the LSTM layers. For instance, the fragment machine learning model manager 906 utilizes the collected user preference information to fine tune the LSTM layers by optimizing a cross entropy loss on this new data.

For example, compared to the offline mode, in the online mode, the fragment machine learning model manager 906 collects data during the online interactions between a recipient and the fragment machine learning model 320. In at least one embodiment, the fragment machine learning model manager 906 develops a variational inference-based Thompson sampling algorithm that assumes T time steps in the online mode. At each time t, the sampling algorithm has three sub-steps: 1) the fragment machine learning model manager 906 samples the model parameter $\theta_t$ from its prior distribution $q(\theta)$; 2) the fragment machine learning model manager 906 decides an optimal action (i.e., the best instantiations of content fragments); and 3) the fragment machine learning model manager 906 observes recipient interactions (e.g., click feedback) and updates the fragment machine learning model 320.

For example, the fragment machine learning model manager 906 decides the optimal action with an LSTM-based hill climbing method. To illustrate, the fragment machine learning model manager 906 selects the optimal instantiation of each content fragment sequentially based on the output of the LSTM layers (e.g., the LSTM layers 504a-504n). Thus, by understanding recipient preferences over time encoded by the LSTM layers, the fragment machine learning model 906 filters out non-preferred instantiations. Thus, compared to previous methods, the fragment machine learning model manager 906 trains the fragment machine learning model 320 to identify an optimal instantiation (e.g., fragment variant) for each content fragment efficiently and accurately.

The fragment machine learning model manager 906 further updates the nodes and edges of the graphical model based on the new user preference data. For example, the fragment machine learning model manager 906 learns the graphical model (e.g., the graphical model 506 as shown in FIG. 5) of the fragment machine learning model 320 by variational inference. For example, the fragment machine learning model manager 906 learns the mode θ with intractable posterior (due to unobservable variables) $q(\theta)$ and track $q(\theta)$ for further online learning. To handle the intractable posterior, the fragment machine learning model manager 906 adopts mean field approximation in variational inference. Specifically, let $e_j$ denote a vector representing the instantiations of all examination nodes (e.g., the examination nodes 508a-508n as shown in FIG. 5) in the $j^{th}$ session, and let $r_j$ denote a vector representing the instantiations of all the reward nods (e.g., the reward nodes 510a-510n as shown in FIG. 5) in the $j^{th}$ session. By mean field approximation, on the data collected from t user sessions, the fragment machine learning model manager 906 approximates the posterior by $$q(e_1, e_2, \ldots, e_t, \theta) = q(\theta) \prod_j^t q_j(e_j).$$

To get updated $q_j(e_j)$ and $q(\theta)$, on the collected data, the fragment machine learning model manager 908 alternates the calculation of $q_j(e_j) \propto \exp[\int_\theta q(\theta) \log P(r_j, e_j | \theta) d\theta]$ and the calculation of $$q(\theta) \propto \exp\left[\log P(\theta) + \sum_{j=1}^t \sum_{e_j} q_j(e_j) \log P(r_j, e_j | \theta)\right]$$

until training converges.

The fragment machine learning model manager 906 uses the parameters of LSTM layers and the posterior of the graphical model of the fragment machine learning model 320 learned in the offline mode as the initializations during the online mode. Thus, the fragment machine learning model manager 906 fine-tunes the LSTM layers by optimizing a cross entropy loss on the new data from live experiments in the online mode. The fragment machine learning model manager 906 further fine-tunes the graphical model by updating $q_j(e_j)$ and $q(\theta)$, following the update rules detailed above with regard to offline training, and as follows:

For t=1, 2, . . . , T:

1. Sample $\theta_t$ from its prior $q(\theta)$.

2. Choose the instantiations for all the M content fragments, $w_t = \text{argmax}_{w \in H} r(w, \theta_t)$. For example, utilizing the LSTM-based hill climbing method.

3. Receive recipient feedback to the fragment variants or digital communication including the fragment variants, and update $q(\theta)$ by variational inference and update the LSTM layers.

The fragment machine learning model manager 906 trains and periodically re-trains the fragment machine learning model 320. For example, the fragment machine learning model manager 906 re-trains the fragment machine learning model 320 at regular time intervals. Additionally or alternatively, the fragment machine learning model manager 906 re-trains the fragment machine learning model 320 after a threshold number of utilizations of the fragment machine learning model 320.

In one or more embodiments, the fragment machine learning model manager 906 utilizes the fragment machine learning model 320 in response to receiving a digital communication template, a selected content fragment, and historical information associated with the digital communication template. Utilizing this information, as discussed above with reference to FIG. 5, the fragment machine learning model manager 906 generates fragment variants for the selected content fragment and predicted content fragment performance metrics for the fragment variants.

As further shown in FIG. 9, the multivariate testing server system 102 includes the image content model manager 908. In one or more embodiments, the image content model manager 908 generates, maintains, trains, and utilizes the image content model 322 to generate digital content variants and predicted digital content performance metrics for the digital content variants. For example, as discussed above with reference to FIG. 6, the image content model manager 908 trains the image content model 322 to determine descriptors of a selected digital content item by training an image analysis component of the image content model 322 (e.g., ResNet model). Additionally, the image content model manager 908 trains the image content model 322 to leverage one or more relevant knowledge graphs to further augment the determined descriptors. Finally, the image content model manager 908 trains the image content model 322 to utilize historical information associated with determined digital content variants to generate predicted digital content performance metrics for the digital content variates relative to one or more performance metrics.

As further shown in FIG. 9, the multivariate testing server system 102 includes the multivariate testing results prediction model manager 910. In one or more embodiments, multivariate testing results prediction model manager 910 generates, maintains, trains, and utilizes the multivariate testing results prediction model 324. For example, the multivariate testing results prediction model manager 910 causes the multivariate testing results prediction model 324 to generate one or more matrices of historical performance metrics, and corresponding embedding matrices, as discussed above with reference to FIG. 7. The multivariate testing results prediction model manager 910 further trains the multivariate testing results prediction model 324 to generate predicted multivariate performance metrics for candidate digital communications utilizes the embedding matrices. Additionally, in one or more embodiments, the multivariate testing results prediction model manager 910 generates candidate digital communications based on selected fragment variants within a currently active digital communication template.

As further shown in FIG. 9, the multivariate testing server system 102 includes the multivariate testing manager 912. In one or more embodiments, the multivariate testing manager 912 receives recipient information and conducts a multivariate test according to one or more selected multivariate testing recommendations. For example, the multivariate testing manager 912 sends three or more candidate digital communications including one or more fragment variants to client computing devices during a multivariate testing period. For instance, the multivariate testing manager 912 divides the recipient audience of client computing devices into a number corresponding to a selected number of multivariate testing recommendations.

After sending the corresponding candidate digital communications, the multivariate testing manager 912 collects performance information associated with the candidate digital communications and utilizes the collected performance information to recommend a final digital communication, and to train one or more models disclosed herein. For example, the multivariate testing manager 912 collection conversion information, click-through information, and other performance information that results from sending the candidate digital communications to the client computing devices. The multivariate testing manager 912 then determines the best performing candidate digital communication to recommend as the final digital communication to send to a wider audience of client computing devices. In at least one embodiment, the multivariate testing manager 912 further utilizes the collected performance information to additionally train one or more of the models described herein.

Each of the components 902-912 of the multivariate testing server system 102 (or the mirrored multivariate testing system 103) includes software, hardware, or both. For example, the components 902-912 includes one or more instructions stored on a computer-readable storage medium and executable by processors of one or more computing devices, such as a client computing device or server device. When executed by the one or more processors, the computer-executable instructions of multivariate testing server system 102 causes the computing device(s) to perform the methods described herein. Alternatively, the components 902-912 includes hardware, such as a special-purpose processing device to perform a certain function or group of functions. Alternatively, the components 902-912 of the multivariate testing server system 102 includes a combination of computer-executable instructions and hardware.

Furthermore, the components 902-912 of the multivariate testing server system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-912 may be implemented as a stand-alone application, such as a desktop or mobile application. Furthermore, the components 902-912 may be implemented as one or more web-based applications hosted on a remote server. The components 902-912 may also be implemented in a suite of mobile device applications or "apps." To illustrate, the components 902-912 may be implemented in an application, including but not limited to ADOBE ANALYTICS CLOUD, such as ADOBE ANALYTICS, ADOBE AUDIENCE MANAGER, ADOBE CAMPAIGN, ADOBE EXPERIENCE MANAGER, ADOBE TARGET, and ADOBE CUSTOMER JOURNEY ANALYTICS. The foregoing are either registered trademarks or trademarks of Adobe Systems Incorporated in the United States and/or other countries.

FIGS. 1-9, the corresponding text, and the examples provide a number of different methods, systems, devices, and non-transitory computer-readable media of the multivariate testing system 103. In addition to the foregoing, one or more embodiments can also be described in terms of flowcharts comprising acts for accomplishing a particular result, as shown in FIGS. 10, 11, and 12. FIGS. 10-12 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for identifying a set of digital communication variants for multivariate texting across a plurality of computing devices in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1010 of determining digital communication templates based on predicted digital communication performance metrics. In particular, the act 1010 involves determining, utilizing a template recommendation model, digital communication templates based on predicted digital communication performance metrics for the digital communication templates. For example, determining, the utilizing the template recommendation model, the digital communication templates includes identifying historical digital communications comprising digital communication contents and associated with historical performance data; determining, from the historical performance data, predicted digital communication performance metrics for digital communication templates corresponding to the historical digital communications; and providing digital communication templates utilizing the predicted digital communication performance metrics. For instance, in some embodiments, the act 1010 further includes generating categories of the digital communication templates based on the digital communication contents of the associated historical digital communications; and providing the digital communication templates based on the generated categories.

As shown in FIG. 10, the series of acts 1000 includes an act 1020 of generating fragment variants for a selected content fragment based on predicted content fragment performance metrics. In particular, the act 1020 involves in response to selection of a digital communication template corresponding to a content fragment, generating, utilizing a fragment machine learning model, fragment variants for the content fragment based on predicted content fragment performance metrics for the fragment variants. For example, generating, utilizing the fragment machine learning model, the fragment variants for the content fragment includes: generating an input vector for the fragment machine learning model by encoding historical instantiation data associated with the content fragment; and utilizing an LSTM layer of the fragment machine learning model in connection with a model of historical viewing and interaction behavior relative to the content fragment to generate a predicted content item interaction performance metric for an instantiation of the content fragment.

In one or more embodiments, the series of acts 1000 includes an act of, in response to selection of a digital content item within a selected fragment variant, utilizing an image content model to generate digital content variants for the digital content item. For example, utilizing the image content model to generate digital content variants for the digital content item includes: determining one or more descriptors for the digital content item; identifying digital content variants from the one or more descriptors; generate predicted digital content performance metrics for the digital content variants; and providing a subset of the digital content variants from the predicted digital content performance metrics.

As shown in FIG. 10, the series of acts 1000 includes an act 1030 of generating multivariate digital communication testing recommendations including the fragment variants based on predicted multivariate performance metrics. In particular, the act 1030 involves generating, utilizing a multivariate testing results prediction model, multivariate testing recommendations comprising the fragment variants from predicted multivariate performance metrics for the multivariate testing recommendations. For example, generating the multivariate testing recommendations includes: generating predicted digital communication performance metrics for candidate digital communications comprising the fragment variants from historical performance data associated with historical digital communications; and generating the multivariate testing recommendations from a subset of the candidate digital communications based on the predicted digital communication performance metrics. In one or more embodiments, the series of acts 1000 further includes acts of receiving multivariate test performance metrics from a multivariate test of three or more of the multivariate testing recommendations; and generating a digital communication comprising a multivariate digital communication test recommendation from the multivariate test performance metrics.

As mentioned, FIG. 11 illustrates a flowchart of a series of acts 1100 for identifying a set of digital communication variants for multivariate testing across a plurality of computing devices in connection with determining a fragment variant for a content fragment of a digital communication template in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1110 of generating a feature vector utilizing an LSTM layer from a historical sequence of fragment variants of a content fragment. In particular, the act 1110 involves generating a feature vector utilizing an LSTM layer of the plurality of LSTM layers from a historical sequence of fragment variants of a content fragment corresponding to a digital communication.

In at least one embodiment, the series of acts 1100 includes identifying the set of digital communication variants for multivariate testing across a plurality of computing devices by generating an encoding of features of the historical sequence of fragment variants. For example, generating the encoding of features of the historical sequence of fragment variants includes: extracting image features from the historical sequence of fragment variants; extracting textual features from the historical sequence of fragment variants; and generating the encoding from the extracted image features and the extracted textual features.

In at least one embodiment, the series of acts 1100 includes an act of generating the graphical model of spatial dependencies associated with the content fragment by: modeling, within the examination node, viewing behaviors relative to the content fragment from historical communication information associated with the digital communication; modeling, within the reward node, interaction behaviors relative to the content fragment from historical communication information associated with the digital communication; and determining an edge weight for the edge between the examination node and the reward node based on one or more conditional probabilities.

As shown in FIG. 11, the series of acts 1100 includes an act 1120 of generating a predicted content fragment performance metric from the feature vector utilizing an examination node, an edge, and a reward node of the graphical model. In particular, the act 1120 involves generating a predicted content fragment performance metric from the feature vector utilizing an examination node, an edge, and a reward node of the graphical model. For example, generating the predicted content fragment performance metrics from the feature vector includes: modifying the feature vector based on the examination node, the edge, and the reward node of the graphical model; and generating the predicted content fragment performance metrics from the modified feature vector.

As shown in FIG. 11, the series of acts 1100 includes an act 1130 of determining a fragment variant of the content fragment corresponding to the digital communication utilizing the predicted content fragment performance metric. In particular, the act 1130 involves determining a fragment variant of the content fragment corresponding to the digital communication utilizing the predicted content fragment performance metric.

In one or more embodiments, the series of acts 1100 includes an act of further identifying the set of digital communication variants for multivariate testing across the plurality of computing devices. For example, further identifying the set of digital communication variants includes: generating an additional feature vector utilizing an additional LSTM layer of the plurality of LSTM layers from a historical sequence of fragment variants of an additional content fragment corresponding to the digital communication; generating an additional predicted content fragment performance metrics from the additional feature vector utilizing an additional examination node, an additional edge, and an additional reward node of the graphical model; and determining a fragment variant of the additional content fragment corresponding to the digital communication utilizing the additional predicted content fragment performance metrics. In at least one embodiment, the graphical model further comprises a combination performance node reflecting predicted responses to combinations of the fragment variants of the content fragment and fragment variants of the additional content fragment.

As mentioned, FIG. 12 illustrates a flowchart of a series of acts 1200 for providing multivariate testing recommendations for display in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some embodiments, a system can perform the acts of FIG. 12.

As shown in FIG. 12, the series of acts 1200 includes an act 1210 of providing digital communication templates and predicted digital communication performance metrics corresponding to the plurality of digital communication templates. In particular, the act 1210 involves providing, for display, a plurality of digital communication templates and predicted digital communication performance metrics corresponding to the plurality of digital communication templates. For example, in one or more embodiments, providing the plurality of digital communication templates is in response to detected selections of one or more of a digital communication category, an audience segment definition, or one or more predicted digital communication performance metrics. In at least one embodiment, providing the predicted digital communication performance metrics corresponding to the plurality of digital communication templates includes: generating performance metric indicators indicating two or more predicted digital communication performance metrics corresponding to the plurality of digital communication templates; and overlaying the performance metric indicators on the plurality of digital communication templates.

As shown in FIG. 12, the series of acts 1200 includes an act 1220 of providing an editable digital communication according to the digital communication template. In particular, the act 1220 involves in response to a selection of a digital communication template, providing, for display, an editable digital communication and a plurality of content fragments according to the digital communication template.

As shown in FIG. 12, the series of acts 1200 includes an act 1230 of providing fragment variants for a content fragment according to a predicted content fragment performance metric. In particular, the act 1230 involves in response to a user interaction with a content fragment, providing, for display, a plurality of fragment variants for the content fragment according to predicted content fragment performance metrics for the plurality of fragment variants. For example, providing the plurality of fragment variants for the content fragment according to the predicted digital content performance metrics includes: identifying previous digital communications comprising the selected digital communication template; determining, from viewing and interaction information associated with the previous digital communications, temporal and spatial dependencies between the content fragment and other content fragments in the selected digital communication template; and determining the plurality of fragment variants based on the temporal and spatial dependencies.

In at least one embodiment, the series of acts 1200 includes an act of, in response to a selection of a fragment variant from the plurality of fragment variants, replacing the content fragment in the digital communication template with the selected fragment variant. Additionally, in at least one embodiment, the series of acts 1200 includes an act of, in response to a selection of a content item within the selected fragment variant, providing a plurality of content item variants and predicted content item performance metrics corresponding to the plurality of content item variants.

As shown in FIG. 12, the series of acts 1200 includes an act 1240 of providing multivariate testing recommendations and corresponding predicted multivariate performance metrics. In particular, the act 1240 involves in response to selection of fragment variants of the plurality of fragment variants, providing, for display, a plurality of multivariate testing recommendations and corresponding predicted multivariate performance metrics. For example, providing the plurality of multivariate testing recommendations includes: generating combinations of content fragments within the digital communication template including the selected fragment variants; generating predicted multivariate performance metrics for the combinations of content fragments; and providing, for display, a set of combinations of content fragments from the predicted multivariate performance metrics.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media are any available media that is accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which are used to store desired program code means in the form of computer-executable instructions or data structures and which are accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media includes a network and/or data links which are used to carry desired program code means in the form of computer-executable instructions or data structures and which are accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
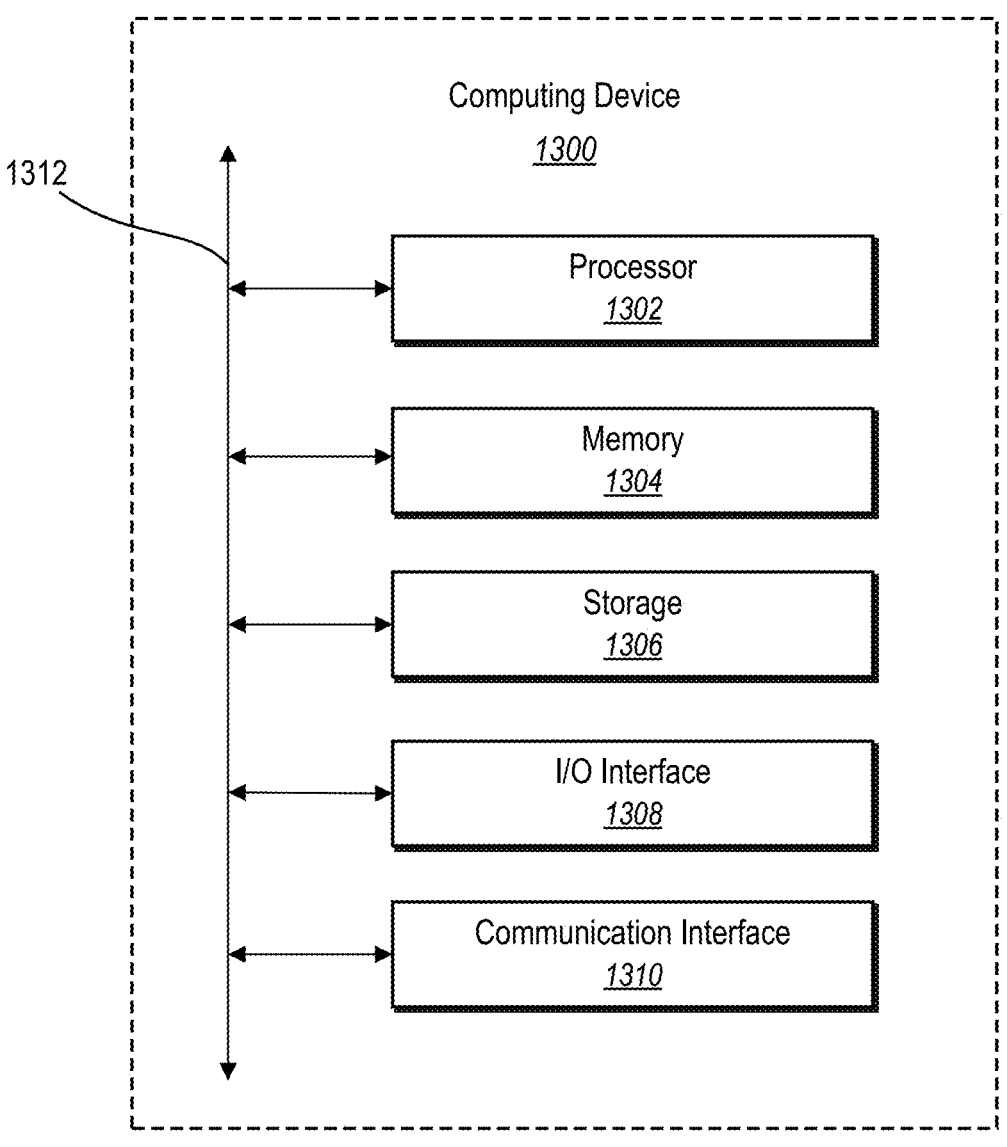
FIG. 13 illustrates a block diagram of an example computing device for implementing one or more embodiments of the present disclosure.

FIG. 13 illustrates a block diagram of an example computing device 1300 that may be configured to perform one or more of the processes described above. One will appreciate that one or more computing devices, such as the computing device 1300 may represent the computing devices described above (e.g., the server(s) 106, the client computing devices 116*a*-116*c*, the administrator computing device 112). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client computing device). Further, the computing device 1300 may be a server device that includes cloud-based processing and storage capabilities.

As shown in FIG. 13, the computing device 1300 includes one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 includes a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 includes hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 includes hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable storage medium comprising instructions that, when executed by at least one processor, cause a computing device to identify a set of digital communication variants for multivariate testing across a plurality of computing devices by:

determining, utilizing a template recommendation model, digital communication templates based on predicted digital communication performance metrics for the digital communication templates;

in response to selection, via a graphical user interface, of a digital communication template corresponding to a content fragment, generating, utilizing a fragment machine learning model, fragment variants for the content fragment based on predicted content fragment performance metrics for the fragment variants by:

identifying previous digital communications comprising the selected digital communication template;

determining, from viewing and interaction information associated with the previous digital communications, temporal dependencies and spatial dependencies between the content fragment and other content fragments in the selected digital communication template; and generating the fragment variants based on the temporal dependencies and the spatial dependencies;

generating, utilizing a multivariate testing results prediction model, predicted multivariate performance metrics for combinations of content fragments including the fragment variants;

generating multivariate testing recommendations based on the generated predicted multivariate performance metrics, each multivariate testing recommendation comprising a respective combination of content fragments and including a fragment variant; and modifying the graphical user interface to comprise two or more of the multivariate testing recommendations and respective performance metric indicator graphical elements, each respective performance metric indicator graphical element visually depicting one or more volumes that are filled in to a level reflective of and corresponding to one or more respective predicted multivariate performance metrics corresponding to the respective multivariate testing recommendation.

2. The non-transitory computer-readable storage medium as recited in claim 1, wherein determining, utilizing the template recommendation model, the digital communication templates comprises:

identifying historical digital communications comprising digital communication contents and associated with historical performance data;

determining, from the historical performance data, predicted digital communication performance metrics for digital communication templates corresponding to the historical digital communications; and providing digital communication templates utilizing the predicted digital communication performance metrics.

3. The non-transitory computer-readable storage medium as recited in claim 2, further comprising instructions that, when executed by the at least one processor, cause the computing device to perform operations comprising:

generating categories of the digital communication templates based on the digital communication contents of the associated historical digital communications; and providing the digital communication templates based on the generated categories.

4. The non-transitory computer-readable storage medium as recited in claim 1, wherein generating, utilizing the fragment machine learning model, the fragment variants for the content fragment comprises determining temporal dependencies by:

generating a plurality of input vectors for the fragment machine learning model by encoding historical instantiation data reflecting user behaviors associated with the content fragment across multiple consecutive sessions; and utilizing a plurality of LSTM layers of the fragment machine learning model in connection with a model of historical viewing and interaction behavior relative to the content fragment to generate a predicted content item interaction performance metric for instantiations of the content fragment.

5. The non-transitory computer-readable storage medium as recited in claim 1, further comprising instructions that, when executed by the at least one processor, cause the computing device to, in response to selection of a digital content item within a selected fragment variant, utilize an image content model to generate digital content variants for the digital content item by:

determining one or more descriptors for the digital content item;

identifying digital content variants from the one or more descriptors;

generating predicted digital content performance metrics for the digital content variants; and providing a subset of the digital content variants from the predicted digital content performance metrics.

6. The non-transitory computer-readable storage medium as recited in claim 1, wherein generating the multivariate testing recommendations comprises:

generating predicted digital communication performance metrics for candidate digital communications comprising the fragment variants from historical performance data associated with historical digital communications; and generating the multivariate testing recommendations from a subset of the candidate digital communications based on the predicted digital communication performance metrics.

7. The non-transitory computer-readable storage medium as recited in claim 1, further comprising instructions that, when executed by the at least one processor, cause the computing device to perform operations comprising:

receiving a user interaction within the graphical user interface indicating an additional selection of a subset of the multivariate testing recommendations for live multivariate testing; and executing live multivariate testing on the additional selection of the subset of the multivariate testing recommendations by segmenting an audience of recipient client computing devices according to a number of the subset of the multivariate testing recommendations.

8. A system comprising:

one or more memory devices; and one or more processors configured to cause the system to identify a set of digital communication variants for multivariate testing across a plurality of computing devices by:

determining, utilizing a template recommendation model, digital communication templates based on predicted digital communication performance metrics for the digital communication templates;

in response to selection, via a graphical user interface, of a digital communication template corresponding to a content fragment, generating, utilizing a fragment machine learning model, fragment variants for the content fragment based on predicted content fragment performance metrics for the fragment variants by:

identifying previous digital communications comprising the selected digital communication template;

determining, from viewing and interaction information associated with the previous digital communications, temporal dependencies and spatial dependencies between the content fragment and other content fragments in the selected digital communication template; and generating the fragment variants based on the temporal dependencies and the spatial dependencies;

generating, utilizing a multivariate testing results prediction model, predicted multivariate performance metrics for combinations of content fragments including the fragment variants;

generating multivariate testing recommendations based on the generated predicted multivariate performance metrics, each multivariate testing recommendation comprising a respective combination of content fragments and including a fragment variant; and modifying the graphical user interface to comprise two or more of the multivariate testing recommendations and respective performance metric indicator graphical elements, each respective performance metric indicator graphical element visually depicting one or more volumes that are filled in to a level reflective of and corresponding to one or more respective predicted multivariate performance metrics corresponding to the respective multivariate testing recommendation.

9. The system of claim 8, wherein determining, utilizing the template recommendation model, the digital communication templates comprises:

identifying historical digital communications comprising digital communication contents and associated with historical performance data;

determining, from the historical performance data, predicted digital communication performance metrics for digital communication templates corresponding to the historical digital communications; and providing digital communication templates utilizing the predicted digital communication performance metrics.

10. The system of claim 9, wherein the one or more processors are further configured to cause the system to perform operations comprising:

generating categories of the digital communication templates based on the digital communication contents of the associated historical digital communications; and providing the digital communication templates based on the generated categories.

11. The system of claim 8, wherein generating, utilizing the fragment machine learning model, the fragment variants for the content fragment comprises:

generating an input vector for the fragment machine learning model by encoding historical instantiation data associated with the content fragment; and utilizing an LSTM layer of the fragment machine learning model in connection with a model of historical viewing and interaction behavior relative to the content fragment to generate a predicted content item interaction performance metric for an instantiation of the content fragment.

12. The system of claim 8, wherein the one or more processors are further configured to cause the system to, in response to selection of a digital content item within a selected fragment variant, utilize an image content model to generate digital content variants for the digital content item by:

determining one or more descriptors for the digital content item;

identifying digital content variants from the one or more descriptors;

generating predicted digital content performance metrics for the digital content variants; and providing a subset of the digital content variants from the predicted digital content performance metrics.

13. The system of claim 8, wherein generating the multivariate testing recommendations comprises:

generating predicted digital communication performance metrics for candidate digital communications comprising the fragment variants from historical performance data associated with historical digital communications; and generating the multivariate testing recommendations from a subset of the candidate digital communications based on the predicted digital communication performance metrics.

14. The system of claim 8, wherein the one or more processors are further configured to cause the system to perform operations comprising:

receiving multivariate test performance metrics from a multivariate test of three or more of the multivariate testing recommendations; and generating a digital communication comprising a multivariate digital communication test recommendation from the multivariate test performance metrics.

15. A computer-implemented method comprising identifying a set of digital communication variants for multivariate testing across a plurality of computing devices by:

determining, utilizing a template recommendation model, digital communication templates based on predicted digital communication performance metrics for the digital communication templates;

in response to selection, via a graphical user interface, of a digital communication template corresponding to a content fragment, generating, utilizing a fragment machine learning model, fragment variants for the content fragment based on predicted content fragment performance metrics for the fragment variants by:

identifying previous digital communications comprising the selected digital communication template;

determining, from viewing and interaction information associated with the previous digital communications, temporal dependencies and spatial dependencies between the content fragment and other content fragments in the selected digital communication template; and generating the fragment variants based on the temporal dependencies and the spatial dependencies;

generating, utilizing a multivariate testing results prediction model, predicted multivariate performance metrics for combinations of content fragments including the fragment variants;

generating multivariate testing recommendations based on the generated predicted multivariate performance metrics, each multivariate testing recommendation comprising a respective combination of content fragments and including a fragment variant; and modifying the graphical user interface to comprise two or more of the multivariate testing recommendations and respective performance metric indicator graphical elements, each respective performance metric indicator graphical element visually depicting one or more volumes that are filled in to a level reflective of and corresponding to one or more respective predicted multivariate performance metrics corresponding to the respective multivariate testing recommendation.

16. The computer-implemented method of claim 15, wherein determining, utilizing the template recommendation model, the digital communication templates comprises:

identifying historical digital communications comprising digital communication contents and associated with historical performance data;

determining, from the historical performance data, predicted digital communication performance metrics for digital communication templates corresponding to the historical digital communications; and providing digital communication templates utilizing the predicted digital communication performance metrics.

17. The computer-implemented method of claim 15, wherein generating, utilizing the fragment machine learning model, the fragment variants for the content fragment comprises:

generating an input vector for the fragment machine learning model by encoding historical instantiation data associated with the content fragment; and utilizing an LSTM layer of the fragment machine learning model in connection with a model of historical viewing and interaction behavior relative to the content fragment to generate a predicted content item interaction performance metric for an instantiation of the content fragment.

18. The computer-implemented method of claim 15, further comprising, in response to selection of a digital content item within a selected fragment variant, utilizing an image content model to generate digital content variants for the digital content item by:

determining one or more descriptors for the digital content item;

identifying digital content variants from the one or more descriptors;

generating predicted digital content performance metrics for the digital content variants; and providing a subset of the digital content variants from the predicted digital content performance metrics.

19. The computer-implemented method of claim 15, wherein generating the multivariate testing recommendations comprises:

generating predicted digital communication performance metrics for candidate digital communications comprising the fragment variants from historical performance data associated with historical digital communications; and generating the multivariate testing recommendations from a subset of the candidate digital communications based on the predicted digital communication performance metrics.

20. The computer-implemented method of claim 15, further comprising:

receiving multivariate test performance metrics from a multivariate test of three or more of the multivariate testing recommendations; and generating a digital communication comprising a multivariate digital communication test recommendation from the multivariate test performance metrics.

\* \* \* \* \*